United States Patent
Anderson et al.

(10) Patent No.: US 11,481,031 B1
(45) Date of Patent: Oct. 25, 2022

(54) DEVICES, SYSTEMS, AND METHODS FOR CONTROLLING COMPUTING DEVICES VIA NEUROMUSCULAR SIGNALS OF USERS

(71) Applicant: Meta Platforms Technologies, LLC, Menlo Park, CA (US)

(72) Inventors: Christopher Anderson, New York, NY (US); Adam Berenzweig, Brooklyn, NY (US); Scott Draves, Brooklyn, NY (US); Daniel Wetmore, Brooklyn, NY (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/469,537

(22) Filed: Sep. 8, 2021

Related U.S. Application Data

(63) Continuation of application No. 16/863,098, filed on Apr. 30, 2020, now Pat. No. 11,150,730.
(Continued)

(51) Int. Cl.
*G06F 3/041* (2006.01)
*G06F 3/01* (2006.01)
(Continued)

(52) U.S. Cl.
CPC ......... *G06F 3/015* (2013.01); *G02B 27/0172* (2013.01); *G06F 1/163* (2013.01);
(Continued)

(58) Field of Classification Search
CPC . G09B 19/00; G09B 5/02; G09B 5/06; G09B 9/00; G09B 19/003; G09B 7/00;
(Continued)

(56) References Cited

U.S. PATENT DOCUMENTS 1,411,995 A    4/1922  Dull
3,580,243 A    5/1971  Johnson
(Continued)

FOREIGN PATENT DOCUMENTS

CA    2902045 A1    8/2014
CA    2921954 A1    2/2015
(Continued)

OTHER PUBLICATIONS

Gaetano Gargiulo et al. GIGA-OHM High Impedance FET Input Amplifiers for Dry Electrode Biosensor Circuits and Systems Integrated Microsystems:Electronics, Photonics, and Biotechnology, Dec. 19, 2017, 41 pages.*
(Continued)

*Primary Examiner* — Olga V Merkoulova
(74) *Attorney, Agent, or Firm* — FisherBroyles, LLP

(57) ABSTRACT

The disclosed human computer interface (HCI) system may include (1) at least one processor, (2) a plurality of sensors that detect one or more neuromuscular signals from a forearm or wrist of a user, and (3) memory that stores (A) one or more trained inferential models that determine an amount of force associated with the one or more neuromuscular signals and (B) computer-executable instructions that, when executed by the at least one processor, cause the at least one processor to (I) identify the amount of force determined by the one or more trained inferential models, (II) determine that the amount of force satisfies a threshold force value, and in accordance with the determination that the amount of force satisfies the threshold force value, (III) generate a first input command for the HCI system. Various other devices, systems, and methods are also disclosed.

19 Claims, 26 Drawing Sheets

Related U.S. Application Data

(60) Provisional application No. 62/840,947, filed on Apr. 30, 2019, provisional application No. 62/841,069, filed on Apr. 30, 2019, provisional application No. 62/841,100, filed on Apr. 30, 2019, provisional application No. 62/840,980, filed on Apr. 30, 2019, provisional application No. 62/840,966, filed on Apr. 30, 2019, provisional application No. 62/841,107, filed on Apr. 30, 2019.

(51) Int. Cl.
*G06N 5/04* (2006.01)
*G02B 27/01* (2006.01)
*G06F 1/16* (2006.01)
*G06F 3/0485* (2022.01)

(52) U.S. Cl.
CPC ............ *G06F 3/017* (2013.01); *G06F 3/0485* (2013.01); *G06N 5/04* (2013.01); *G06F 2203/014* (2013.01)

(58) Field of Classification Search
CPC ...... G09B 19/0092; G09B 5/00; G09B 5/065; G09F 3/015
See application file for complete search history.

(56) References Cited

U.S. PATENT DOCUMENTS

| | | |
|---|---|---|
| 3,620,208 A | 11/1971 | Wayne et al. |
| 3,735,425 A | 5/1973 | Hoshall et al. |
| 3,880,146 A | 4/1975 | Everett et al. |
| 4,055,168 A | 10/1977 | Miller et al. |
| 4,602,639 A | 7/1986 | Hoogendoorn et al. |
| 4,705,408 A | 11/1987 | Jordi |
| 4,817,064 A | 3/1989 | Milles |
| 4,896,120 A | 1/1990 | Kamil |
| 5,003,978 A | 4/1991 | Dunseath, Jr. |
| D322,227 S | 12/1991 | Warhol |
| 5,081,852 A | 1/1992 | Cox |
| 5,251,189 A | 10/1993 | Thorp |
| D348,660 S | 7/1994 | Parsons |
| 5,445,869 A | 8/1995 | Ishikawa et al. |
| 5,462,065 A | 10/1995 | Cusimano |
| 5,482,051 A | 1/1996 | Reddy et al. |
| 5,605,059 A | 2/1997 | Woodward |
| 5,625,577 A | 4/1997 | Kunii et al. |
| 5,683,404 A | 11/1997 | Johnson |
| 6,005,548 A | 12/1999 | Latypov et al. |
| 6,009,210 A | 12/1999 | Kang |
| 6,032,530 A | 3/2000 | Hock |
| 6,066,794 A | 5/2000 | Longo |
| 6,184,847 B1 | 2/2001 | Fateh et al. |
| 6,238,338 B1 | 5/2001 | DeLuca et al. |
| 6,244,873 B1 | 6/2001 | Hill et al. |
| 6,377,277 B1 | 4/2002 | Yamamoto |
| D459,352 S | 6/2002 | Giovanniello |
| 6,411,843 B1 | 6/2002 | Zarychta |
| 6,487,906 B1 | 12/2002 | Hock |
| 6,510,333 B1 | 1/2003 | Licata et al. |
| 6,527,711 B1 | 3/2003 | Stivoric et al. |
| 6,619,836 B1 | 9/2003 | Silvant et al. |
| 6,658,287 B1 | 12/2003 | Litt et al. |
| 6,720,984 B1 | 4/2004 | Jorgensen et al. |
| 6,743,982 B2 | 6/2004 | Biegelsen et al. |
| 6,771,294 B1 | 8/2004 | Pulli et al. |
| 6,774,885 B1 | 8/2004 | Even-Zohar |
| 6,807,438 B1 | 10/2004 | Brun Del Re et al. |
| D502,661 S | 3/2005 | Rapport |
| D502,662 S | 3/2005 | Rapport |
| 6,865,409 B2 | 3/2005 | Getsla et al. |
| D503,646 S | 4/2005 | Rapport |
| 6,880,364 B1 | 4/2005 | Vidolin et al. |
| 6,901,286 B1 | 5/2005 | Sinderby et al. |
| 6,927,343 B2 | 8/2005 | Watanabe et al. |
| 6,942,621 B2 | 9/2005 | Avinash et al. |
| 6,965,842 B2 | 11/2005 | Rekimoto |
| 6,972,734 B1 | 12/2005 | Ohshima et al. |
| 6,984,208 B2 | 1/2006 | Zheng |
| 7,022,919 B2 | 4/2006 | Brist et al. |
| 7,086,218 B1 | 8/2006 | Pasach |
| 7,089,148 B1 | 8/2006 | Bachmann et al. |
| D535,401 S | 1/2007 | Travis et al. |
| 7,173,437 B2 | 2/2007 | Hervieux et al. |
| 7,209,114 B2 | 4/2007 | Radley-Smith |
| D543,212 S | 5/2007 | Marks |
| 7,265,298 B2 | 9/2007 | Maghribi et al. |
| 7,271,774 B2 | 9/2007 | Puuri |
| 7,333,090 B2 | 2/2008 | Tanaka et al. |
| 7,351,975 B2 | 4/2008 | Brady et al. |
| 7,450,107 B2 | 11/2008 | Radley-Smith |
| 7,491,892 B2 | 2/2009 | Wagner et al. |
| 7,517,725 B2 | 4/2009 | Reis |
| 7,558,622 B2 | 7/2009 | Tran |
| 7,574,253 B2 | 8/2009 | Edney et al. |
| 7,580,742 B2 | 8/2009 | Tan et al. |
| 7,596,393 B2 | 9/2009 | Jung et al. |
| 7,618,260 B2 | 11/2009 | Daniel et al. |
| 7,636,549 B2 | 12/2009 | Ma et al. |
| 7,640,007 B2 | 12/2009 | Chen et al. |
| 7,660,126 B2 | 2/2010 | Cho et al. |
| 7,761,390 B2 * | 7/2010 | Ford ................ G06F 3/015 706/53 |
| 7,787,946 B2 | 8/2010 | Stahmann et al. |
| 7,805,386 B2 | 9/2010 | Greer |
| 7,809,435 B1 | 10/2010 | Ettare et al. |
| 7,844,310 B2 | 11/2010 | Anderson |
| 7,870,211 B2 | 1/2011 | Pascal et al. |
| 7,901,368 B2 | 3/2011 | Flaherty et al. |
| 7,925,100 B2 | 4/2011 | Howell et al. |
| 7,948,763 B2 | 5/2011 | Chuang |
| D643,428 S | 8/2011 | Janky et al. |
| D646,192 S | 10/2011 | Woode |
| 8,054,061 B2 | 11/2011 | Prance et al. |
| D654,622 S | 2/2012 | Hsu |
| 8,170,656 B2 | 5/2012 | Tan et al. |
| 8,179,604 B1 | 5/2012 | Prada Gomez et al. |
| 8,188,937 B1 | 5/2012 | Amafuji et al. |
| 8,190,249 B1 | 5/2012 | Gharieb et al. |
| D661,613 S | 6/2012 | Demeglio |
| 8,203,502 B1 | 6/2012 | Chi et al. |
| 8,207,473 B2 | 6/2012 | Axisa et al. |
| 8,212,859 B2 | 7/2012 | Tang et al. |
| 8,311,623 B2 | 11/2012 | Sanger |
| 8,348,538 B2 | 1/2013 | Van Loenen et al. |
| 8,351,651 B2 | 1/2013 | Lee |
| 8,355,671 B2 | 1/2013 | Kramer et al. |
| 8,384,683 B2 | 2/2013 | Luo |
| 8,389,862 B2 | 3/2013 | Arora et al. |
| 8,421,634 B2 | 4/2013 | Tan et al. |
| 8,427,977 B2 | 4/2013 | Workman et al. |
| D682,727 S | 5/2013 | Bulgari |
| 8,435,191 B2 | 5/2013 | Barboutis et al. |
| 8,437,844 B2 | 5/2013 | Syed Momen et al. |
| 8,447,704 B2 | 5/2013 | Tan et al. |
| 8,467,270 B2 | 6/2013 | Gossweiler, III et al. |
| 8,469,741 B2 | 6/2013 | Oster et al. |
| 8,484,022 B1 | 7/2013 | Vanhoucke |
| D689,862 S | 9/2013 | Liu |
| 8,591,411 B2 | 11/2013 | Banet et al. |
| D695,454 S | 12/2013 | Moore |
| 8,620,361 B2 | 12/2013 | Bailey et al. |
| 8,624,124 B2 | 1/2014 | Koo et al. |
| 8,702,629 B2 | 4/2014 | Giuffrida et al. |
| 8,704,882 B2 | 4/2014 | Turner |
| 8,718,980 B2 | 5/2014 | Garudadri et al. |
| 8,743,052 B1 | 6/2014 | Keller et al. |
| 8,744,543 B2 | 6/2014 | Li et al. |
| 8,754,862 B2 | 6/2014 | Zaliva |
| 8,777,668 B2 | 7/2014 | Ikeda et al. |
| D716,457 S | 10/2014 | Brefka et al. |
| D717,685 S | 11/2014 | Bailey et al. |
| 8,879,276 B2 | 11/2014 | Wang |

(56) References Cited

U.S. PATENT DOCUMENTS

| | | |
|---|---|---|
| 8,880,163 B2 | 11/2014 | Barachant et al. |
| 8,883,287 B2 | 11/2014 | Boyce et al. |
| 8,890,875 B2 | 11/2014 | Jammes et al. |
| 8,892,479 B2 | 11/2014 | Tan et al. |
| 8,895,865 B2 | 11/2014 | Lenahan et al. |
| 8,912,094 B2 | 12/2014 | Koo et al. |
| 8,914,472 B1 | 12/2014 | Lee et al. |
| 8,922,481 B1 | 12/2014 | Kauffmann et al. |
| 8,970,571 B1 | 3/2015 | Wong et al. |
| 8,971,023 B2 | 3/2015 | Olsson et al. |
| 9,018,532 B2 | 4/2015 | Wesselmann et al. |
| 9,037,530 B2 | 5/2015 | Tan et al. |
| 9,086,687 B2 | 7/2015 | Park et al. |
| 9,092,664 B2 | 7/2015 | Forutanpour et al. |
| D736,664 S | 8/2015 | Paradise et al. |
| 9,146,730 B2 | 9/2015 | Lazar |
| D741,855 S | 10/2015 | Park et al. |
| 9,170,674 B2 | 10/2015 | Forutanpour et al. |
| D742,272 S | 11/2015 | Bailey et al. |
| D742,874 S | 11/2015 | Cheng et al. |
| D743,963 S | 11/2015 | Osterhout |
| 9,182,826 B2 | 11/2015 | Powledge et al. |
| 9,211,417 B2 | 12/2015 | Heldman et al. |
| 9,218,574 B2 | 12/2015 | Phillipps et al. |
| D747,714 S | 1/2016 | Erbeus |
| 9,235,934 B2 | 1/2016 | Mandella et al. |
| 9,240,069 B1 | 1/2016 | Li |
| D750,623 S | 3/2016 | Park et al. |
| D751,065 S | 3/2016 | Magi |
| 9,278,453 B2 | 3/2016 | Assad |
| 9,299,248 B2 | 3/2016 | Lake et al. |
| D756,359 S | 5/2016 | Bailey et al. |
| 9,329,694 B2 | 5/2016 | Slonneger |
| 9,341,659 B2 | 5/2016 | Poupyrev et al. |
| 9,351,653 B1 | 5/2016 | Harrison |
| 9,367,139 B2 | 6/2016 | Ataee et al. |
| 9,372,535 B2 | 6/2016 | Bailey et al. |
| 9,389,694 B2 | 7/2016 | Ataee et al. |
| 9,393,418 B2 | 7/2016 | Giuffrida et al. |
| 9,402,582 B1 | 8/2016 | Parviz et al. |
| 9,408,316 B2 | 8/2016 | Bailey et al. |
| 9,418,927 B2 | 8/2016 | Axisa et al. |
| 9,439,566 B2 | 9/2016 | Arne et al. |
| 9,459,697 B2 | 10/2016 | Bedikian et al. |
| 9,472,956 B2 | 10/2016 | Michaelis et al. |
| 9,477,313 B2 | 10/2016 | Mistry et al. |
| 9,483,123 B2 | 11/2016 | Aleem et al. |
| 9,529,434 B2 | 12/2016 | Choi et al. |
| 9,597,015 B2 | 3/2017 | McNames et al. |
| 9,600,030 B2 | 3/2017 | Bailey et al. |
| 9,612,661 B2 | 4/2017 | Wagner et al. |
| 9,613,262 B2 | 4/2017 | Holz |
| 9,654,477 B1 | 5/2017 | Kotamraju |
| 9,659,403 B1 | 5/2017 | Horowitz |
| 9,687,168 B2 | 6/2017 | John |
| 9,696,795 B2 | 7/2017 | Marcolina et al. |
| 9,720,515 B2 | 8/2017 | Wagner et al. |
| 9,741,169 B1 | 8/2017 | Holz |
| 9,766,709 B2 | 9/2017 | Holz |
| 9,785,247 B1 | 10/2017 | Horowitz et al. |
| 9,788,789 B2 | 10/2017 | Bailey |
| 9,864,431 B2 | 1/2018 | Keskin et al. |
| 9,867,548 B2 | 1/2018 | Le et al. |
| 9,880,632 B2 | 1/2018 | Ataee et al. |
| 9,891,718 B2 | 2/2018 | Connor |
| 9,921,641 B1 | 3/2018 | Worley, III et al. |
| 10,042,422 B2 | 8/2018 | Morun et al. |
| 10,070,799 B2 | 9/2018 | Ang et al. |
| 10,078,435 B2 | 9/2018 | Noel |
| 10,101,809 B2 | 10/2018 | Morun et al. |
| 10,152,082 B2 | 12/2018 | Bailey |
| 10,185,416 B2 | 1/2019 | Mistry et al. |
| 10,188,309 B2 | 1/2019 | Morun et al. |
| 10,199,008 B2 | 2/2019 | Aleem et al. |
| 10,203,751 B2 | 2/2019 | Keskin et al. |
| 10,216,274 B2 | 2/2019 | Chapeskie et al. |
| 10,251,577 B2 | 4/2019 | Morun et al. |
| 10,310,601 B2 | 6/2019 | Morun et al. |
| 10,331,210 B2 | 6/2019 | Morun et al. |
| 10,362,958 B2 | 7/2019 | Morun et al. |
| 10,409,371 B2 | 9/2019 | Kaifosh et al. |
| 10,437,335 B2 | 10/2019 | Daniels |
| 10,460,455 B2 | 10/2019 | Giurgica-Tiron et al. |
| 10,489,986 B2 | 11/2019 | Kaifosh et al. |
| 10,496,168 B2 | 12/2019 | Kaifosh et al. |
| 10,504,286 B2 | 12/2019 | Kaifosh et al. |
| 10,520,378 B1 | 12/2019 | Brown et al. |
| 10,528,135 B2 | 1/2020 | Bailey et al. |
| 10,558,273 B2 | 2/2020 | Park et al. |
| 10,592,001 B2 | 3/2020 | Berenzweig et al. |
| 10,610,737 B1 | 4/2020 | Crawford |
| 10,676,083 B1 | 6/2020 | De Sapio et al. |
| 10,687,759 B2 | 6/2020 | Guo et al. |
| 10,905,350 B2 | 2/2021 | Berenzweig et al. |
| 10,905,383 B2 | 2/2021 | Barachant |
| 10,937,414 B2 | 3/2021 | Berenzweig et al. |
| 10,990,174 B2 | 4/2021 | Kaifosh et al. |
| 11,009,951 B2 | 5/2021 | Bailey et al. |
| 11,150,730 B1* | 10/2021 | Anderson ........... G02B 27/0172 |
| 2002/0032386 A1 | 3/2002 | Sackner et al. |
| 2002/0077534 A1 | 6/2002 | DuRousseau |
| 2002/0094701 A1 | 7/2002 | Biegelsen et al. |
| 2002/0198472 A1 | 12/2002 | Kramer |
| 2003/0036691 A1 | 2/2003 | Stanaland et al. |
| 2003/0051505 A1 | 3/2003 | Robertson et al. |
| 2003/0144586 A1 | 7/2003 | Tsubata |
| 2003/0144829 A1 | 7/2003 | Geatz et al. |
| 2003/0171921 A1 | 9/2003 | Manabe et al. |
| 2003/0184544 A1 | 10/2003 | Prudent |
| 2004/0010210 A1 | 1/2004 | Avinash et al. |
| 2004/0054273 A1 | 3/2004 | Finneran et al. |
| 2004/0068409 A1* | 4/2004 | Tanaka ................ B25J 9/1656 |
| | | 704/272 |
| 2004/0073104 A1 | 4/2004 | Brun Del Re et al. |
| 2004/0080499 A1 | 4/2004 | Lui |
| 2004/0092839 A1 | 5/2004 | Shin et al. |
| 2004/0194500 A1 | 10/2004 | Rapport |
| 2004/0210165 A1 | 10/2004 | Marmaropoulos et al. |
| 2004/0243342 A1 | 12/2004 | Rekimoto |
| 2004/0254617 A1 | 12/2004 | Hemmerling et al. |
| 2005/0005637 A1 | 1/2005 | Rapport |
| 2005/0012715 A1* | 1/2005 | Ford ..................... G06F 3/015 |
| | | 345/158 |
| 2005/0070227 A1 | 3/2005 | Shen et al. |
| 2005/0070791 A1 | 3/2005 | Edney et al. |
| 2005/0115561 A1 | 6/2005 | Stahmann et al. |
| 2005/0119701 A1 | 6/2005 | Lauter et al. |
| 2005/0177038 A1 | 8/2005 | Kolpin et al. |
| 2006/0018833 A1 | 1/2006 | Murphy et al. |
| 2006/0037359 A1 | 2/2006 | Stinespring |
| 2006/0058699 A1 | 3/2006 | Vitiello et al. |
| 2006/0061544 A1 | 3/2006 | Min et al. |
| 2006/0121958 A1 | 6/2006 | Jung et al. |
| 2006/0129057 A1 | 6/2006 | Maekawa et al. |
| 2006/0149338 A1 | 7/2006 | Flaherty et al. |
| 2006/0211956 A1 | 9/2006 | Sankai |
| 2007/0009151 A1 | 1/2007 | Pittman et al. |
| 2007/0016265 A1* | 1/2007 | Davoodi ............. G09B 19/003 |
| | | 607/48 |
| 2007/0023662 A1 | 2/2007 | Brady et al. |
| 2007/0132785 A1 | 6/2007 | Ebersole, Jr. et al. |
| 2007/0148624 A1 | 6/2007 | Nativ |
| 2007/0172797 A1 | 7/2007 | Hada et al. |
| 2007/0177770 A1 | 8/2007 | Derchak et al. |
| 2007/0185697 A1 | 8/2007 | Tan et al. |
| 2007/0256494 A1 | 11/2007 | Nakamura et al. |
| 2007/0285399 A1 | 12/2007 | Lund |
| 2008/0001735 A1 | 1/2008 | Tran |
| 2008/0051673 A1 | 2/2008 | Kong et al. |
| 2008/0052643 A1 | 2/2008 | Ike et al. |
| 2008/0058668 A1 | 3/2008 | Seyed Momen et al. |
| 2008/0103639 A1 | 5/2008 | Troy et al. |
| 2008/0103769 A1 | 5/2008 | Schultz et al. |
| 2008/0136775 A1 | 6/2008 | Conant |

(56) References Cited

U.S. PATENT DOCUMENTS

| | | |
|---|---|---|
| 2008/0152217 A1 | 6/2008 | Greer |
| 2008/0163130 A1 | 7/2008 | Westerman |
| 2008/0214360 A1 | 9/2008 | Stirling et al. |
| 2008/0221487 A1 | 9/2008 | Zohar et al. |
| 2008/0262772 A1 | 10/2008 | Luinge et al. |
| 2008/0278497 A1 | 11/2008 | Jammes et al. |
| 2008/0285805 A1 | 11/2008 | Luinge et al. |
| 2009/0005700 A1 | 1/2009 | Joshi et al. |
| 2009/0007597 A1 | 1/2009 | Hanevold |
| 2009/0027337 A1 | 1/2009 | Hildreth |
| 2009/0031757 A1 | 2/2009 | Harding |
| 2009/0040016 A1 | 2/2009 | Ikeda |
| 2009/0051544 A1 | 2/2009 | Niknejad |
| 2009/0079607 A1 | 3/2009 | Denison et al. |
| 2009/0079813 A1 | 3/2009 | Hildreth |
| 2009/0082692 A1 | 3/2009 | Hale et al. |
| 2009/0082701 A1 | 3/2009 | Zohar et al. |
| 2009/0102580 A1 | 4/2009 | Uchaykin |
| 2009/0112080 A1 | 4/2009 | Matthews |
| 2009/0124881 A1 | 5/2009 | Rytky |
| 2009/0189864 A1 | 7/2009 | Walker et al. |
| 2009/0189867 A1 | 7/2009 | Krah et al. |
| 2009/0195497 A1 | 8/2009 | Fitzgerald et al. |
| 2009/0204031 A1 | 8/2009 | McNames et al. |
| 2009/0209878 A1 | 8/2009 | Sanger |
| 2009/0251407 A1 | 10/2009 | Flake et al. |
| 2009/0265671 A1 | 10/2009 | Sachs et al. |
| 2009/0318785 A1 | 12/2009 | Ishikawa et al. |
| 2009/0319230 A1 | 12/2009 | Case, Jr. et al. |
| 2009/0326406 A1 | 12/2009 | Tan et al. |
| 2009/0327171 A1* | 12/2009 | Tan .................. G06F 3/015 706/12 |
| 2010/0030532 A1 | 2/2010 | Arora et al. |
| 2010/0041974 A1 | 2/2010 | Ting et al. |
| 2010/0063794 A1 | 3/2010 | Hernandez-Rebollar |
| 2010/0106044 A1 | 4/2010 | Linderman |
| 2010/0113910 A1 | 5/2010 | Brauers et al. |
| 2010/0228487 A1 | 9/2010 | Leuthardt et al. |
| 2010/0234696 A1 | 9/2010 | Li et al. |
| 2010/0240981 A1 | 9/2010 | Barboutis et al. |
| 2010/0249635 A1 | 9/2010 | Van Der Reijden |
| 2010/0280628 A1 | 11/2010 | Sankai |
| 2010/0292595 A1 | 11/2010 | Paul |
| 2010/0292606 A1 | 11/2010 | Prakash et al. |
| 2010/0292617 A1 | 11/2010 | Lei et al. |
| 2010/0293115 A1 | 11/2010 | Seyed Momen |
| 2010/0306713 A1 | 12/2010 | Geisner et al. |
| 2010/0315266 A1 | 12/2010 | Gunawardana et al. |
| 2010/0317958 A1 | 12/2010 | Beck et al. |
| 2011/0007035 A1 | 1/2011 | Shai |
| 2011/0018754 A1 | 1/2011 | Tojima et al. |
| 2011/0066381 A1 | 3/2011 | Garudadri et al. |
| 2011/0077484 A1 | 3/2011 | Van Slyke et al. |
| 2011/0082838 A1 | 4/2011 | Niemela |
| 2011/0092826 A1 | 4/2011 | Lee et al. |
| 2011/0119216 A1 | 5/2011 | Wigdor |
| 2011/0133934 A1 | 6/2011 | Tan et al. |
| 2011/0134026 A1 | 6/2011 | Kang et al. |
| 2011/0151974 A1 | 6/2011 | Deaguero |
| 2011/0166434 A1 | 7/2011 | Gargiulo |
| 2011/0172503 A1 | 7/2011 | Knepper et al. |
| 2011/0173204 A1 | 7/2011 | Murillo et al. |
| 2011/0173574 A1 | 7/2011 | Clavin et al. |
| 2011/0205242 A1 | 8/2011 | Friesen |
| 2011/0213278 A1 | 9/2011 | Horak et al. |
| 2011/0221672 A1 | 9/2011 | Osterhout et al. |
| 2011/0224556 A1 | 9/2011 | Moon et al. |
| 2011/0224564 A1 | 9/2011 | Moon et al. |
| 2011/0230782 A1 | 9/2011 | Bartol et al. |
| 2011/0248914 A1 | 10/2011 | Sherr |
| 2011/0262002 A1 | 10/2011 | Lee |
| 2011/0270135 A1 | 11/2011 | Dooley et al. |
| 2011/0295100 A1 | 12/2011 | Hegde et al. |
| 2011/0313762 A1 | 12/2011 | Ben-David et al. |
| 2012/0007821 A1 | 1/2012 | Zaliva |
| 2012/0029322 A1 | 2/2012 | Wartena et al. |
| 2012/0051005 A1 | 3/2012 | Vanfleteren et al. |
| 2012/0066163 A1 | 3/2012 | Balls et al. |
| 2012/0071780 A1 | 3/2012 | Barachant et al. |
| 2012/0101357 A1 | 4/2012 | Hoskuldsson et al. |
| 2012/0117514 A1 | 5/2012 | Kim et al. |
| 2012/0157789 A1 | 6/2012 | Kangas et al. |
| 2012/0165695 A1 | 6/2012 | Kidmose et al. |
| 2012/0184838 A1 | 7/2012 | John |
| 2012/0188158 A1 | 7/2012 | Tan et al. |
| 2012/0203076 A1 | 8/2012 | Fatta et al. |
| 2012/0209134 A1* | 8/2012 | Morita .................. G06N 20/00 600/546 |
| 2012/0265090 A1 | 10/2012 | Fink et al. |
| 2012/0265480 A1 | 10/2012 | Oshima |
| 2012/0283526 A1 | 11/2012 | Gommesen et al. |
| 2012/0293548 A1 | 11/2012 | Perez et al. |
| 2012/0302858 A1 | 11/2012 | Kidmose et al. |
| 2012/0323521 A1 | 12/2012 | De Foras et al. |
| 2013/0004033 A1 | 1/2013 | Trugenberger |
| 2013/0005303 A1 | 1/2013 | Song et al. |
| 2013/0020948 A1 | 1/2013 | Han et al. |
| 2013/0027341 A1 | 1/2013 | Mastandrea |
| 2013/0038707 A1 | 2/2013 | Cunningham et al. |
| 2013/0077820 A1 | 3/2013 | Marais et al. |
| 2013/0080794 A1 | 3/2013 | Hsieh |
| 2013/0106686 A1 | 5/2013 | Bennett |
| 2013/0123656 A1 | 5/2013 | Heck |
| 2013/0127708 A1 | 5/2013 | Jung et al. |
| 2013/0131538 A1 | 5/2013 | Gaw et al. |
| 2013/0135223 A1 | 5/2013 | Shai |
| 2013/0141375 A1 | 6/2013 | Ludwig et al. |
| 2013/0144629 A1 | 6/2013 | Johnston et al. |
| 2013/0165813 A1 | 6/2013 | Chang et al. |
| 2013/0191741 A1 | 7/2013 | Dickinson et al. |
| 2013/0198694 A1 | 8/2013 | Rahman et al. |
| 2013/0207889 A1 | 8/2013 | Chang et al. |
| 2013/0217998 A1 | 8/2013 | Mahfouz et al. |
| 2013/0221996 A1 | 8/2013 | Poupyrev et al. |
| 2013/0232095 A1 | 9/2013 | Tan et al. |
| 2013/0259238 A1 | 10/2013 | Xiang et al. |
| 2013/0265229 A1 | 10/2013 | Forutanpour et al. |
| 2013/0265437 A1 | 10/2013 | Thorn et al. |
| 2013/0271292 A1 | 10/2013 | McDermott |
| 2013/0285913 A1 | 10/2013 | Griffin et al. |
| 2013/0293580 A1 | 11/2013 | Spivack |
| 2013/0310979 A1 | 11/2013 | Herr et al. |
| 2013/0312256 A1 | 11/2013 | Wesselmann et al. |
| 2013/0317382 A1 | 11/2013 | Le |
| 2013/0317648 A1 | 11/2013 | Assad |
| 2013/0332196 A1 | 12/2013 | Pinsker |
| 2014/0020945 A1 | 1/2014 | Hurwitz et al. |
| 2014/0028546 A1 | 1/2014 | Jeon et al. |
| 2014/0045547 A1 | 2/2014 | Singamsetty et al. |
| 2014/0049417 A1 | 2/2014 | Abdurrahman et al. |
| 2014/0052150 A1 | 2/2014 | Taylor et al. |
| 2014/0092009 A1 | 4/2014 | Yen et al. |
| 2014/0094675 A1 | 4/2014 | Luna et al. |
| 2014/0098018 A1 | 4/2014 | Kim et al. |
| 2014/0100432 A1 | 4/2014 | Golda et al. |
| 2014/0107493 A1 | 4/2014 | Yuen et al. |
| 2014/0121471 A1 | 5/2014 | Walker |
| 2014/0122958 A1 | 5/2014 | Greenebrg et al. |
| 2014/0142937 A1 | 5/2014 | Powledge et al. |
| 2014/0143064 A1 | 5/2014 | Tran |
| 2014/0147820 A1 | 5/2014 | Snow et al. |
| 2014/0194062 A1 | 7/2014 | Palin et al. |
| 2014/0196131 A1 | 7/2014 | Lee |
| 2014/0198034 A1 | 7/2014 | Bailey et al. |
| 2014/0198035 A1 | 7/2014 | Bailey et al. |
| 2014/0198944 A1 | 7/2014 | Forutanpour et al. |
| 2014/0200432 A1 | 7/2014 | Banerji et al. |
| 2014/0201666 A1 | 7/2014 | Bedikian et al. |
| 2014/0223462 A1 | 8/2014 | Aimone et al. |
| 2014/0236031 A1 | 8/2014 | Banet et al. |
| 2014/0240103 A1 | 8/2014 | Lake et al. |
| 2014/0240223 A1 | 8/2014 | Lake et al. |
| 2014/0245200 A1 | 8/2014 | Holz |
| 2014/0249397 A1 | 9/2014 | Lake et al. |

(56) References Cited

U.S. PATENT DOCUMENTS

| | | |
|---|---|---|
| 2014/0257141 A1 | 9/2014 | Giuffrida et al. |
| 2014/0277622 A1 | 9/2014 | Raniere |
| 2014/0278139 A1 | 9/2014 | Hong et al. |
| 2014/0278441 A1 | 9/2014 | Ton et al. |
| 2014/0279860 A1 | 9/2014 | Pan et al. |
| 2014/0282282 A1 | 9/2014 | Holz |
| 2014/0285326 A1 | 9/2014 | Luna et al. |
| 2014/0297528 A1 | 10/2014 | Agrawal et al. |
| 2014/0299362 A1 | 10/2014 | Park et al. |
| 2014/0304665 A1 | 10/2014 | Holz |
| 2014/0310595 A1 | 10/2014 | Acharya et al. |
| 2014/0330404 A1 | 11/2014 | Abdelghani et al. |
| 2014/0334083 A1 | 11/2014 | Bailey |
| 2014/0334653 A1 | 11/2014 | Luna et al. |
| 2014/0337861 A1 | 11/2014 | Chang et al. |
| 2014/0340857 A1 | 11/2014 | Hsu et al. |
| 2014/0344731 A1 | 11/2014 | Holz |
| 2014/0349257 A1 | 11/2014 | Connor |
| 2014/0354528 A1 | 12/2014 | Laughlin et al. |
| 2014/0354529 A1 | 12/2014 | Laughlin et al. |
| 2014/0355825 A1 | 12/2014 | Kim et al. |
| 2014/0358024 A1 | 12/2014 | Nelson et al. |
| 2014/0358825 A1 | 12/2014 | Phillipps et al. |
| 2014/0359540 A1 | 12/2014 | Kelsey et al. |
| 2014/0361988 A1 | 12/2014 | Katz et al. |
| 2014/0364703 A1 | 12/2014 | Kim et al. |
| 2014/0365163 A1 | 12/2014 | Jallon |
| 2014/0368428 A1 | 12/2014 | Pinault |
| 2014/0368474 A1 | 12/2014 | Kim et al. |
| 2014/0375465 A1 | 12/2014 | Fenuccio et al. |
| 2014/0376773 A1 | 12/2014 | Holz |
| 2015/0006120 A1 | 1/2015 | Sett et al. |
| 2015/0010203 A1 | 1/2015 | Muninder et al. |
| 2015/0011857 A1 | 1/2015 | Henson et al. |
| 2015/0019135 A1 | 1/2015 | Kacyvenski et al. |
| 2015/0025355 A1 | 1/2015 | Bailey et al. |
| 2015/0029092 A1 | 1/2015 | Holz et al. |
| 2015/0035827 A1 | 2/2015 | Yamaoka et al. |
| 2015/0045689 A1 | 2/2015 | Barone |
| 2015/0045699 A1 | 2/2015 | Mokaya et al. |
| 2015/0051470 A1 | 2/2015 | Bailey et al. |
| 2015/0057506 A1 | 2/2015 | Luna et al. |
| 2015/0057770 A1 | 2/2015 | Bailey et al. |
| 2015/0065840 A1 | 3/2015 | Bailey |
| 2015/0070270 A1 | 3/2015 | Bailey et al. |
| 2015/0070274 A1 | 3/2015 | Morozov |
| 2015/0072326 A1 | 3/2015 | Mauri et al. |
| 2015/0084860 A1 | 3/2015 | Aleem et al. |
| 2015/0091790 A1 | 4/2015 | Forutanpour et al. |
| 2015/0094564 A1 | 4/2015 | Tashman et al. |
| 2015/0099946 A1 | 4/2015 | Sahin |
| 2015/0106052 A1 | 4/2015 | Balakrishnan et al. |
| 2015/0109202 A1 | 4/2015 | Ataee et al. |
| 2015/0124566 A1 | 5/2015 | Lake et al. |
| 2015/0128094 A1 | 5/2015 | Baldwin et al. |
| 2015/0141784 A1 | 5/2015 | Morun et al. |
| 2015/0148641 A1 | 5/2015 | Morun et al. |
| 2015/0148728 A1* | 5/2015 | Sallum .................... A61F 5/013 602/22 |
| 2015/0157944 A1 | 6/2015 | Gottlieb |
| 2015/0160621 A1 | 6/2015 | Yilmaz |
| 2015/0169074 A1 | 6/2015 | Ataee et al. |
| 2015/0170421 A1 | 6/2015 | Mandella et al. |
| 2015/0177841 A1 | 6/2015 | Vanblon et al. |
| 2015/0182113 A1 | 7/2015 | Utter, II |
| 2015/0182130 A1 | 7/2015 | Utter, II |
| 2015/0182160 A1 | 7/2015 | Kim et al. |
| 2015/0182163 A1 | 7/2015 | Utter |
| 2015/0182164 A1 | 7/2015 | Utter, II |
| 2015/0182165 A1 | 7/2015 | Miller et al. |
| 2015/0186609 A1 | 7/2015 | Utter, II |
| 2015/0187355 A1 | 7/2015 | Parkinson et al. |
| 2015/0193949 A1 | 7/2015 | Katz et al. |
| 2015/0199025 A1 | 7/2015 | Holz |
| 2015/0213191 A1 | 7/2015 | Abdelghani et al. |
| 2015/0216475 A1 | 8/2015 | Luna et al. |
| 2015/0220152 A1 | 8/2015 | Tait et al. |
| 2015/0223716 A1 | 8/2015 | Korkala et al. |
| 2015/0230756 A1 | 8/2015 | Luna et al. |
| 2015/0234426 A1 | 8/2015 | Bailey et al. |
| 2015/0237716 A1 | 8/2015 | Su et al. |
| 2015/0242009 A1 | 8/2015 | Xiao et al. |
| 2015/0242575 A1 | 8/2015 | Abovitz et al. |
| 2015/0261306 A1 | 9/2015 | Lake |
| 2015/0261318 A1 | 9/2015 | Scavezze et al. |
| 2015/0272483 A1 | 10/2015 | Etemad et al. |
| 2015/0277575 A1 | 10/2015 | Ataee et al. |
| 2015/0288944 A1 | 10/2015 | Nistico et al. |
| 2015/0289995 A1 | 10/2015 | Wilkinson et al. |
| 2015/0296553 A1 | 10/2015 | DiFranco et al. |
| 2015/0302168 A1 | 10/2015 | De Sapio et al. |
| 2015/0305672 A1 | 10/2015 | Grey et al. |
| 2015/0309563 A1 | 10/2015 | Connor |
| 2015/0309582 A1 | 10/2015 | Gupta |
| 2015/0312175 A1 | 10/2015 | Langholz |
| 2015/0313496 A1 | 11/2015 | Connor |
| 2015/0323998 A1 | 11/2015 | Kudekar et al. |
| 2015/0325202 A1 | 11/2015 | Lake et al. |
| 2015/0332013 A1 | 11/2015 | Lee et al. |
| 2015/0346701 A1 | 12/2015 | Gordon et al. |
| 2015/0351690 A1 | 12/2015 | Toth et al. |
| 2015/0355716 A1 | 12/2015 | Balasubramanian et al. |
| 2015/0355718 A1 | 12/2015 | Slonneger |
| 2015/0366504 A1* | 12/2015 | Connor ................ A61B 5/6804 600/301 |
| 2015/0370326 A1 | 12/2015 | Chapeskie et al. |
| 2015/0370333 A1 | 12/2015 | Ataee et al. |
| 2015/0379770 A1 | 12/2015 | Haley, Jr. et al. |
| 2016/0011668 A1 | 1/2016 | Gilad-Bachrach et al. |
| 2016/0020500 A1 | 1/2016 | Matsuda |
| 2016/0026853 A1 | 1/2016 | Wexler et al. |
| 2016/0049073 A1 | 2/2016 | Lee |
| 2016/0050037 A1 | 2/2016 | Webb |
| 2016/0071319 A1 | 3/2016 | Fallon et al. |
| 2016/0092504 A1 | 3/2016 | Mitri et al. |
| 2016/0099010 A1 | 4/2016 | Sainath et al. |
| 2016/0107309 A1 | 4/2016 | Walsh et al. |
| 2016/0113587 A1 | 4/2016 | Kothe et al. |
| 2016/0144172 A1 | 5/2016 | Hsueh et al. |
| 2016/0150636 A1 | 5/2016 | Otsubo |
| 2016/0156762 A1 | 6/2016 | Bailey et al. |
| 2016/0162604 A1 | 6/2016 | Xiaoli et al. |
| 2016/0170710 A1 | 6/2016 | Kim et al. |
| 2016/0187992 A1 | 6/2016 | Yamamoto et al. |
| 2016/0195928 A1 | 7/2016 | Wagner et al. |
| 2016/0199699 A1 | 7/2016 | Klassen |
| 2016/0202081 A1 | 7/2016 | Debieuvre et al. |
| 2016/0206206 A1 | 7/2016 | Avila et al. |
| 2016/0207201 A1 | 7/2016 | Herr et al. |
| 2016/0217614 A1 | 7/2016 | Kraver et al. |
| 2016/0235323 A1 | 8/2016 | Tadi et al. |
| 2016/0239080 A1 | 8/2016 | Marcolina et al. |
| 2016/0242646 A1 | 8/2016 | Obma |
| 2016/0259407 A1 | 9/2016 | Schick |
| 2016/0262687 A1 | 9/2016 | Vaidyanathan et al. |
| 2016/0263458 A1 | 9/2016 | Mather et al. |
| 2016/0274732 A1 | 9/2016 | Bang et al. |
| 2016/0274758 A1 | 9/2016 | Bailey |
| 2016/0275726 A1 | 9/2016 | Mullins |
| 2016/0282947 A1 | 9/2016 | Schwarz et al. |
| 2016/0291768 A1 | 10/2016 | Cho et al. |
| 2016/0292497 A1 | 10/2016 | Kehtarnavaz et al. |
| 2016/0309249 A1 | 10/2016 | Wu et al. |
| 2016/0313798 A1 | 10/2016 | Connor |
| 2016/0313801 A1 | 10/2016 | Wagner et al. |
| 2016/0313890 A1 | 10/2016 | Walline et al. |
| 2016/0313899 A1 | 10/2016 | Noel |
| 2016/0314623 A1 | 10/2016 | Coleman et al. |
| 2016/0342227 A1 | 11/2016 | Natzke et al. |
| 2016/0350973 A1 | 12/2016 | Shapira et al. |
| 2017/0025026 A1* | 1/2017 | Ortiz Catalan ......... G06T 11/00 |
| 2017/0031502 A1 | 2/2017 | Rosenberg et al. |
| 2017/0035313 A1 | 2/2017 | Hong et al. |
| 2017/0061817 A1 | 3/2017 | Mettler May |

(56) References Cited

U.S. PATENT DOCUMENTS

| | | |
|---|---|---|
| 2017/0068445 A1 | 3/2017 | Lee et al. |
| 2017/0075426 A1 | 3/2017 | Camacho Perez et al. |
| 2017/0079828 A1 | 3/2017 | Pedtke et al. |
| 2017/0080346 A1 | 3/2017 | Abbas |
| 2017/0090604 A1 | 3/2017 | Barbier |
| 2017/0091567 A1 | 3/2017 | Wang et al. |
| 2017/0095178 A1 | 4/2017 | Schoen et al. |
| 2017/0119472 A1 | 5/2017 | Herrmann et al. |
| 2017/0123487 A1 | 5/2017 | Hazra et al. |
| 2017/0124474 A1 | 5/2017 | Kashyap |
| 2017/0124816 A1 | 5/2017 | Yang et al. |
| 2017/0147077 A1 | 5/2017 | Park et al. |
| 2017/0161635 A1 | 6/2017 | Oono et al. |
| 2017/0188878 A1 | 7/2017 | Lee |
| 2017/0188980 A1 | 7/2017 | Ash |
| 2017/0197142 A1 | 7/2017 | Stafford et al. |
| 2017/0209055 A1 | 7/2017 | Pantelopoulos et al. |
| 2017/0220923 A1 | 8/2017 | Bae et al. |
| 2017/0237789 A1 | 8/2017 | Harner et al. |
| 2017/0237901 A1 | 8/2017 | Lee et al. |
| 2017/0259167 A1 | 9/2017 | Cook et al. |
| 2017/0262064 A1 | 9/2017 | Ofir et al. |
| 2017/0277282 A1 | 9/2017 | Go |
| 2017/0285744 A1 | 10/2017 | Juliato |
| 2017/0285756 A1 | 10/2017 | Wang et al. |
| 2017/0285757 A1 | 10/2017 | Robertson et al. |
| 2017/0285848 A1 | 10/2017 | Rosenberg et al. |
| 2017/0296363 A1 | 10/2017 | Yetkin et al. |
| 2017/0301630 A1 | 10/2017 | Nguyen et al. |
| 2017/0308118 A1 | 10/2017 | Ito |
| 2017/0312614 A1 | 11/2017 | Tran et al. |
| 2017/0329392 A1 | 11/2017 | Keskin et al. |
| 2017/0329404 A1 | 11/2017 | Keskin et al. |
| 2017/0340506 A1 | 11/2017 | Zhang et al. |
| 2017/0344706 A1 | 11/2017 | Torres et al. |
| 2017/0347908 A1 | 12/2017 | Watanabe et al. |
| 2017/0371403 A1 | 12/2017 | Wetzler et al. |
| 2018/0000367 A1 | 1/2018 | Longinotti-Buitoni |
| 2018/0018825 A1 | 1/2018 | Kim et al. |
| 2018/0020285 A1 | 1/2018 | Zass |
| 2018/0020951 A1 | 1/2018 | Kaifosh et al. |
| 2018/0020978 A1 | 1/2018 | Kaifosh et al. |
| 2018/0020990 A1 | 1/2018 | Park et al. |
| 2018/0024634 A1 | 1/2018 | Kaifosh et al. |
| 2018/0024635 A1 | 1/2018 | Kaifosh et al. |
| 2018/0024641 A1 | 1/2018 | Mao et al. |
| 2018/0064363 A1 | 3/2018 | Morun et al. |
| 2018/0067553 A1 | 3/2018 | Morun et al. |
| 2018/0068489 A1 | 3/2018 | Kim et al. |
| 2018/0074332 A1 | 3/2018 | Li et al. |
| 2018/0081439 A1 | 3/2018 | Daniels |
| 2018/0088675 A1 | 3/2018 | Vogel et al. |
| 2018/0088765 A1 | 3/2018 | Bailey |
| 2018/0092599 A1 | 4/2018 | Kerth et al. |
| 2018/0093181 A1 | 4/2018 | Goslin et al. |
| 2018/0095542 A1 | 4/2018 | Mallinson |
| 2018/0095630 A1 | 4/2018 | Bailey |
| 2018/0101235 A1 | 4/2018 | Bodensteiner et al. |
| 2018/0101289 A1 | 4/2018 | Bailey |
| 2018/0107275 A1 | 4/2018 | Chen et al. |
| 2018/0120948 A1 | 5/2018 | Aleem et al. |
| 2018/0133551 A1 | 5/2018 | Chang et al. |
| 2018/0140441 A1 | 5/2018 | Poirters |
| 2018/0150033 A1 | 5/2018 | Lake et al. |
| 2018/0153430 A1 | 6/2018 | Ang et al. |
| 2018/0153444 A1 | 6/2018 | Yang et al. |
| 2018/0154140 A1 | 6/2018 | Bouton et al. |
| 2018/0168905 A1 | 6/2018 | Goodall et al. |
| 2018/0178008 A1 | 6/2018 | Bouton et al. |
| 2018/0217249 A1 | 8/2018 | La Salla et al. |
| 2018/0239430 A1 | 8/2018 | Tadi et al. |
| 2018/0240459 A1 | 8/2018 | Weng et al. |
| 2018/0247443 A1 | 8/2018 | Briggs et al. |
| 2018/0279919 A1 | 10/2018 | Bansbach et al. |
| 2018/0301057 A1 | 10/2018 | Hargrove et al. |
| 2018/0307314 A1 | 10/2018 | Connor |
| 2018/0314879 A1 | 11/2018 | Khwaja et al. |
| 2018/0321745 A1 | 11/2018 | Morun et al. |
| 2018/0321746 A1 | 11/2018 | Morun et al. |
| 2018/0330549 A1 | 11/2018 | Brenton |
| 2018/0333575 A1 | 11/2018 | Bouton |
| 2018/0344195 A1 | 12/2018 | Morun et al. |
| 2018/0356890 A1 | 12/2018 | Zhang et al. |
| 2018/0360379 A1 | 12/2018 | Harrison et al. |
| 2019/0008453 A1 | 1/2019 | Spoof |
| 2019/0025919 A1 | 1/2019 | Tadi et al. |
| 2019/0027141 A1 | 1/2019 | Strong et al. |
| 2019/0033967 A1 | 1/2019 | Morun et al. |
| 2019/0033974 A1 | 1/2019 | Mu et al. |
| 2019/0038166 A1 | 2/2019 | Tavabi et al. |
| 2019/0056422 A1 | 2/2019 | Park et al. |
| 2019/0076716 A1 | 3/2019 | Chiou et al. |
| 2019/0089898 A1 | 3/2019 | Kim et al. |
| 2019/0113973 A1 | 4/2019 | Coleman et al. |
| 2019/0121305 A1 | 4/2019 | Kaifosh et al. |
| 2019/0121306 A1* | 4/2019 | Kaifosh ............... A61B 5/7267 |
| 2019/0146809 A1 | 5/2019 | Lee et al. |
| 2019/0150777 A1 | 5/2019 | Guo et al. |
| 2019/0192037 A1 | 6/2019 | Morun et al. |
| 2019/0196585 A1 | 6/2019 | Laszlo et al. |
| 2019/0196586 A1 | 6/2019 | Laszlo et al. |
| 2019/0197778 A1 | 6/2019 | Sachdeva et al. |
| 2019/0209034 A1* | 7/2019 | Deno ....................... A61B 5/25 |
| 2019/0212817 A1 | 7/2019 | Kaifosh et al. |
| 2019/0216619 A1* | 7/2019 | McDonnall ............ A61B 5/296 |
| 2019/0223748 A1 | 7/2019 | Al-Natsheh et al. |
| 2019/0227627 A1 | 7/2019 | Kaifosh et al. |
| 2019/0228330 A1 | 7/2019 | Kaifosh et al. |
| 2019/0228533 A1 | 7/2019 | Giurgica-Tiron et al. |
| 2019/0228579 A1 | 7/2019 | Kaifosh et al. |
| 2019/0228590 A1 | 7/2019 | Kaifosh et al. |
| 2019/0228591 A1 | 7/2019 | Giurgica-Tiron et al. |
| 2019/0247650 A1 | 8/2019 | Tran |
| 2019/0279407 A1 | 9/2019 | McHugh et al. |
| 2019/0294243 A1 | 9/2019 | Laszlo et al. |
| 2019/0324549 A1 | 10/2019 | Araki et al. |
| 2019/0348026 A1 | 11/2019 | Berenzweig et al. |
| 2019/0348027 A1 | 11/2019 | Berenzweig et al. |
| 2019/0357787 A1 | 11/2019 | Barachant et al. |
| 2019/0362557 A1 | 11/2019 | Lacey et al. |
| 2020/0042089 A1 | 2/2020 | Ang et al. |
| 2020/0057661 A1 | 2/2020 | Bendfeldt |
| 2020/0065569 A1 | 2/2020 | Nduka et al. |
| 2020/0069210 A1 | 3/2020 | Berenzweig et al. |
| 2020/0069211 A1 | 3/2020 | Berenzweig et al. |
| 2020/0073483 A1 | 3/2020 | Berenzweig et al. |
| 2020/0077955 A1* | 3/2020 | Shui ........................ A61B 5/24 |
| 2020/0097081 A1 | 3/2020 | Stone et al. |
| 2020/0111260 A1 | 4/2020 | Osborn et al. |
| 2020/0142490 A1 | 5/2020 | Xiong et al. |
| 2020/0143795 A1 | 5/2020 | Park et al. |
| 2020/0163562 A1 | 5/2020 | Neaves |
| 2020/0205932 A1 | 7/2020 | Zar et al. |
| 2020/0225320 A1 | 7/2020 | Belskikh et al. |
| 2020/0245873 A1 | 8/2020 | Frank et al. |
| 2020/0275895 A1 | 9/2020 | Barachant |
| 2020/0301509 A1 | 9/2020 | Liu et al. |
| 2020/0305795 A1 | 10/2020 | Floyd et al. |
| 2020/0320335 A1 | 10/2020 | Shamun et al. |
| 2021/0109598 A1 | 4/2021 | Zhang et al. |
| 2021/0117523 A1 | 4/2021 | Kim et al. |
| 2021/0290159 A1 | 9/2021 | Bruinsma et al. |
| 2022/0256706 A1 | 8/2022 | Xiong et al. |

FOREIGN PATENT DOCUMENTS

| | | |
|---|---|---|
| CA | 2939644 A1 | 8/2015 |
| CN | 1838933 A | 9/2006 |
| CN | 103777752 A | 5/2014 |
| CN | 105009031 A | 10/2015 |
| CN | 105190477 A | 12/2015 |
| CN | 105190578 A | 12/2015 |
| CN | 106102504 A | 11/2016 |
| CN | 110300542 A | 10/2019 |

(56) References Cited

FOREIGN PATENT DOCUMENTS

| | | |
|---|---|---|
| CN | 111902077 A | 11/2020 |
| CN | 112074225 A | 12/2020 |
| CN | 112469469 A | 3/2021 |
| CN | 112822992 A | 5/2021 |
| DE | 4412278 A1 | 10/1995 |
| EP | 0301790 A2 | 2/1989 |
| EP | 1345210 A2 | 9/2003 |
| EP | 2198521 B1 | 6/2012 |
| EP | 2541763 A1 | 1/2013 |
| EP | 2959394 A1 | 12/2015 |
| EP | 3104737 A1 | 12/2016 |
| EP | 3200051 A1 | 8/2017 |
| EP | 3487395 A1 | 5/2019 |
| EP | 2959394 B1 | 5/2021 |
| JP | H05277080 A | 10/1993 |
| JP | 3103427 B2 | 10/2000 |
| JP | 2002287869 A | 10/2002 |
| JP | 2005095561 A | 4/2005 |
| JP | 2009050679 A | 3/2009 |
| JP | 2010520561 A | 6/2010 |
| JP | 2016507851 A | 3/2016 |
| JP | 2017509386 A | 4/2017 |
| JP | 2019023941 A | 2/2019 |
| JP | 2021072136 A | 5/2021 |
| KR | 20120094870 A | 8/2012 |
| KR | 20120097997 A | 9/2012 |
| KR | 20150123254 A | 11/2015 |
| KR | 20160121552 A | 10/2016 |
| KR | 20170067873 A | 6/2017 |
| KR | 20170107283 A | 9/2017 |
| KR | 101790147 B1 | 10/2017 |
| WO | 9527341 A1 | 10/1995 |
| WO | 2006086504 A2 | 8/2006 |
| WO | 2008109248 A2 | 9/2008 |
| WO | 2009042313 A1 | 4/2009 |
| WO | 2010104879 A2 | 9/2010 |
| WO | 2011070554 A2 | 6/2011 |
| WO | 2012155157 A1 | 11/2012 |
| WO | 2014130871 A1 | 8/2014 |
| WO | 2014186370 A1 | 11/2014 |
| WO | 2014194257 A1 | 12/2014 |
| WO | 2014197443 A1 | 12/2014 |
| WO | 2015027089 A1 | 2/2015 |
| WO | 2015073713 A1 | 5/2015 |
| WO | 2015081113 A1 | 6/2015 |
| WO | 2015100172 A1 | 7/2015 |
| WO | 2015123445 A1 | 8/2015 |
| WO | 2015184760 A1 | 12/2015 |
| WO | 2015192117 A1 | 12/2015 |
| WO | 2015199747 A1 | 12/2015 |
| WO | 2016041088 A1 | 3/2016 |
| WO | 2017062544 A1 | 4/2017 |
| WO | 2017075611 A1 | 5/2017 |
| WO | 2017092225 A1 | 6/2017 |
| WO | 2017120669 A1 | 7/2017 |
| WO | 2017172185 A1 | 10/2017 |
| WO | 2017208167 A1 | 12/2017 |
| WO | 2018022602 A1 | 2/2018 |
| WO | 2018098046 A2 | 5/2018 |
| WO | 2019099758 A1 | 5/2019 |
| WO | 2019147953 A1 | 8/2019 |
| WO | 2019147958 A1 | 8/2019 |
| WO | 2019147996 A1 | 8/2019 |
| WO | 2019217419 A2 | 11/2019 |
| WO | 2019226259 A1 | 11/2019 |
| WO | 2019231911 A1 | 12/2019 |
| WO | 2020047429 A1 | 3/2020 |
| WO | 2020061440 A1 | 3/2020 |
| WO | 2020061451 A1 | 3/2020 |
| WO | 2020072915 A1 | 4/2020 |

OTHER PUBLICATIONS

Al-Timemy A.H., et al., "Improving the Performance Against Force Variation of EMG Controlled Multifunctional Upper-Limb Prostheses for Transradial Amputees," IEEE Transactions on Neural Systems and Rehabilitation Engineering, Jun. 2016, vol. 24 (6), 12 Pages.
Morris D., et al., "Emerging Input Technologies for Always-Available Mobile Interaction," Foundations and Trends in Human-Computer Interaction, 2010, vol. 4 (4), pp. 245-316.
Naik G.R., et al., "Source Separation and Identification issues in Bio Signals: A Solution using Blind Source Separation," Chapter 4 of Recent Advances in Biomedical Engineering, Intech, 2009, 23 pages.
Naik G.R., et al., "Real-Time Hand Gesture Identification for Human Computer Interaction Based on ICA of Surface Electromyogram," IADIS International Conference Interfaces and Human Computer Interaction, 2007, pp. 83-90.
Naik G.R., et al., "Subtle Hand Gesture Identification for HCI Using Temporal Decorrelation Source Separation BSS of Surface EMG," Digital Image Computing Techniques and Applications, IEEE Computer Society, 2007, pp. 30-37.
Negro F., et al., "Multi-Channel Intramuscular and Surface EMG Decomposition by Convolutive Blind Source Separation," Journal of Neural Engineering, Feb. 29, 2016, vol. 13, 18 Pages.
Non-Final Office Action dated Mar. 2, 2021 for U.S. Appl. No. 15/974,430, filed May 8, 2018, 32 Pages.
Non-Final Office Action dated Sep. 2, 2020 for U.S. Appl. No. 15/882,858, filed Jan. 29, 2018, 66 Pages.
Non-Final Office Action dated Aug. 3, 2020 for U.S. Appl. No. 16/593,446, filed Oct. 4, 2019, 44 pages.
Non-Final Office Action dated Jun. 3, 2021 for U.S. Appl. No. 15/816,435, filed Nov. 17, 2017, 32 Pages.
Non-Final Office Action dated Jun. 5, 2020 for U.S. Appl. No. 15/659,072, filed Jul. 25, 2017, 59 Pages.
Non-Final Office Action dated Feb. 8, 2021 for U.S. Appl. No. 16/557,342, filed Aug. 30, 2019, 11 Pages.
Non-Final Office Action dated Oct. 8, 2020 for U.S. Appl. No. 16/577,207, filed Sep. 20, 2019, 51 Pages.
Non-Final Office Action dated Aug. 11, 2021 for U.S. Appl. No. 16/577,207, filed Sep. 20, 2019, 35 Pages.
Non-Final Office Action dated Jun. 13, 2019 for U.S. Appl. No. 16/258,279, filed Jan. 25, 2019, 38 Pages.
Non-Final Office Action dated Jun. 15, 2020 for U.S. Appl. No. 16/557,342, filed Aug. 30, 2019, 46 Pages.
Non-Final Office Action dated Jan. 16, 2020 for U.S. Appl. No. 16/389,419, filed Apr. 19, 2019, 26 Pages.
Non-Final Office Action dated May 16, 2019 for U.S. Appl. No. 15/974,384, filed May 8, 2018, 13 Pages.
Non-Final Office Action dated May 16, 2019 for U.S. Appl. No. 15/974,430, filed May 8, 2018, 12 Pages.
Non-Final Office Action dated Nov. 19, 2019 for U.S. Appl. No. 16/577,207, filed Sep. 20, 2019, 32 Pages.
Non-Final Office Action dated Aug. 20, 2020 for U.S. Appl. No. 15/974,454, filed May 8, 2018, 59 Pages.
Non-Final Office Action dated Dec. 20, 2019 for U.S. Appl. No. 15/974,454, filed May 8, 2018, 41 Pages.
Non-Final Office Action dated Jan. 22, 2020 for U.S. Appl. No. 15/816,435, filed Nov. 17, 2017, 35 Pages.
Non-Final Office Action dated Oct. 22, 2019 for U.S. Appl. No. 16/557,342, filed Aug. 30, 2019, 16 Pages.
Non-Final Office Action dated Dec. 23, 2019 for U.S. Appl. No. 16/557,383, filed Aug. 30, 2019, 53 Pages.
Non-Final Office Action dated Dec. 23, 2019 for U.S. Appl. No. 16/557,427, filed Aug. 30, 2019, 52 Pages.
Non-Final Office Action dated Feb. 23, 2017 for U.S. Appl. No. 14/505,836, filed Oct. 3, 2014, 54 Pages.
Non-Final Office Action dated Jul. 23, 2020 for U.S. Appl. No. 16/593,446, filed Oct. 4, 2019, 28 pages.
Non-Final Office Action dated May 24, 2019 for U.S. Appl. No. 16/353,998, filed Mar. 14, 2019, 20 Pages.
Non-Final Office Action dated May 26, 2020 for U.S. Appl. No. 16/353,998, filed Mar. 14, 2019, 60 Pages.
Non-Final Office Action dated Nov. 27, 2020 for U.S. Appl. No. 16/258,279, filed Jan. 25, 2019, 44 Pages.

(56) References Cited

OTHER PUBLICATIONS

Non-Final Office Action dated Apr. 30, 2019 for U.S. Appl. No. 15/659,072, filed Jul. 25, 2017, 99 Pages.
Non-Final Office Action dated Apr. 30, 2020 for U.S. Appl. No. 15/974,430, filed May 8, 2018, 57 Pages.
Non-Final Office Action dated Dec. 30, 2019 for U.S. Appl. No. 16/593,446, filed Oct. 4, 2019, 43 pages.
Non-Final Office Action dated Jun. 30, 2016 for U.S. Appl. No. 14/505,836, filed Oct. 3, 2014, 37 Pages.
Non-Final Office Action dated Oct. 30, 2019 for U.S. Appl. No. 15/882,858, filed Jan. 29, 2018, 22 Pages.
Notice of Allowance dated Nov. 2, 2020 for U.S. Appl. No. 15/974,454, filed May 8, 2018, 24 Pages.
Notice of Allowance dated Nov. 4, 2019 for U.S. Appl. No. 15/974,384, filed May 8, 2018, 39 Pages.
Notice of Allowance dated Feb. 9, 2022 for U.S. Appl. No. 15/882,858, filed Jan. 29, 2018, 9 pages.
Notice of Allowance dated Nov. 10, 2021 for U.S. Appl. No. 15/882,858, filed Jan. 29, 2018, 6 pages.
Notice of Allowance dated Jul. 15, 2021 for U.S. Appl. No. 15/882,858, filed Jan. 29, 2018, 2 pages.
Notice of Allowance dated Dec. 16, 2020 for U.S. Appl. No. 16/593,446, filed Oct. 4, 2019, 44 pages.
Notice of Allowance dated May 18, 2020 for U.S. Appl. No. 16/258,279, filed Jan. 25, 2019, 42 Pages.
Notice of Allowance dated Aug. 19, 2020 for U.S. Appl. No. 16/557,427, filed Aug. 30, 2019, 22 Pages.
Notice of Allowance dated May 20, 2020 for U.S. Appl. No. 16/389,419, filed Apr. 19, 2019, 28 Pages.
Notice of Allowance dated Oct. 22, 2021 for U.S. Appl. No. 15/882,858, filed Jan. 29, 2018, 8 pages.
Notice of Allowance dated Aug. 23, 2021 for U.S. Appl. No. 15/974,430, filed May 8, 2018, 12 pages.
Notice of Allowance dated Dec. 23, 2020 for U.S. Appl. No. 15/659,072, filed Jul. 25, 2017, 26 Pages.
Notice of Allowance dated Jun. 28, 2021 for U.S. Appl. No. 15/882,858, filed Jan. 29, 2018, 18 pages.
Office action for European Application No. 17835112.8, dated Feb. 11, 2022, 11 Pages.
Partial Supplementary European Search Report for European Application No. 18879156.0, dated Dec. 7, 2020, 9 pages.
International Search Report and Written Opinion for International Application No. PCT/US2014/052143, dated Nov. 21, 2014, 8 Pages.
International Search Report and Written Opinion for International Application No. PCT/US2014/067443, dated Feb. 27, 2015, 8 pages.
International Search Report and Written Opinion for International Application No. PCT/US2015/015675, dated May 27, 2015, 9 Pages.
International Search Report and Written Opinion for International Application No. PCT/US2017/043686, dated Oct. 6, 2017, 9 Pages.
International Search Report and Written Opinion for International Application No. PCT/US2017/043693, dated Oct. 6, 2017, 7 Pages.
International Search Report and Written Opinion for International Application No. PCT/US2017/043791, dated Oct. 5, 2017, 10 Pages.
International Search Report and Written Opinion for International Application No. PCT/US2018/056768, dated Jan. 15, 2019, 8 pages.
International Search Report and Written Opinion for International Application No. PCT/US2018/061409, dated Mar. 12, 2019, 11 pages.
International Search Report and Written Opinion for International Application No. PCT/US2018/063215, dated Mar. 21, 2019, 17 Pages.
International Search Report and Written Opinion for International Application No. PCT/US2019/015167, dated May 21, 2019, 7 Pages.
International Search Report and Written Opinion for International Application No. PCT/US2019/015174, dated May 21, 2019, 8 pages.
International Search Report and Written Opinion for International Application No. PCT/US2019/015244, dated May 16, 2019, 8 Pages.
International Search Report and Written Opinion for International Application No. PCT/US2019/020065, dated May 16, 2019, 10 Pages.
International Search Report and Written Opinion for International Application No. PCT/US2019/028299, dated Aug. 9, 2019, 12 pages.
International Search Report and Written Opinion for International Application No. PCT/US2019/031114, dated Dec. 20, 2019, 18 Pages.
International Search Report and Written Opinion for International Application No. PCT/US2019/034173, dated Sep. 18, 2019, 10 Pages.
International Search Report and Written Opinion for International Application No. PCT/US2019/037302, dated Oct. 11, 2019, 13 Pages.
International Search Report and Written Opinion for International Application No. PCT/US2019/042579, dated Oct. 31, 2019, 8 Pages.
International Search Report and Written Opinion for International Application No. PCT/US2019/046351, dated Nov. 7, 2019, 9 pages.
International Search Report and Written Opinion for International Application No. PCT/US2019/049094, dated Jan. 9, 2020, 27 Pages.
International Search Report and Written Opinion for International Application No. PCT/US2019/052131, dated Dec. 6, 2019, 8 pages.
International Search Report and Written Opinion for International Application No. PCT/US2019/052151, dated Jan. 15, 2020, 10 pages.
International Search Report and Written Opinion for International Application No. PCT/US2019/054716, dated Dec. 20, 2019, 11 Pages.
International Search Report and Written Opinion for International Application No. PCT/US2019/061759, dated Jan. 29, 2020, 12 pages.
International Search Report and Written Opinion for International Application No. PCT/US2020/025735, dated Jun. 22, 2020, 10 pages.
International Search Report and Written Opinion for International Application No. PCT/US2020/025772, dated Aug. 3, 2020, 11 pages.
International Search Report and Written Opinion for International Application No. PCT/US2020/025797, dated Jul. 9, 2020, 10 pages.
International Search Report and Written Opinion for International Application No. PCT/US2020/049274, dated Feb. 1, 2021, 17 pages.
International Search Report and Written Opinion for International Application No. PCT/US2020/061392, dated Mar. 12, 2021, 12 pages.
International Search Report and Written Opinion for International Application No. PCT/US2017/043792, dated Oct. 5, 2017, 9 Pages.
International Search Report and Written Opinion for International Application No. PCT/US2019/015134, dated May 15, 2019, 11 Pages.
International Search Report and Written Opinion for International Application No. PCT/US2019/015180, dated May 28, 2019, 10 Pages.
International Search Report and Written Opinion for International Application No. PCT/US2019/015183, dated May 3, 2019, 8 Pages.
International Search Report and Written Opinion for International Application No. PCT/US2019/015238, dated May 16, 2019, 8 Pages.
Invitation to Pay Additional Fees for International Application No. PCT/US2019/031114, mailed Aug. 6, 2019, 7 pages.
Invitation to Pay Additional Fees for International Application No. PCT/US2019/049094, mailed Oct. 24, 2019, 2 Pages.
Jiang H., "Effective and Interactive Interpretation of Gestures by Individuals with Mobility Impairments," Thesis/Dissertation Accep-

(56) References Cited

OTHER PUBLICATIONS tance, Purdue University Graduate School, Graduate School Form 30, Updated on Jan. 15, 2015, 24 pages.
Kainz et al., "Approach to Hand Tracking and Gesture Recognition Based on Depth-Sensing Cameras and EMG Monitoring," ACTA Informatica Pragensia, vol. 3, Jan. 1, 2014, pp. 104-112, Retrieved from the Internet: URL: https://aip.vse.cz/pdfs/aip/2014/01/08.pdf.
Kawaguchi J., et al., "Estimation of Finger Joint Angles Based on Electromechanical Sensing of Wrist Shape," IEEE Transactions on Neural Systems and Rehabilitation Engineering, Sep. 2017, vol. 25 (9), pp. 1409-1418.
Kim H., et al., "Real-Time Human Pose Estimation and Gesture Recognition from Depth Images Using Superpixels and SVM Classifier," Sensors, 2015, vol. 15, pp. 12410-12427.
Kipke D.R., et al., "Silicon-Substrate Intracortical Microelectrode Arrays for Long-Term Recording of Neuronal Spike Activity in Cerebral Cortex," IEEE Transactions on Neural Systems and Rehabilitation Engineering, Jun. 2003, vol. 11 (2), 5 pages, Retrieved on Oct. 7, 2019 [Oct. 7, 2019] Retrieved from the Internet: URL: https://www.ece.uvic.ca/bctill/papers/neurimp/Kipke_etal_2003_01214707.pdf.
Koerner M.D., "Design and Characterization of the Exo-Skin Haptic Device: A Novel Tendon Actuated Textile Hand Exoskeleton," Abstract of thesis for Drexel University Masters Degree [online], Nov. 2, 2017, 5 pages, Retrieved from the Internet: URL: https://dialog.proquest.com/professional/docview/1931047627?accountid=153692.
Lee D.C., et al., "Motion and Force Estimation System of Human Fingers," Journal of Institute of Control, Robotics and Systems, 2011, vol. 17 (10), pp. 1014-1020.
Li Y., et al., "Motor Function Evaluation of Hemiplegic Upper-Extremities Using Data Fusion from Wearable Inertial and Surface EMG Sensors," Sensors, MDPI, 2017, vol. 17 (582), pp. 1-17.
Lopes J., et al., "Hand/Arm Gesture Segmentation by Motion Using IMU and EMG Sensing," ScienceDirect, Jun. 27-30, 2017, vol. 11, pp. 107-113.
Marcard T.V., et al., "Sparse Inertial Poser: Automatic 3D Human Pose Estimation from Sparse IMUs," arxiv.org, Computer Graphics Forum, 2017, vol. 36 (2), 12 pages, XP080759137.
Martin H., et al., "A Novel Approach of Prosthetic Arm Control using Computer Vision, Biosignals, and Motion Capture," IEEE Symposium on Computational Intelligence in Robotic Rehabilitation and Assistive Technologies (CIR2AT), 2014, 5 pages.
McIntee S.S., "A Task Model of Free-Space Movement-Based Geastures," Dissertation, Graduate Faculty of North Carolina State University, Computer Science, 2016, 129 pages.
Mendes Jr.J.J.A., et al., "Sensor Fusion and Smart Sensor in Sports and Biomedical Applications," Sensors, 2016, vol. 16 (1569), pp. 1-31.
Mohamed O.H., "Homogeneous Cognitive Based Biometrics for Static Authentication," Dissertation submitted to University of Victoria, Canada, 2010, [last accessed Oct. 11, 2019], 149 pages, Retrieved from the Internet: URL: http://hdl.handle.net/1828/321.
Extended European Search Report for European Application No. 19855191.3, dated Dec. 6, 2021, 11 pages.
Extended European Search Report for European Application No. 19883839.3, dated Dec. 15, 2021, 7 pages.
Farina D., et al., "Man/Machine Interface Based on the Discharge Timings of Spinal Motor Neurons After Targeted Muscle Reinnervation," Nature Biomedical Engineering, Feb. 6, 2017, vol. 1, Article No. 0025, pp. 1-12.
Favorskaya M., et al., "Localization and Recognition of Dynamic Hand Gestures Based on Hierarchy of Manifold Classifiers," International Archives of the Photogrammetry, Remote Sensing and Spatial Information Sciences, May 25-27, 2015, vol. XL-5/W6, pp. 1-8.
Final Office Action dated Jun. 2, 2020 for U.S. Appl. No. 15/882,858, filed Jan. 29, 2018, 127 Pages.
Final Office Action dated Jun. 2, 2020 for U.S. Appl. No. 16/557,383, filed Aug. 30, 2019, 66 Pages.
Final Office Action dated Nov. 3, 2020 for U.S. Appl. No. 15/974,430, filed May 8, 2018, 27 Pages.
Final Office Action dated Feb. 4, 2020 for U.S. Appl. No. 16/577,207, filed Sep. 20, 2019, 76 Pages.
Final Office Action dated Feb. 4, 2021 for U.S. Appl. No. 15/882,858, filed Jan. 29, 2018, 42 Pages.
Final Office Action dated Jun. 5, 2020 for U.S. Appl. No. 16/557,427, filed Aug. 30, 2019, 95 Pages.
Final Office Action dated Oct. 8, 2020 for U.S. Appl. No. 16/557,342, filed Aug. 30, 2019, 73 Pages.
Final Office Action dated Apr. 9, 2020 for U.S. Appl. No. 15/974,454, filed May 8, 2018, 19 Pages.
Final Office Action dated Dec. 11, 2019 for U.S. Appl. No. 15/974,430, filed May 8, 2018, 30 Pages.
Final Office Action dated Jan. 13, 2021 for U.S. Appl. No. 16/577,207, filed Sep. 20, 2019, 91 Pages.
Final Office Action dated Dec. 18, 2019 for U.S. Appl. No. 16/258,279, filed Jan. 25, 2019, 45 Pages.
Final Office Action dated Feb. 19, 2021 for U.S. Appl. No. 16/258,279, filed Jan. 25, 2019, 58 Pages.
Final Office Action dated Sep. 23, 2020 for U.S. Appl. No. 15/816,435, filed Nov. 17, 2017, 70 Pages.
Final Office Action dated Jan. 28, 2020 for U.S. Appl. No. 16/557,342, filed Aug. 30, 2019, 15 Pages.
Final Office Action dated Jul. 28, 2017 for U.S. Appl. No. 14/505,836, filed Oct. 3, 2014, 52 Pages.
Final Office Action dated Jun. 28, 2021 for U.S. Appl. No. 16/557,342, filed Aug. 30, 2019, 11 Pages.
Final Office Action dated Nov. 29, 2019 for U.S. Appl. No. 15/659,072, filed Jul. 25, 2017, 36 Pages.
Final Office Action dated Nov. 29, 2019 for U.S. Appl. No. 16/353,998, filed Mar. 14, 2019, 33 Pages.
Fong H.C., et al., "PepperGram With Interactive Control," 22nd International Conference Onvirtual System & Multimedia (VSMM), Oct. 17, 2016, 5 pages.
Gallina A., et al., "Surface EMG Biofeedback," Surface Electromyography: Physiology, Engineering, and Applications, 2016, pp. 485-500.
Ghasemzadeh H., et al., "A Body Sensor Network With Electromyogram and Inertial Sensors: Multimodal Interpretation of Muscular Activities," IEEE Transactions on Information Technology in Biomedicine, Mar. 2010, vol. 14 (2), pp. 198-206.
Gopura R.A.R.C., et al., "A Human Forearm and Wrist Motion Assist Exoskeleton Robot With EMG-Based Fuzzy-Neuro Control," Proceedings of the 2nd Biennial IEEE/RAS-EMBS International Conference on Biomedical Robotics and Biomechatronics, Oct. 19-22, 2008, 6 pages.
Gourmelon L., et al., "Contactless Sensors for Surface Electromyography," Proceedings of the 28th IEEE EMBS Annual International Conference, New York City, NY, Aug. 30-Sep. 3, 2006, pp. 2514-2517.
Hauschild M., et al., "A Virtual Reality Environment for Designing and Fitting Neural Prosthetic Limbs," IEEE Transactions on Neural Systems and Rehabilitation Engineering, Mar. 2007, vol. 15 (1), pp. 9-15.
International Search Report and Written Opinion for International Application No. PCT/US2014/017799, dated May 16, 2014, 9 pages.
International Search Report and Written Opinion for International Application No. PCT/US2014/037863, dated Aug. 21, 2014, 10 pages.
International Preliminary Report on Patentability for International Application No. PCT/US2017/043693, dated Feb. 7, 2019, 7 Pages.
International Preliminary Report on Patentability for International Application No. PCT/US2017/043791, dated Feb. 7, 2019, 9 Pages.
International Preliminary Report on Patentability for International Application No. PCT/US2019/031114, dated Nov. 19, 2020, 16 pages.
International Preliminary Report on Patentability for International Application No. PCT/US2019/049094, dated Mar. 11, 2021, 24 Pages.
International Preliminary Report on Patentability for International Application No. PCT/US2019/052151, dated Apr. 1, 2021, 9 pages.

(56) References Cited

OTHER PUBLICATIONS

International Preliminary Report on Patentability for International Application No. PCT/US2014/017799, dated Sep. 3, 2015, 8 Pages.
International Preliminary Report on Patentability for International Application No. PCT/US2014/037863, dated Nov. 26, 2015, 8 pages.
International Preliminary Report on Patentability for International Application No. PCT/US2014/052143, dated Mar. 3, 2016, 7 pages.
International Preliminary Report on Patentability for International Application No. PCT/US2014/067443, dated Jun. 9, 2016, 7 pages.
International Preliminary Report on Patentability for International Application No. PCT/US2015/015675, dated Aug. 25, 2016, 8 Pages.
International Preliminary Report on Patentability for International Application No. PCT/US2017/043686, dated Feb. 7, 2019, 8 pages.
International Preliminary Report on Patentability for International Application No. PCT/US2017/043792, dated Feb. 7, 2019, 8 Pages.
International Preliminary Report on Patentability for International Application No. PCT/US2018/061409, dated May 28, 2020, pages.
International Preliminary Report on Patentability for International Application No. PCT/US2019/015174, dated Aug. 6, 2020, 7 pages.
International Preliminary Report on Patentability for International Application No. PCT/US2019/028299, dated Dec. 10, 2020, 11 pages.
International Preliminary Report on Patentability for International Application No. PCT/US2019/046351, dated Feb. 25, 2021, 8 pages.
International Preliminary Report on Patentability for International Application No. PCT/US2019/052131, dated Apr. 1, 2021, 8 pages.
International Preliminary Report on Patentability for International Application No. PCT/US2019/054716, dated Apr. 15, 2021, 10 pages.
International Preliminary Report on Patentability for International Application No. PCT/US2019/061759, dated May 27, 2021, 12 pages.
International Preliminary Report on Patentability for International Application No. PCT/US2020/049274, dated Mar. 17, 2022, 14 pages.
Ali B., et al., "Spectral Collaborative Representation based Classification for Hand Gestures Recognition on Electromyography Signals," Biomedical Signal Processing and Control, 2016, vol. 24, pp. 11-18.
Al-Jumaily A., et al., "Electromyogram(EMG) Driven System based Virtual Reality for Prosthetic and Rehabilitation Devices," Proceedings of the 11th Internationalconference on Information Integration Andweb-Based Applications & Services, Jan. 1, 2009, pp. 582-586.
Al-Mashhadany Y.I., "Inverse Kinematics Problem (IKP) of 6-DOF Manipulator by Locally Recurrent Neural Networks (LRNNs)," Management and Service Science (MASS), International Conference on Management and Service Science., IEEE, Aug. 24, 2010, 5 pages.
Arkenbout E.A., et al., "Robust Hand Motion Tracking through Data Fusion of 5DT Data Glove and Nimble VR Kinect Camera Measurements," Sensors, 2015, vol. 15, pp. 31644-31671.
Benko H., et al., "Enhancing Input on and Above the Interactive Surface with Muscle Sensing," The ACM International Conference on Interactive Tabletops and Surfaces (ITS), Nov. 23-25, 2009, pp. 93-100.
Berenzweig A., et al., "Wearable Devices and Methods for Improved Speech Recognition," U.S. Appl. No. 16/785,680, filed Feb. 10, 2020, 67 pages.
Boyali A., et al., "Spectral Collaborative Representation based Classification for Hand Gestures Recognition on Electromyography Signals," Biomedical Signal Processing and Control, 2016, vol. 24, pp. 11-18.
Brownlee J., "Finite State Machines (FSM): Finite State Machines as a Control Technique in Artificial Intelligence (AI)," FSM, Jun. 2002, 12 pages.
Cannan J., et al., "A Wearable Sensor Fusion Armband for Simple Motion Control and Selection for Disabled and Non-Disabled Users," Computer Science and Electronic Engineering Conference, IEEE, Sep. 12, 2012, pp. 216-219, XP032276745.
Cheng J., et al., "A Novel Phonology- and Radical-Coded Chinese Sign Language Recognition Framework Using Accelerometer and Surface Electromyography Sensors," Sensors, 2015, vol. 15, pp. 23303-23324.
Communication Pursuant to Article 94(3) for European Patent Application No. 17835112.8, dated Dec. 14, 2020, 6 Pages.
Communication Pursuant to Rule 164(1) EPC, Partial Supplementary European Search Report for European Application No. 14753949. 8, dated Sep. 30, 2016, 7 pages.
Co-pending U.S. Appl. No. 15/659,072, inventors Patrick; Kaifosh et al., filed Jul. 25, 2017.
Co-pending U.S. Appl. No. 15/816,435, inventors Ning; Guo et al., filed Nov. 17, 2017.
Co-pending U.S. Appl. No. 15/882,858, inventors Stephen; Lake et al., filed Jan. 29, 2018.
Co-pending U.S. Appl. No. 15/974,430, inventors Adam; Berenzweig et al., filed May 8, 2018.
Co-pending U.S. Appl. No. 16/353,998, inventors Patrick; Kaifosh et al., filed Mar. 14, 2019.
Co-pending U.S. Appl. No. 16/557,383, inventors Adam; Berenzweig et al., filed Aug. 30, 2019.
Co-pending U.S. Appl. No. 16/557,427, inventors Adam; Berenzweig et al., filed Aug. 30, 2019.
Co-Pending U.S. Appl. No. 15/974,430, filed May 8, 2018, 44 Pages.
Co-Pending U.S. Appl. No. 16/353,998, filed Mar. 14, 2019, 43 pages.
Co-Pending U.S. Appl. No. 16/557,383, filed Aug. 30, 2019, 94 Pages.
Co-Pending U.S. Appl. No. 16/557,427, filed Aug. 30, 2019, 93 Pages.
Co-Pending U.S. Appl. No. 16/577,207, filed Sep. 20, 2019, 67 Pages.
Co-Pending U.S. Appl. No. 14/505,836, filed Oct. 3, 2014, 59 Pages.
Co-Pending U.S. Appl. No. 15/816,435, filed Nov. 17, 2017, 24 Pages.
Co-Pending U.S. Appl. No. 15/882,858, filed Jan. 29, 2018, 54 Pages.
Co-Pending U.S. Appl. No. 15/974,384, filed May 8, 2018, 44 Pages.
Co-Pending U.S. Appl. No. 15/974,454, filed May 8, 2018, 45 Pages.
Co-Pending U.S. Appl. No. 16/557,342, filed Aug. 30, 2019, 93 Pages.
Corazza S., et al.,"A Markerless Motion Capture System to Study Musculoskeletal Biomechanics: Visual Hull and Simulated Annealing Approach," Annals of Biomedical Engineering, Jul. 2006, vol. 34 (6), pp. 1019-1029, [Retrieved on Dec. 11, 2019], 11 pages, Retrieved from the Internet: URL: https://www.researchgate.net/publication/6999610_A_Markerless_Motion_Capture_System_to_Study_Musculoskeletal_Biomechanics_Visual_Hull_and_Simulated_Annealing_Approach.
Costanza E., et al., "EMG as a Subtle Input Interface for Mobile Computing," Mobile HCI, LNCS 3160, 2004, pp. 426-430.
Costanza E., et al., "Toward Subtle Intimate Interfaces for Mobile Devices Using an EMG Controller," CHI, Proceedings of the SIGCHI Conference on Human Factors in Computing Systems, Apr. 2-7, 2005, pp. 481-489.
Cote-Allard U., et al., "Deep Learning for Electromyographic Hand Gesture Signal Classification Using Transfer Learning," IEEE Transactions on Neural Systems and Rehabilitation Engineering, Jan. 26, 2019, vol. 27 (4), 11 Pages.
Csapo A.B., et al., "Evaluation of Human-Myo Gesture Control Capabilities in Continuous Search and Select Operations," 7th IEEE International Conference on Cognitive Infocommunications, Oct. 16-18, 2016, pp. 000415-000420.
Davoodi R., et al., "Development of a Physics-Based Target Shooting Game to Train Amputee Users of Multi joint Upper Limb Prostheses," Presence, Massachusetts Institute of Technology, 2012, vol. 21 (1), pp. 85-95.

(56) References Cited

OTHER PUBLICATIONS

Delis A.L., et al., "Development of a Myoelectric Controller Based on Knee Angle Estimation," Biodevices, International Conference on Biomedical Electronics and Devices, Jan. 17, 2009, 7 pages.
Diener L., et al., "Direct Conversion From Facial Myoelectric Signals to Speech Using Deep Neural Networks," International Joint Conference on Neural Networks (IJCNN), Oct. 1, 2015, 7 pages.
Ding I-J., et al., "HMM with Improved Feature Extraction-Based Feature Parameters for Identity Recognition of Gesture Command Operators by Using a Sensed Kinect-Data Stream," Neurocomputing, 2017, vol. 262, pp. 108-119.
European Search Report for European Application No. 19861903.3, dated Oct. 12, 2021, 2 pages.
European Search Report for European Application No. 19863248.1, dated Oct. 19, 2021, 2 pages.
European Search Report for European Application No. 19868789.9, dated May 9, 2022, 9 pages.
Extended European Search Report for European Application No. 18879156.0, dated Mar. 12, 2021, 11 pages.
Extended European Search Report for European Application No. 19744404.5, dated Mar. 29, 2021, 11 pages.
Extended European Search Report for European Application No. 19799947.7, dated May 26, 2021, 10 pages.
Extended European Search Report for European Application No. 17835111.0, dated Nov. 21, 2019, 6 pages.
Extended European Search Report for European Application No. 17835112.8, dated Feb. 5, 2020, 17 pages.
Extended European Search Report for European Application No. 17835140.9, dated Nov. 26, 2019, 10 Pages.
Extended European Search Report for European Application No. 19806723.3, dated Jul. 7, 2021, 13 pages.
Extended European Search Report for European Application No. 19850130.6, dated Sep. 1, 2021, 14 Pages.
Picard R.W., et al., "Affective Wearables," Proceedings of the IEEE 1st International Symposium on Wearable Computers, ISWC, Cambridge, MA, USA, Oct. 13-14, 1997, pp. 90-97.
Preinterview First Office Action dated Jun. 24, 2020 for U.S. Appl. No. 16/785,680, filed Feb. 10, 2020, 90 Pages.
Rekimoto J., "GestureWrist and GesturePad: Unobtrusive Wearable Interaction Devices," ISWC Proceedings of the 5th IEEE International Symposium on Wearable Computers, 2001, 7 pages.
Saponas T.S., et al., "Demonstrating the Feasibility of Using Forearm Electromyography for Muscle-Computer Interfaces," CHI Proceedings, Physiological Sensing for Input, Apr. 5-10, 2008, pp. 515-524.
Saponas T.S., et al., "Enabling Always-Available Input with Muscle-Computer Interfaces," Conference: Proceedings of the 22nd Annual ACM Symposium on User Interface Software and Technology, Oct. 7, 2009, pp. 167-176.
Saponas T.S., et al., "Making Muscle-Computer Interfaces More Practical," CHI, Atlanta, Georgia, USA, Apr. 10-15, 2010, 4 pages.
Sartori M., et al., "Neural Data-Driven Musculoskeletal Modeling for Personalized Neurorehabilitation Technologies," IEEE Transactions on Biomedical Engineering, May 5, 2016, vol. 63 (5), pp. 879-893.
Sato M., et al., "Touche: Enhancing Touch Interaction on Humans, Screens, Liquids, and Everyday Objects," CHI, Austin, Texas, May 5-10, 2012, 10 pages.
Sauras-Perez P., et al., "A Voice and Pointing Gesture Interaction System for Supporting Human Spontaneous Decisions in Autonomous Cars," Clemson University, All Dissertations, May 2017, 174 pages.
Shen S., et al., "I am a Smartwatch and I Can Track My User's Arm," University of Illinois at Urbana-Champaign, MobiSys, Jun. 25-30, 2016, 12 pages.
Son M., et al., "EValuating the Utility of Two Gestural Discomfort Evaluation Methods," PLOS One, Apr. 19, 2017, 21 pages.
Strbac M., et al., "Microsoft Kinect-Based Artificial Perception System for Control of Functional Electrical Stimulation Assisted Grasping," Hindawi Publishing Corporation, BioMed Research International [online], 2014, Article No. 740469, 13 pages, Retrieved from the Internet: URL: https://dx.doi.org/101155/2014/740469.
Torres T., "Myo Gesture Control Armband," PCMag, Jun. 8, 2015, 9 pages, Retrieved from the Internet: URL: https://www.pcmag.com/article2/0,2817,2485462,00.asp.
Ueno A., et al., "A Capacitive Sensor System for Measuring Laplacian Electromyogram through Cloth: A Pilot Study," Proceedings of the 29th Annual International Conference of the IEEE EMBS, Cite Internationale, Lyon, France, Aug. 23-26, 2007, pp. 5731-5734.
Ueno A., et al., "Feasibility of Capacitive Sensing of Surface Electromyographic Potential through Cloth," Sensors and Materials, 2012, vol. 24 (6), pp. 335-346.
Valero-Cuevas F.J., et al., "Computational Models for Neuromuscular Function," IEEE Reviews in Biomedical Engineering, 2009, vol. 2, NIH Public Access Author Manuscript [online], Jun. 16, 2011 [Retrieved on Jul. 29, 2019], 52 pages, Retrieved from the Internet: URL: https://www.ncbi.nlm.nih.gov/pmc/articles/PMC3116649/.
Wittevrongel B., et al., "Spatiotemporal Beamforming: A Transparent and Unified Decoding Approach to Synchronous Visual Brain-Computer Interfacing," Frontiers in Neuroscience, Nov. 15, 2017, vol. 11, Article No. 630, 13 Pages.
Wodzinski M., et al., "Sequential Classification of Palm Gestures Based on A* Algorithm and MLP Neural Network for Quadrocopter Control," Metrology and Measurement Systems, 2017, vol. 24 (2), pp. 265-276.
Xiong A., et al., "A Novel HCI based on EMG and IMU," Proceedings of the 2011 IEEE International Conference on Robotics and Biomimetics, Phuket, Thailand, Dec. 7-11, 2011, pp. 2653-2657.
Xu Z., et al., "Hand Gesture Recognition and Virtual Game Control Based on 3D Accelerometer and EMG Sensors," Proceedings of the 14th International Conference on Intelligent User Interfaces, D211 Sanibel Island, Florida, Feb. 8-11, 2009, pp. 401-406.
Xue Y., et al., "Multiple Sensors Based Hand Motion Recognition Using Adaptive Directed Acyclic Graph," Applied Sciences, MDPI, 2017, vol. 7 (358), pp. 1-14.
Yang Z., et al., "Surface EMG Based Handgrip Force Predictions Using Gene Expression Programming," Neurocomputing, 2016, vol. 207, pp. 568-579.
Zacharaki E.I., et al., "Spike Pattern Recognition by Supervised Classification in Low Dimensional Embedding Space," Brain Informatics, 2016, vol. 3, pp. 73-83.
Zhang X., et al., "A Framework for Hand Gesture Recognition Based on Accelerometer and EMG Sensors," IEEE Transactions on Systems, Man, and Cybernetics—Part A: Systems and Humans, Nov. 2011, vol. 41 (6), pp. 1064-1076.
European Search Report for European Application No. 19890394.0, dated Apr. 29, 2022, 9 pages.
Extended European Search Report for European Application No. 19743717.1, dated Mar. 3, 2021, 12 pages.
Extended European Search Report for European Application No. 18869441.8, dated Nov. 17, 2020, 20 Pages.
International Preliminary Report on Patentability for International Application No. PCT/US2018/056768, dated Apr. 30, 2020, 7 pages.
International Preliminary Report on Patentability for International Application No. PCT/US2019/015183, dated Aug. 6, 2020, 7 pages.
International Preliminary Report on Patentability for International Application No. PCT/US2019/015238, dated Aug. 6, 2020, 7 pages.
International Preliminary Report on Patentability for International Application No. PCT/US2019/034173, dated Dec. 10, 2020, 9 pages.
International Preliminary Report on Patentability for International Application No. PCT/US2019/063587, dated Jun. 10, 2021, 13 pages.
International Search Report and Written Opinion for International Application No. PCT/US2019/063587, dated Mar. 25, 2020, 16 pages.
Non-Final Office Action dated Sep. 6, 2019 for U.S. Appl. No. 16/424,144, filed May 28, 2019, 11 Pages.

(56) References Cited

OTHER PUBLICATIONS

Non-Final Office Action dated Apr. 9, 2019 for U.S. Appl. No. 16/258,409, filed Jan. 25, 2019, 71 Pages.
Non-Final Office Action dated Apr. 29, 2019 for U.S. Appl. No. 16/257,979, filed Jan. 25, 2019, 63 Pages.
Notice of Allowance dated Feb. 6, 2020 for U.S. Appl. No. 16/424,144, filed May 28, 2019, 28 Pages.
Notice of Allowance dated May 18, 2022 for U.S. Appl. No. 15/882,858, filed Jan. 29, 2018, 10 pages.
Notice of Allowance dated Jul. 19, 2019 for U.S. Appl. No. 16/258,409, filed Jan. 25, 2019, 36 Pages.
Notice of Allowance dated Jul. 31, 2019 for U.S. Appl. No. 16/257,979, filed Jan. 25, 2019, 22 Pages.
Office Action for European Patent Application No. 19743717.1, dated Apr. 11, 2022, 10 pages.
International Preliminary Report on Patentability for International Application No. PCT/US2020/061392, dated Jun. 9, 2022, 11 pages.
Notice of Allowance dated Aug. 22, 2022 for U.S. Appl. No. 15/882,858, filed Jan. 29, 2018, 9 pages.

* cited by examiner

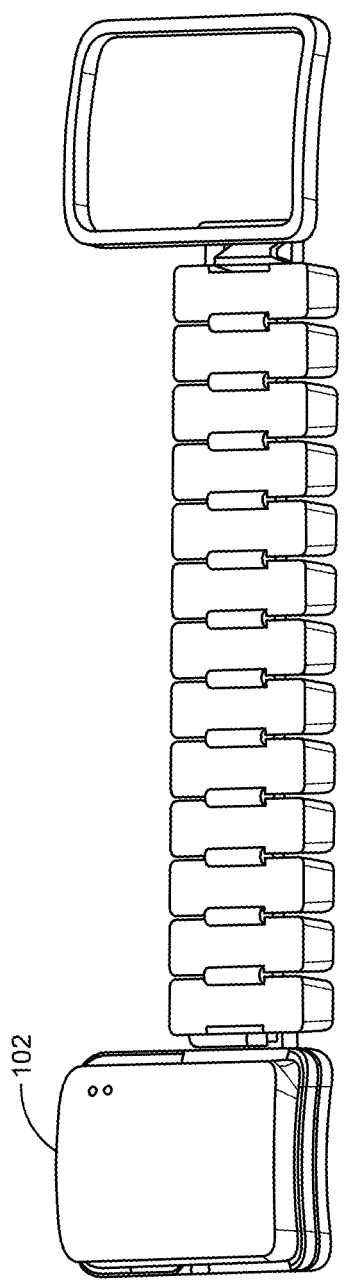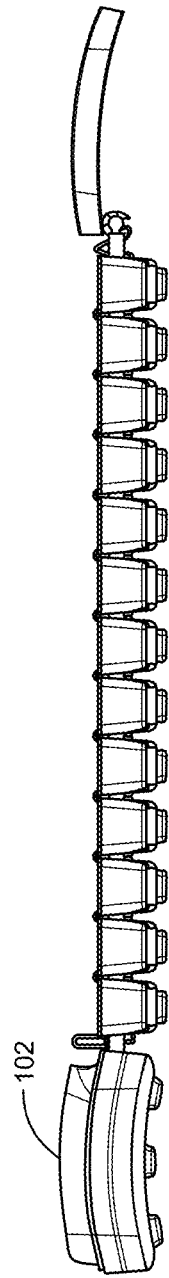

102

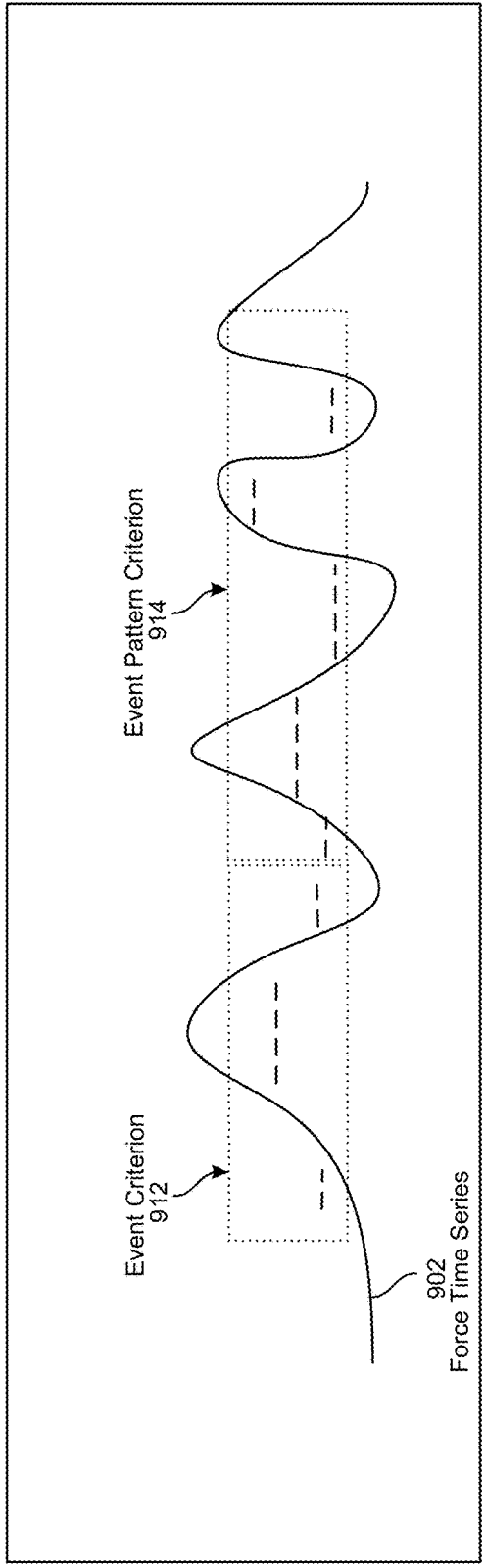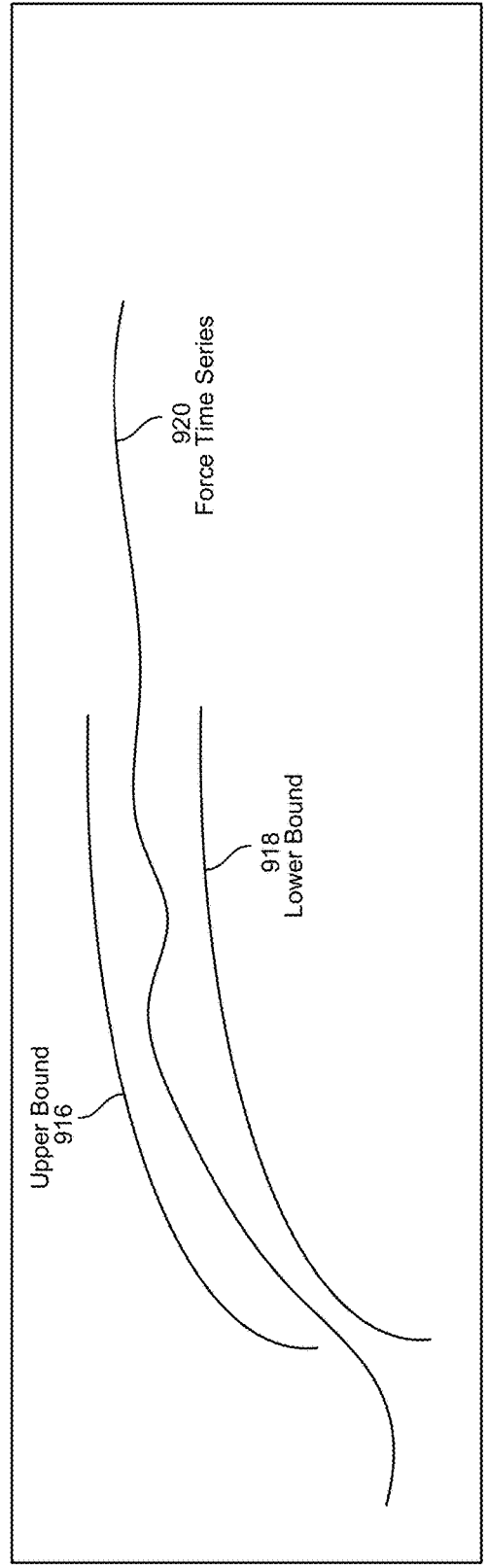

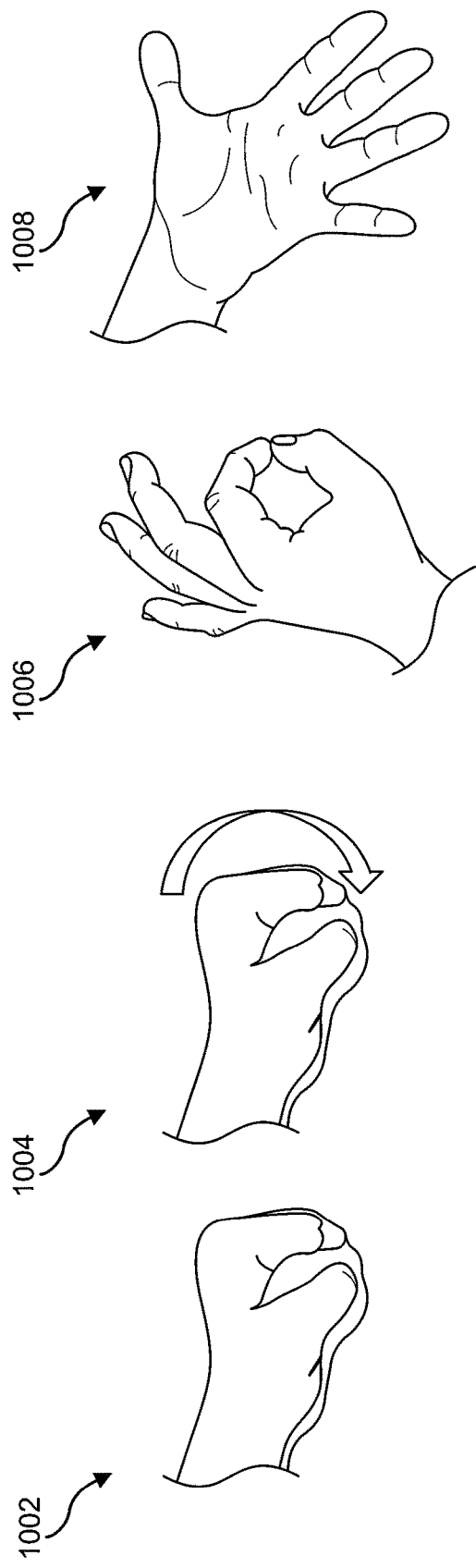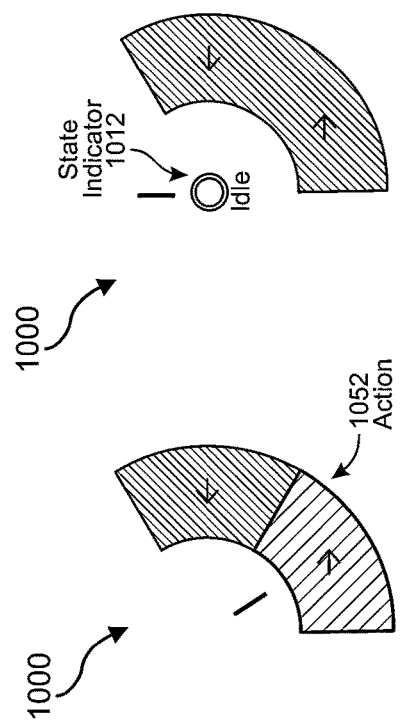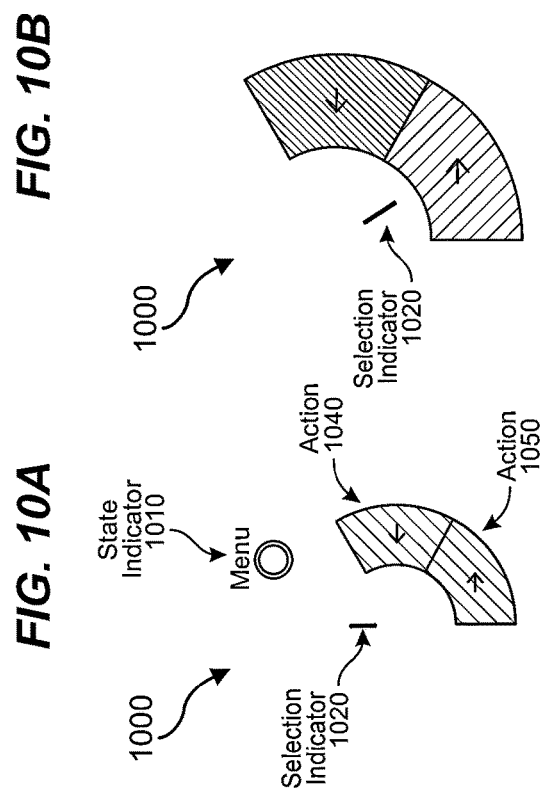

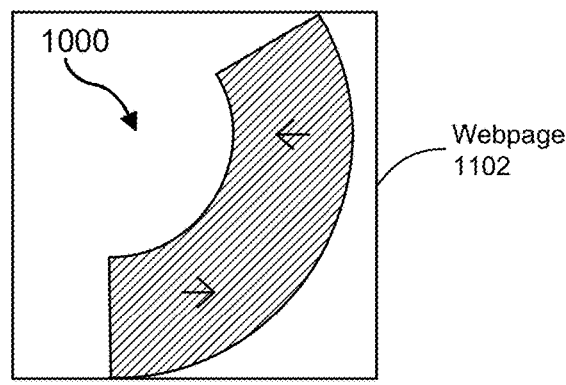
FIG. 11A
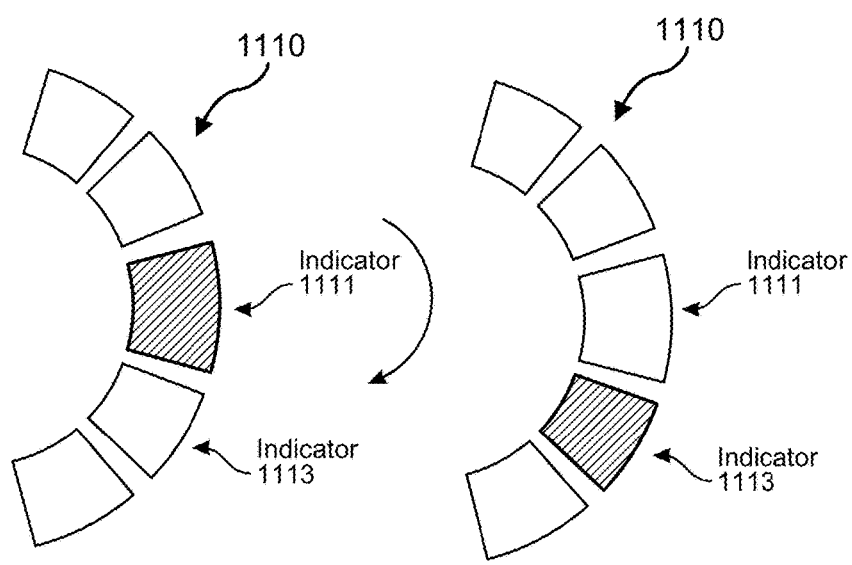
FIG. 11B     FIG. 11C
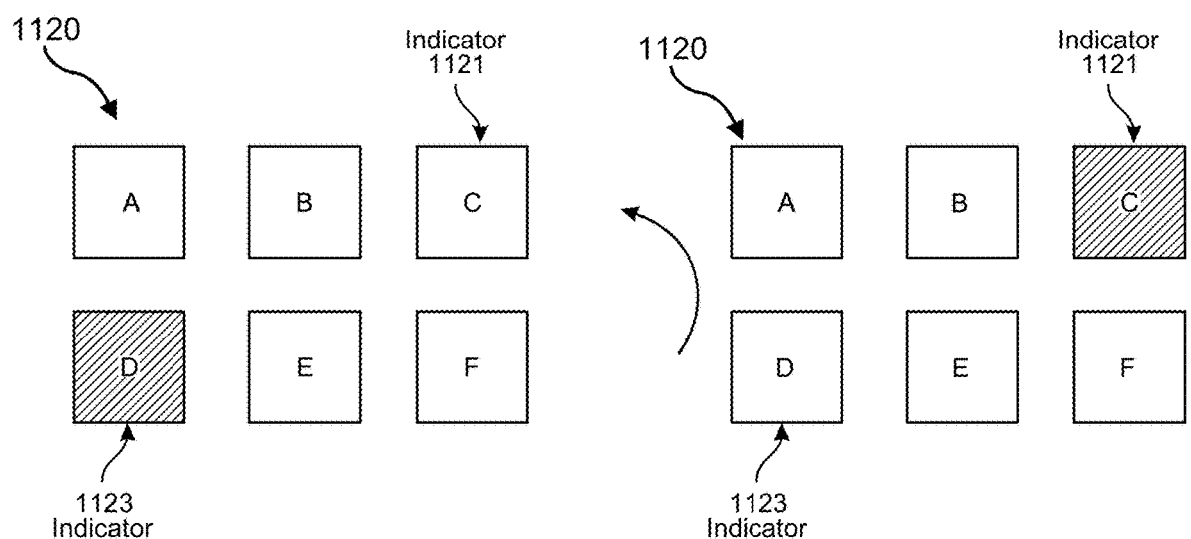
FIG. 11D     FIG. 11E

DEVICES, SYSTEMS, AND METHODS FOR CONTROLLING COMPUTING DEVICES VIA NEUROMUSCULAR SIGNALS OF USERS

CROSS-REFERENCE TO RELATED APPLICATIONS

This application is a continuation of U.S. application Ser. No. 16/863,098 filed 30 Apr. 2020, the disclosure of which is incorporated in its entirety by this reference. This application also claims the benefit of priority to U.S. Provisional Application Nos. 62/840,947; 62/840,980; 62/840,966; 62/841,069; 62/841,100; and 62/841,107, all of which were filed Apr. 30, 2019. The contents of these provisional applications are also incorporated herein by reference in their entirety.

BRIEF DESCRIPTION OF DRAWINGS AND APPENDIX

The accompanying Drawings illustrate a number of exemplary embodiments and are parts of the specification. Together with the following description, the Drawings demonstrate and explain various principles of the instant disclosure.

FIG. 5A is an illustration of an exemplary wearable device for controlling computing devices via neuromuscular signals of users.

FIG. 5B is an illustration of an exemplary wearable device for controlling computing devices via neuromuscular signals of users.

FIG. 9A is an illustration of an exemplary signal representative of a state pattern corresponding to a body part of a user donning a wearable device for controlling computing devices via neuromuscular signals.

FIG. 9B is an illustration of an exemplary signal representative of a state pattern corresponding to a body part of a user donning a wearable device for controlling computing devices via neuromuscular signals.

FIG. 10A is an illustration of an exemplary state of a body part of a user donning a wearable device for controlling computing devices via neuromuscular signals.

FIG. 10B is an illustration of an exemplary state of a body part of a user donning a wearable device for controlling computing devices via neuromuscular signals.

FIG. 10C is an illustration of an exemplary state of a body part of a user donning a wearable device for controlling computing devices via neuromuscular signals.

FIG. 10D is an illustration of an exemplary state of a body part of a user donning a wearable device for controlling computing devices via neuromuscular signals.

FIG. 10E is an illustration of an exemplary action that is performed by a computing device in response to the state of the user's body part illustrated in FIG. 10A.

FIG. 10F is an illustration of an exemplary action that is performed by a computing device in response to the state of the user's body part illustrated in FIG. 10B.

FIG. 10G is an illustration of an exemplary action that is performed by a computing device in response to the state of the user's body part illustrated in FIG. 10C.

FIG. 10H is an illustration of an exemplary action that is performed by a computing device in response to the state of the user's body part illustrated in FIG. 10D.

FIG. 11A is an illustration of an exemplary radial menu capable of being controlled by a wearable device via neuromuscular signals of users.

FIG. 11B is an illustration of an exemplary radial menu capable of being controlled by a wearable device via neuromuscular signals of users.

FIG. 11C is an illustration of an exemplary sequential menu capable of being controlled by a wearable device via neuromuscular signals of users.

FIG. 11D is an illustration of an exemplary sequential menu capable of being controlled by a wearable device via neuromuscular signals of users.

FIG. 11E is an illustration of an exemplary sequential menu capable of being controlled by a wearable device via neuromuscular signals of users.

Figure 1:
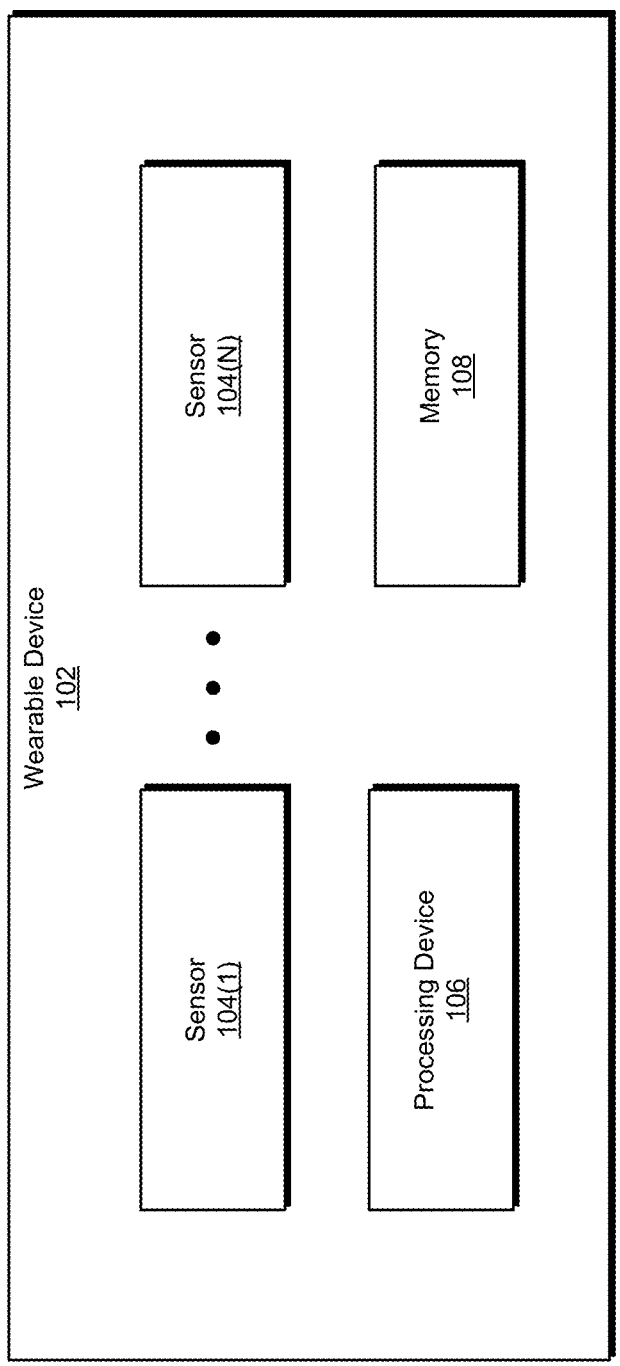
FIG. 1 is a block diagram of an exemplary wearable device for controlling computing devices via neuromuscular signals of users.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, combinations, equivalents, and alternatives falling within this disclosure.

DETAILED DESCRIPTION OF EXEMPLARY EMBODIMENTS

The present disclosure is generally directed to devices, systems, and methods for controlling computing devices via neuromuscular signals of users. As will be explained in greater detail below, these devices, systems, and methods may provide numerous features and benefits.

Human computer interfaces (HCIs) often encompass and/or refer to the means and/or mechanisms with which humans communicate with, instruct, and/or control computers. Examples of such HCIs include, without limitation, mice, keyboards, touchscreens, touchpads, joysticks, styluses, buttons, handheld controllers, combinations or variations of one or more of the same, and/or any other suitable HCIs.

Some interactions between humans and computers may necessitate and/or call for the use and/or application of multiple HCIs simultaneously. In some examples, a user may switch back and forth between different HCIs to engage with interactive media presented and/or displayed on a computer. For example, a user may switch between using a mouse and using a keyboard multiple times during a single interactive media session. Moreover, as computing devices become more portable, the development of HCIs may become more complex due at least in part to design tradeoffs resulting from size constraints and/or mobility requirements of portable devices. Unfortunately, as the portability of computing devices becomes even more ubiquitous, traditional HCIs may become less desirable and/or convenient for users. The instant disclosure, therefore, identifies and addresses a need for additional devices, systems, and methods for controlling computing devices via neuromuscular signals of users.

As will be described in greater detail below, the various devices, systems, and methods described herein may involve the use of a wearable device capable of detecting and/or sensing neuromuscular signals traversing through a user's body. For example, a user may wear a smart wristband with multiple surface electromyography (EMG) sensors that detect and/or sense neuromuscular signals traversing the user's arm, wrist, and/or hand. In this example, the smart wristband may be communicatively coupled to a nearby computing device. In response to certain neuromuscular signals detected via the user's body, the smart wristband may direct the computing device to perform one or more actions that account for those neuromuscular signals.

Accordingly, the smart wristband may enable the user to engage with interactive media presented and/or displayed on the computing device in less restrictive ways than traditional HCIs. The smart wristband may be used to control certain elements of interactive media based at least in part on EMG signals that correlate to predefined states of one or more body parts of the user. The smart wristband may enable the user to direct the computing device to perform certain interactive tasks. Examples of such interactive tasks include, without limitation, map navigation, page browsing, gaming controls, flight controls, interactions with graphical objects presented on a display, cursor control, link and/or button selection, combinations of one or more of the same, and/or any other suitable interactive tasks.

In some implementations, a wearable device may facilitate web browsing based at least in part on configured and/or programed controls or commands. Such controls and/or commands may include and/or involve scrolling up or down a webpage, moving a cursor across a webpage, and/or clicking on one or more webpage elements. In one example, the wearable device may enable users to control web browsing interactions, thereby emulating controls and/or commands provided by traditional HCIs. In another example, the wearable device may also facilitate and/or emulate flight controls, such as pitch, yaw, roll, and/or throttle. Additional examples of such controls and/or commands include, without limitation, activating, selecting, pitching, rotating, rolling, and/or dragging visual objects, navigating, combinations of one or more of the same, and/or any other suitable controls and/or commands.

In some implementations, a wearable device may be used to transition between different mappings of body part states and responsive actions. For example, the wearable device may detect and/or sense certain neuromuscular signals traversing a user's body. In this example, those neuromuscular signals may correspond to and/or represent a specific state of one or more of the user's body parts. As a result, the wearable device may be able to detect and/or sense one or more positions, movements, forces, contractions, poses, and/or gestures made by those body parts of the user. One mapping may cause the wearable device and/or the target computing device to perform a certain action in response to the detection of a specific state of those body parts. However, another mapping may cause the wearable device and/or the target computing device to perform a different action in response to the detection of the same state of those body parts. The wearable device may enable the user to transition between those mappings via neuromuscular signals.

In some implementations, one or more states of the user's body parts may correspond to and/or represent control actions used to interact with a radial menu presented on a display. For example, a first pose may cause the wearable device to direct a computing device to display a radial menu for selection by the user. In this example, a wrist movement (e.g., rotation) may cause the wearable device to direct the computing device to select an item or option available in the radial menu. Additionally or alternatively, a finger pinch pose may cause the wearable device to direct the computing device to click a selected menu item. Further, an open hand pose may cause the wearable device to direct the computing device to close the radial menu.

In some examples, the terms "wearable" and "wearable device" may refer to any type or form of computing device that is worn by a user of an artificial-reality system and/or visual display system as part of an article of clothing, an accessory, and/or an implant. In one example, a wearable device may include and/or represent a wristband secured to and/or worn by the wrist of a user. Additional examples of wearable devices include, without limitation, armbands, pendants, bracelets, rings, jewelry, anklebands, clothing, electronic textiles, shoes, clips, headsets, headbands, head-mounted displays, gloves, glasses, variations or combinations of one or more of the same, and/or any other suitable wearable devices.

The following will provide, with reference to FIGS. 1-6 and 21, detailed descriptions of various devices, systems, components, and/or implementations for controlling computing devices via neuromuscular signals of users. The discussion corresponding to FIGS. 7-19 and 23 will provide detailed descriptions of exemplary neuromuscular signals, exemplary states of body parts capable of being detected via neuromuscular signals, and/or exemplary actions performed in response to the detection of such body part states. The discussion corresponding to FIG. 20 will provide detailed descriptions of exemplary transitions between different mappings of body part states and responsive actions. Additionally, the discussion corresponding to FIG. 22 will provide detailed descriptions of an exemplary method for controlling computing devices via neuromuscular signals of users. Finally, the discussion corresponding to FIGS. 23 and 24 will provide detailed descriptions of types of exemplary artificial reality devices and/or systems capable of being controlled by neuromuscular signals of users.

FIG. 1 illustrates an exemplary wearable device 102 capable of controlling computing devices via neuromuscular signals of users. As illustrated in FIG. 1, exemplary wearable device 102 may include and/or represent a set of sensors 104(1)-(N) that detect and/or sense neuromuscular signals traversing the body of a user. In some examples, exemplary wearable device 102 may also include and/or represent a processing device 106 communicatively coupled to sensors 104(1)-(N) and/or memory 108. In such examples, memory 108 may include and/or store one or more trained inferential models that determine amounts of force associated with the neuromuscular signals detected by the sensors 104(1)-(N). Additionally or alternatively, memory 108 may include and/or store computer-executable instructions that, when executed by processor 106, cause processor 106 to (1) identify an amount of force associated with the neuromuscular signals as determined by the one or more trained inferential models, (2) determine that the amount of force satisfies a threshold force value, and/or in accordance with the determination that the amount of force satisfies the threshold force value, (3) generate a first input command for an HCI system (such as HCI system 200 in FIG. 2).

In some examples, processing device 106 may determine, based at least in part on those neuromuscular signals, a state of at least one body part of the user. Additionally or alternatively, processing device 106 may generate one or more input commands for a separate computing system (not necessarily illustrated in FIG. 1). Such input commands may account for the state of the user's body part.

In some examples, sensors 104(1)-(N) may each constitute and/or represent any type or form of sensor capable of detecting and/or sensing neuromuscular signals via a user's body. In one example, sensors 104(1)-(N) may include and/or represent one or more neuromuscular sensors and/or EMG sensors arranged circumferentially around wearable device 102. Additional examples of sensors 104(1)-(N) include, without limitation, mechanomyography (MMG) sensors, sonomyography (SMG) sensors, combinations or variations of one or more of the same, and/or any other suitable sensors. Any suitable number and/or arrangement of sensors 104(1)-(N) may be applied to wearable device 102.

In some embodiments, sensors 104(1)-(N) may include one or more EMG sensors, MMG sensors, and/or SMG sensors as well as one or more auxiliary sensors that record auxiliary signals and/or information. Examples of such auxiliary sensors include, without limitation, inertial measurement unit (IMU) sensors, position-tracking sensors, microphones, imaging sensors (e.g., cameras), radiation-based sensors for use with radiation-generation devices (e.g., laser-scanning devices), heart-rate monitors, combinations or variations of one or more of the same, and/or any other suitable auxiliary sensors.

In some examples, sensors 104(1)-(N) may be communicatively coupled to one another and/or to processing device 106 by flexible electronics, connectors, and/or wiring. Additionally or alternatively, sensors 104(1)-(N) may be integrated with and/or into an elastic band of wearable device 102.

In some embodiments, the output of one or more of sensors 104(1)-(N) may be processed, amplified, rectified, and/or filtered via hardware signal processing circuitry. Additionally or alternatively, the output of one or more of sensors 104(1)-(N) may be processed, amplified, rectified, and/or filtered via signal processing software or firmware. Accordingly, the processing of neuromuscular signals may be performed in hardware, software, and/or firmware.

As illustrated in FIG. 1, exemplary wearable device 102 may also include one or more processors, such as processing device 106. In some examples, processing device 106 may include and/or represent any type or form of hardware-implemented processing device capable of interpreting and/or executing computer-readable instructions. In one example, processing device 106 may access and/or modify certain software modules to facilitate controlling computing devices via neuromuscular signals of users. Examples of processing device 106 include, without limitation, physical processors, central processing units (CPUs), microprocessors, microcontrollers, field-programmable gate arrays (FPGAs) that implement softcore processors, application-specific integrated circuits (ASICs), portions of one or more of the same, variations or combinations of one or more of the same, and/or any other suitable processing device.

As illustrated in FIG. 1, exemplary wearable 102 may further include one or more memory devices, such as memory 108. Memory 108 generally represents any type or form of volatile or non-volatile storage device or medium capable of storing data and/or computer-readable instructions. In one example, memory 108 may store, load, and/or maintain one or more trained inferential models that perform certain tasks, classifications, and/or determinations in connection with controlling computing devices via neuromuscular signals. Examples of memory 108 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

In some examples, wearable device 102 may include and/or incorporate a wearable band. For example, wearable device 102 may include and/or represent a strap and/or band designed and/or dimensioned to at least partially encompass the user's wrist and/or arm. The strap and/or band may include and/or contain a variety of different materials. Examples of such materials include, without limitation, cottons, polyesters, nylons, elastics, plastics, neoprene, rubbers, metals, woods, composites, combinations or variations of one or more of the same, and/or any other suitable materials. The strap and/or band may be defined and/or formed in a variety of shapes and/or sizes with the aim of securing wearable device 102 to the user's wrist and/or arm. In one example, the strap and/or band may include and/or represent one or more segments, links, and/or sections. Additionally or alternatively, the strap and/or band may be adjustable to provide a one-size-fits-most feature.

In some embodiments, wearable device 102 may include and/or incorporate one or more additional components that are not represented and/or illustrated in FIG. 1. For example, although not necessarily illustrated and/or labeled in this way in FIG. 1, wearable device 102 may also include and/or incorporate circuitry, transistors, resistors, capacitors, diodes, transceivers, sockets, wiring, and/or circuit boards, among other components.

In some examples, when wearable device 102 is worn by the user, sensors 104(1)-(N) may interface and/or make physical contact with the user's skin. In one example, wearable device 102 may be communicatively coupled to a computing system (such as a virtual reality headset, an augmented reality headset, a laptop, a desktop, a smart television, a monitor, etc.). In this example, the user may put and/or place his or her body in a certain state and/or condition to control and/or modify the presentation or performance of the computing system. As the user puts and/or places his or her body in that state and/or condition, the user's body may generate and/or produce neuromuscular signals representative, indicative, and/or suggestive of that state or condition.

In some example, the neuromuscular signals may traverse and/or travel through the user's body. For example, the user may make a pose and/or gesture that generates neuromuscular signals that traverse down his or her arm toward the hand. In one example, one or more of sensors 104(1)-(N) may detect and/or sense the neuromuscular signals as they traverse down the arm toward the hand. In response to detecting and/or sensing those signals, one or more of sensors 104(1)-(N) may generate and/or produce data representative of those signals.

In some examples, those sensors may provide and/or deliver a version of the data representative of the detected neuromuscular signals to at least one processing device (e.g., processing device 106, a processor incorporated in the computing system to which wearable device 102 is communicatively coupled, and/or a processor incorporated in an intermediary communication link or dongle). This data may undergo certain processing and/or conversions prior to being provided and/or delivered to the processing device. Accordingly, the version of data provided and/or delivered to the processing device may be any derivation and/or processed representation of the output received from the sensors. Examples of this version of the data include, without limitation, raw data produced and/or output by the sensors, digital conversions and/or representations of analog signals output by the sensors, processed digital representations of signals output by the sensors, combinations or variations of one or more of the same, and/or any other suitable version of data representative of neuromuscular signals.

In this example, the processing device may analyze and/or evaluate the data representative of the neuromuscular signals to determine the state of one or more body parts of the user. For example, the processing device may implement a trained inferential model. The processing device may input and/or feed the data representative of the neuromuscular signals to the inferential model. From that data, the trained inferential model may then output and/or produce a classification that identifies and/or indicates the state of such body parts. Accordingly, the processing device may determine the state of such body parts based at least in part on the output of the inferential model.

Various states of the user's body parts may be discernible and/or detectable based at least in part on neuromuscular signals traversing the user's body. Examples of such body part states include, without limitations, relative positions of certain body parts, movements of certain body parts, forces applied and/or exerted by certain body parts, isometric contractions made by certain body parts, poses made by certain body parts, gestures made by certain body parts, activations of certain body parts (e.g., muscles), changes in activation of certain body parts, combinations of one or more of the same, and/or any other discernible or detectable states of such body parts.

In some examples, the processing device may be able to determine the amount of force produced and/or exerted by one or more body parts of the user based at least in part on the neuromuscular signals detected by sensors 104(1)-(N). For example, from the data representative of the detected neuromuscular signals, the trained inferential model may output and/or produce an indication or measurement that identifies and/or specifies the amount of force exerted by those body parts. In response to determining the state of those body parts and the amount of force produced by those body parts, the processing device may generate one or more input commands for the computing system. Such input commands may account for the state of the user's body parts and the amount of force produced and/or exerted by those body parts.

In some examples, the processing device may cause the computing system to which wearable device 102 is communicatively coupled to perform one or more actions mapped to the state of those body parts and/or the amount of force exerted by those body parts. For example, the processing device may direct the computing system to perform those actions by sending and/or providing those input commands to the computing system. In one example, the processing device may determine and/or identify one or more characteristics of those actions to be regulated in accordance with the amount of force produced by the user's body parts. In this example, the processing device may formulate the input command to account for the amount of force produced by the user's body parts such that the characteristics of those actions correspond to the amount of force produced by the user's body parts.

Various actions may be mapped to different states of the user's body parts. Examples of such actions include, without limitation, scrolling through a graphical user interface (GUI), selecting a visual element of a GUI, clicking on a visual element of a GUI, displaying a visual element in a GUI, drawing and/or painting a visual element on a GUI, moving a cursor displayed on a GUI, associating a cursor of the computing system with a visual element displayed in a GUI based at least in part on an updated position of the cursor relative to the visual element, providing a feedback indication (whether visual, auditory, and/or haptic) of an association made between a cursor of the computing system and a visual element displayed in a GUI, inputting data, modifying interface controls, navigating or scrolling a GUI, transitioning from one mapping to another, combinations or variations of one or more of the same, and/or any other suitable actions.

Similarly, various degrees of force may be mapped to and/or be commensurate with different characteristics of such actions. For example, one characteristic may include and/or represent the scrolling speed with which the GUI is scrolled. In one example, as the amount of force produced by the user's body parts increases, so too may the scrolling speed. Conversely, as the amount of force produced by the user's body parts decreases, so too may the scrolling speed.

As another example, one characteristic may include and/or represent the width of a virtual drawing instrument and/or a virtual paint brushstroke. In one example, as the amount of force produced by the user's body parts increases, so too may the width of the virtual drawing instrument and/or the virtual paint brushstroke. Conversely, as the amount of force produced by the user's body parts decreases, so too may the width of the virtual drawing instrument and/or the virtual paint brushstroke.

Various forms of feedback may be provided to the user as the computing system performs the actions mapped to the state of the user's body parts. For example, one feedback indication of an association made between the cursor of the computing system and a visual element of the GUI may involve and/or entail modifying one or more characteristics (e.g., color, size, transparency, shadow, font, animation, shape, fill, emphasis, orientation, animation, line type, and/or line width) of the visual element of the GUI. Another exemplary feedback indication of an association made between the cursor of the computing system and a visual element of the GUI may involve and/or entail adding, to the GUI, at least one further visual element that represents the association.

Associations may be made between the cursor of the computing system and the visual element for a variety of reasons. For example, the processing device and/or the computing system may determine that an updated position of the cursor is within a certain distance of the visual element of the GUI. In one example, the processing device and/or the computing system may identify the position of the visual element within the GUI and/or the position(s) of one or more additional visual elements within the GUI. In this example, the processing device and/or the computing system may determine that the updated position of the cursor is closer to the position of the virtual element than the additional virtual elements within the GUI. In response to determining that the updated position of the cursor is within the certain distance of the visual element, the processing device and/or the computing system may associate the cursor with the visual element (instead of, e.g., the additional virtual elements).

As another example, the processing device and/or the computing system may determine the speed at which the cursor moved or is moving within the GUI to reach the updated position. The processing device and/or the computing system may then associate the cursor with the visual element based at least in part on the speed at which the cursor moved or is moving to reach the updated position.

In a further example, the processing device and/or the computing system may detect a direction in which the cursor moved or is moving within the GUI to reach the updated position. The processing device and/or the computing system may then associate the cursor with the visual element based at least in part on the direction in which the cursor moved or is moving to reach the updated position.

In some examples, the processing device and/or the computing system may maintain one or more mappings between possible states of the body parts and responsive actions capable of being performed by the computing system. For example, the processing device and/or the computing system may maintain a first mapping between possible states of a body part and a first set of actions as well as a second mapping between possible states of the body part and a second set of actions. In one example, the processing device and/or the computing system may activate the first mapping and/or deactivate the second mapping such that one or more of the actions in the first set are performed in response to one or more detected states of the body part.

In some examples, the user may be able to switch between the mappings by changing the state of one or more body parts. For example, the user may make a pose and/or gesture with his or her hand. As the user does so, sensors 104(1)-(N) may detect and/or sense certain neuromuscular signals generated by the user's body in connection with the pose and/or gesture. In this example, the processing device and/or the computing system may determine the state of the user's body parts based at least in part on those neuromuscular signals.

In some examples, this state of the user's body parts may correspond and/or be mapped to a transition command and/or action that causes the processing device and/or the computing system to switch mappings. In such examples, in response to determining this state of the user's body parts, the processing device and/or the computing system may transition from one mapping to another mapping. For example, the processing device and/or the computing system may deactivate one mapping and activate another mapping. As a result of this mapping transition, the computing device may be configured and/or programmed to perform one or more actions assigned by the other mapping to the possible state of a body part in response to the subsequent detection of that body part state.

In some examples, the processing device and/or computing system may map any number of conditions to a single action. In these examples, to initiate performance of the action, the processing device and/or computing system may ensure and/or determine that all the conditions have been satisfied. For example, the processing device and/or computing system may map the rotation of the user's arm while making a first pose to navigating a radial menu in a certain direction. In this example, the user may be able to navigate the radial menu in that direction by rotating his or her arm while making a first pose. However, if the user rotates his or her arm without making a first post, the user's arm rotation may have no effect on the radial menu.

Figure 2:
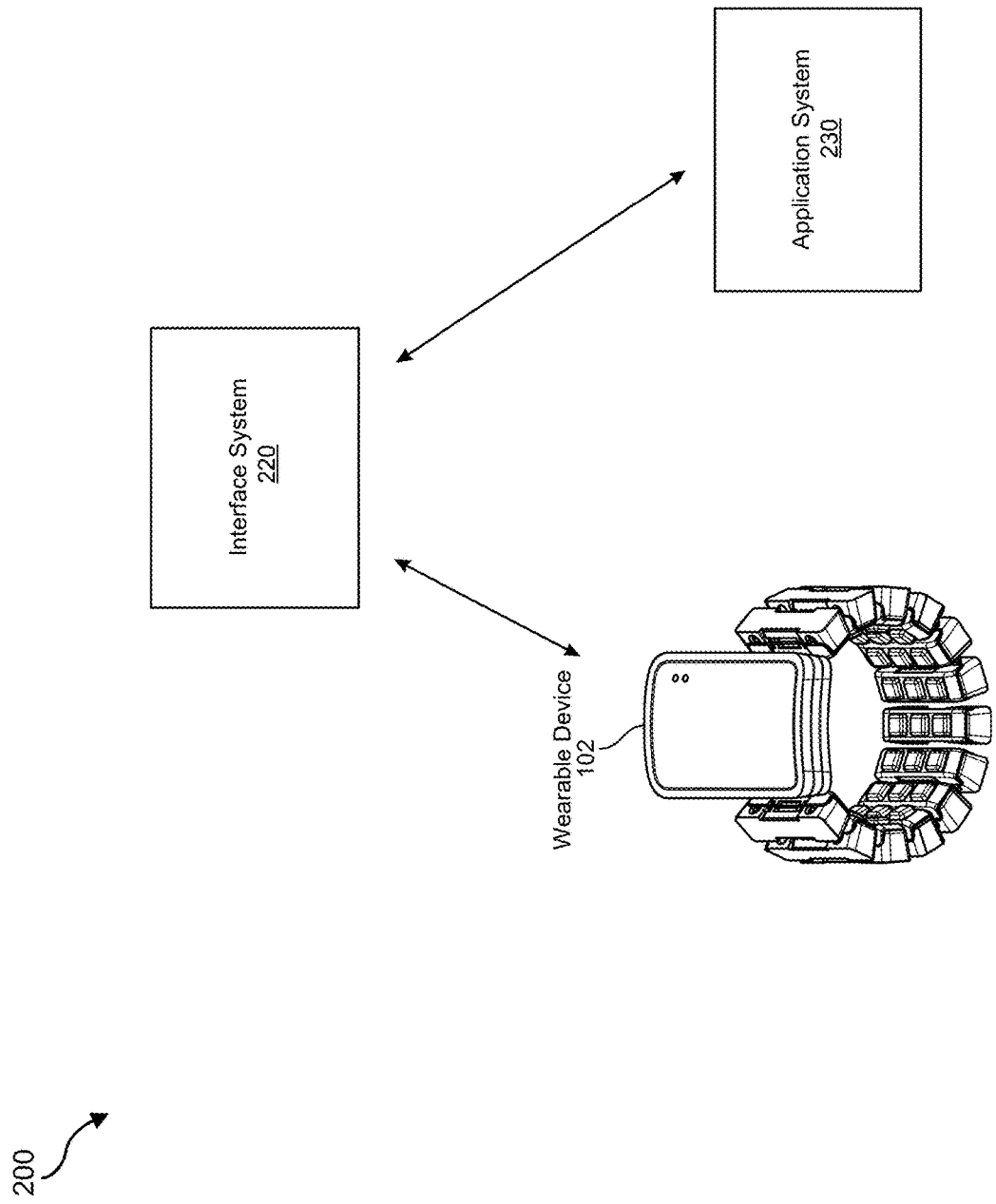
FIG. 2 is an illustration of an exemplary system for controlling computing devices via neuromuscular signals of users.

FIG. 2 illustrates an exemplary HCI system 200 that includes wearable device 102, an interface system 220, and/or an application system 230. In some examples, wearable device 102, interface system 220, and/or application system 230 may each include an instance of processing device 106 and/or memory 108. In addition, HCI system 200 may include one or more additional wearable devices capable of implementing and/or performing any of the same functionality as wearable device 102. Accordingly, any of the tasks described above as being performed by wearable device 102 in connection with FIG. 1 may additionally or alternatively be performed by interface system 220, application system 230, and/or any additional wearable devices included in HCI system 200.

In some examples, wearable device 102 may communicate with interface system 220 and/or application system 230. In such examples, when worn on the body of a user, wearable device 102 may detect neuromuscular signals traversing the user's body via sensors 104(1)-(N). Wearable device 102 may record, store, and/or analyze those neuromuscular signals.

In some implementations, wearable device 102 may record, store, and/or analyze auxiliary position, velocity, and/or acceleration information together with the neuromuscular signals. In such implementations, wearable device 102 may perform analog processing (e.g., noise reduction, filtering, etc.) and/or analog-to-digital conversion of recorded neuromuscular signals. Wearable device 102 may communicate with interface system 220 via any suitable wireless technology, protocol, and/or signaling. In one example, wearable device 102 may provide and/or transfer the recorded neuromuscular signals, features extracted from such signals, and/or commands or instructions based on such signals to interface system 220 and/or application system 230.

In some examples, interface system 220 may receive the recorded neuromuscular signals, features extracted from such signals, and/or commands or instructions based on such signals from wearable device 102. In one example, interface system 220 may generate data, commands, and/or instructions for use or consumption by application system 230. In another example, interface system 220 may identify and/or determine the current state of a body part of the user by implementing and/or applying an inferential model. In this example, interface system 220 may communicate and/or disclose the identified or determined current state of the user's body part to application system 230. For example, interface system 220 may provide the position, orientation, joint angle, force, movement, contraction, pose, and/or gesture information to application system 230. Interface system 220 may communicate with application system 230 via any suitable wireless technology, protocol, and/or signaling.

In some examples, the state of the user's body part may include and/or represent a relative position, orientation, joint angle, force, movement, pose, or gesture of that body part. In one example, the state of the user's body part may describe a configuration of one or more segments in a musculoskeletal representation of that body part and/or the user's body. In this example, the musculoskeletal representation may model that body part and/or the user's body as a multi-segment articulated rigid body system. The musculoskeletal representation may also model certain joints that form the interfaces between the different segments and/or certain joint angles that define the spatial relationships between connected segments.

In the model, the spatial relationships between the connected segments may conform and/or be subject to human anatomical constraints. In some examples, the musculoskeletal segments may be modeled as rigid bodies. Additionally or alternatively, the musculoskeletal segments in the model may conform and/or be subject to inter-segment movements (e.g., a forearm modeled as a semi-rigid segment to account for the motion of the ulna and radius bones). In one example, position, orientation, and/or joint angle of the segments, as well as their respective time derivatives (e.g. linear or angular velocity or acceleration), may be described and/or modeled as one or more fixed coordinate systems.

In some examples, the state of the user's body part may include and/or represent the amount of force applied by and/or to that body part. For example, wearable device 102 may measure, identify and/or determine the amount of linear force and/or rotational (torque) force exerted by one or more segments of the musculoskeletal representation based at least in part on neuromuscular signals traversing the user's body.

Examples of such linear forces include, without limitation, the force of a finger or hand pressing on a solid object (e.g., a table), the force exerted when two segments (e.g., two fingers) are pinched together, variations or combinations of one or more of the same, and/or any other suitable linear forces. Examples of such rotational forces include, without limitation, the force created as segments in the wrist or fingers are twisted or flexed, the force created by twisting or flexing the user's arm or waist, variations or combinations of one or more of the same, and/or any other suitable rotational forces. In some embodiments, the state of the user's body part may include and/or involve pinching force information, grasping force information, and/or information about co-contraction forces between muscles represented by the musculoskeletal representation.

In some examples, the state of the user's body part may include and/or represent a pose made by the user's body and/or one or more of the user's body parts. In one example, a pose may indicate a static configuration and/or positioning of one or more body parts. In this example, the static configuration may describe the position of those body parts relative to one another. For example, a pose may include and/or represent clenching a fist, forming an open hand, statically pressing the user's index finger against the user's thumb, pressing the palm of one hand down on a solid surface, and/or gripping or holding a ball.

In some examples, the state of the user's body part may correspond to and/or represent positional information (e.g., segment coordinates, joint angles, or similar information) for a pose. Additionally or alternatively, the state of the user's body part may correspond to and/or represent an identifier assigned and/or specific to a pose (e.g., a parameter, function argument, or variable value).

In some examples, the state of the user's body part may include and/or represent a gesture made by the user's body and/or one or more of the user's body parts. In one example, a gesture may indicate a dynamic configuration of one or more body parts. In this example, the dynamic configuration may describe the position of those body parts relative to one another, the movement of those body parts relative to one another, and/or forces applied to and/or exerted by those body parts. For example, a gesture may constitute and/or represent waving a finger back and forth, throwing a ball, and/or grasping or palming a ball. Additionally or alternatively, a gesture may constitute and/or represent the activation and/or change in activation of certain muscles in the user's body.

In some embodiments, wearable device 102 may generate, store, and/or record state information that describes states of the user's body parts. In one example, such state information may describe a pose and/or gesture made with a hand of the user. In this example, such state information may also include a data-based model of the user's hand as a multi-segment representation. The joints in the user's wrist and fingers may form interfaces between the multiple segments in the data-based model.

In various embodiments, the state of the user's body state may describe a hand in combination with one or more arm segments. In other embodiments, the state of the user's body state may describe portions of the user's body other than the hand or fingers, such as an arm, a leg, a foot, a torso, a neck, variations or combinations of one or more of the same, and/or any other suitable body parts of the user.

The inferential model implemented by wearable device 102, interface system 120, and/or application system 130 may include and/or represent at least one statistical or machine learning model. For example, the inferential model may include and/or represent a neural network (e.g., a recurrent neural network) used to determine and/or classify body part states based at least in part on neuromuscular signals. In one example, the neural network may include and/or represent a long short-term memory (LSTM) neural network. Additionally or alternatively, the neural network may include and/or represent a fully recurrent neural network, a gated recurrent neural network, a recursive neural network, a Hopfield neural network, an associative memory neural network, an Elman neural network, a Jordan neural network, an echo state neural network, a second order recurrent neural network, deep neural networks, convolutional neural networks, feedforward neural networks, variations or combinations of one or more of the same, and/or any other suitable type of neural network.

In some examples, the inferential model may include and/or represent a supervised machine learning model in which the user makes certain positions, movements, forces, contractions, poses, and/or gestures with his or her body. In such examples, the inferential model may obtain sensor data samples representative of those positions, movements, forces, contractions, poses, and/or gestures via wearable device 102. The inferential model may then be trained (or further trained) based at least in part on those sensor data samples. In other examples, the inferential model may include and/or represent an unsupervised machine learning model that is trained without the user making such positions, movements, forces, contractions, poses, and/or gestures with his or her body. The inferential model may also be trained from data samples collected from multiple users.

In some implementations, the recorded neuromuscular signals may exhibit spatio-temporal (e.g., spatio-frequential) patterns that depend on way in which the user wears wearable device 102. For example, one body part state may be associated with a first spatio-temporal pattern when the user is donning wearable device 102 in a first manner (e.g., where the electrodes are in contact with certain areas of the user's skin) and a second spatio-temporal pattern when the user rotates wearable device 102 on his or her body or when the user moves wearable device 102 to a different part of the body (e.g., from a lower arm position to an upper arm position). Accordingly, the inferential model may be trained to identify one or more body part states by the exhibited spatio-temporal patterns.

In some implementations, wearable device 102 may be configured to determine a rotation and/or position of wearable device 102. In such implementations, wearable device 102 may be able to select and/or apply an inferential model trained and/or adapted for identifying body parts states at the determined rotation and/or position. In other words, wearable device 102 may be configured to auto-calibrate by adapting to any rotation and/or arm position offset without interfering with the user experience. By auto-calibrating in this way, wearable device 102 may be able to account for the manner in which the user is donning wearable device 102 relative to the user's underlying musculature and other anatomy that has the potential to affect the recording of the neuromuscular signals traversing the user's body. Moreover, wearable device 102 may be able to adapt to users with varying body types and/or abnormalites, including those who have suffered injured or missing muscles, different adipose tissue or fat, and/or other anatomic variables.

In some examples, HCI system 200 may build an inferential model that classifies neuromuscular signal patterns for auto-calibration by (1) building a new statistical model/experiment class that takes a set of preprocessed neuromuscular signals as input, (2) generating a batch of training data by randomly applying a rotation offset to the preprocessed signals, (3) producing positive labels when the augmented offset is zero and null labels when the augmented offset is not zero, (4) calibrating the batch of training data to have an offset of zero, and (5) training an inferential model and evaluating its performance by testing different rotation offsets.

In some examples, application system 230 may receive body state information from interface system 220. In response to this information, application system 230 perform certain actions on one or more applications. Examples of such actions include, without limitation, changing an execution state of an application (e.g., starting, stopping, suspending, or resuming the application), communicating with an application (e.g., providing commands and/or data to the application), moving a cursor in connection with an application, associating a cursor with a visual element displayed in a GUI, presenting and/or highlighting a visual element within a GUI, selecting and/or clicking on a visual indicator displayed in a GUI, transitioning from one mapping to another, and/or any other suitable actions.

In some examples, application system 230 may be configured to provide a GUI to the user donning wearable device 102. In one example, the GUI may generate and/or deliver visual, auditory, and/or haptic feedback in response to commands, instructions, and/or data received from application system 230. For example, a user donning wearable device 102 may interact with graphical controls and/or indicators displayed in the GUI of application system 230 via wearable device 102. As an additional example, the GUI may generate and/or deliver auditory prompts and/or feedback through speakers incorporated into HCI system 200. As a further example, the GUI may provide haptic prompts and/or feedback via one or more actuators that apply certain forces to the user's body (e.g., vibrations generated by a linear resonant actuator or eccentric rotating mass actuator).

In some embodiments, wearable device 102, interface system 220, and/or application system 230 may be combined into a single standalone computing device or unit. In other embodiments, wearable device 102 may include and/or represent a single standalone computing device or unit, and interface system 220 and application system 230 may be combined into a different standalone computing device or unit. In further embodiments, wearable device 102 and interface system 220 may be combined into a single standalone computing device or unit, and application system 230 may include and/or represent a different standalone computing device or unit. In additional embodiments, wearable device 102, interface system 220, and/or application system 230 may each include and/or represent a separate standalone computing device or unit.

In some examples, wearable device 102 may implement and/or be configured with one or more trained inferential models. In such examples, wearable device 102 may record neuromuscular signals, use the trained inferential models to identify one or more states of the user's body parts, and/or provide one or more indications of the identified body states to a separate computing device implementing interface system 220 and/or application system 230. Additionally or alternatively, wearable device 102 may communicate and/or disclose certain features extracted from the recorded neuromuscular signals and/or one or more commands or instructions based on such signals to a separate computing device implementing interface system 220 and/or application system 230.

In some examples, the separate computing device implementing interface system 220 and/or application system 230 may identify and/or determine the states of the user's body parts by feeding the recorded neuromuscular signals and/or certain features extracted from such signals into one or more trained inferential models. The identified states may be mapped to specific actions capable of being executed and/or performed by the computing device implementing application system 230. For example, a given body part state may cause application system 230 to execute and/or perform one or more actions in connection with an application running on that computing device.

In some examples, wearable device 102 or another portion of HCI system 200 may determine whether the amount of force exerted by the user satisfies multiple threshold force values. In one example, each of these threshold force values may be associated with a different action and/or input command. For example, wearable device 102 or another portion of HCI system 200 may determine that the amount of force exerted by the user while performing a certain hand gesture satisfies a first threshold force value and a second threshold force value. In this example, the first threshold force value and the second threshold force value may differ from one another.

In response to the determination that the amount of force exerted by the user satisfies the first and second threshold force values, wearable device 102 or another portion of HCI system 200 may generate a first input command corresponding to the first threshold force value having been satisfied and a second input command corresponding to the second threshold force value having been satisfied. In this example, the first and second input commands may differ from one another.

In some examples, wearable device 102 or another portion of HCI system 200 may forego generating input commands corresponding to threshold force values that have not been satisfied. For example, wearable device 102 or another portion of HCI system 200 may determine that the amount of force exerted by the user while performing a certain hand gesture does not satisfy a first threshold force value. In response to this determination, wearable device 102 or another portion of HCI system 200 may forego generating an input command corresponding to the first threshold force value in connection with that gesture.

In some examples, wearable device 102 or another portion of HCI system 200 may determine that the amount of force exerted by the user satisfies one threshold force value but not another threshold force value. For example, wearable device 102 or another portion of HCI system 200 may determine that the amount of force exerted by the user while performing a certain gesture satisfies a first threshold force value but does not satisfy a second threshold force value. In response to this determination, wearable device 102 or another portion of HCI system 200 may generate a first input command corresponding to the first threshold force value having been satisfied but forgo generating a second input command corresponding to the second threshold force value having been satisfied. Alternatively, in response to this determination, wearable device 102 or another portion of HCI system 200 may generate a first input command corresponding to the first threshold force value having been satisfied and a second input command corresponding to the second threshold force value having not been satisfied.

In some examples, wearable device 102 or another portion of HCI system 200 may determine whether the user implemented and/or performed certain combinations of hand gestures and force. For example, wearable device 102 or another portion of HCI system 200 may determine that the user exerted a first amount of force while performing a first hand gesture. In this example, wearable device 102 or another portion of HCI system 200 may determine that the user exerted a second amount of force while performing a second hand gesture. Additionally or alternatively, wearable device 102 or another portion of HCI system 200 may determine that the first amount of force satisfies a first threshold force value and the second amount of force satisfies a second threshold force value.

In response to the determination that the first amount of force satisfies the first threshold force value, wearable device 102 or another portion of HCI system 200 may generate a first input command that accounts for the first amount of force exerted by the user while performing the first hand gesture. Moreover, in response to the determination that the second amount of force satisfies the second threshold force value, wearable device 102 or another portion of HCI system 200 may generate a second input command that accounts for the second amount of force exerted by the user while performing the second hand gesture.

In some examples, wearable device 102 or another portion of HCI system 200 may determine whether the user increases or decreases the amount of force exerted while performing a single hand gesture or pose. For example, wearable device 102 or another portion of HCI system 200 may determine and/or identify a single hand gesture (e.g., forming and/or holding a first) performed by the user over a certain period of time. In this example, wearable device 102 or another portion of HCI system 200 may determine and/or identify a first amount of force exerted by the user at a first point in time while performing that hand gesture. In response, wearable device 102 or another portion of HCI system 200 may generate a first input command that accounts for the first amount of force exerted by the user while performing that hand gesture.

Subsequently, wearable device 102 or another portion of HCI system 200 may determine and/or identify a second amount of force exerted by the user at a second point in time while performing that hand gesture. In response, wearable device 102 or another portion of HCI system 200 may generate a second input command that accounts for the second amount of force exerted by the user while performing that hand gesture. Accordingly, wearable device 102 or another portion of HCI system 200 may generate multiple input commands that correspond to and/or are commensurate with a varying scale of force exerted by the user while performing that hand gesture over time.

As a specific example, wearable device 102 or another portion of HCI system 200 may determine and/or identify a first formed and/or held by the hand of the user. In this example, the user may increase and/or decrease the amount of force applied to the first over time. For example, wearable device 102 or another portion of HCI system 200 may formulate a first input command to control the speed of a cursor implemented on application system 230 based at least in part on the amount of force applied to the first at a first point in time. Subsequent to the first point time, wearable device 102 or another portion of HCI system 200 may detect an increase and/or decrease in the amount of force exerted by the user in forming or holding the fist. In response, wearable device 102 or another portion of HCI system 200 may formulate a second input command to increase and/or decrease the speed of the cursor implemented on HCI system 200 based at least in part on the increase and/or decrease in the amount of force exerted by the user. Accordingly, light first squeezes may correspond to and/or result in relatively slow cursor speeds, whereas heavy first squeezes may correspond to and/or result in relatively fast cursor speeds (or vice versa).

In some examples, wearable device 102 or another portion of HCI system 200 may rely in part on photographic data to determine and/or identify certain hand gestures performed by the user. For example, wearable device 102 or another portion of HCI system 200 may identify photographic data representative of the one or more hand gestures as captured by a camera incorporated into an artificial-reality system. In one example, the camera may generate and/or capture this photographic data of the hand gestures from a head-mounted display worn by the user. Additionally or alternatively, the camera may generate and/or capture this photographic data of the hand gestures from a mount, pedestal, and/or base positioned in the surrounding environment of the user.

In one example, wearable device 102 or another portion of HCI system 200 may provide the photographic data to one or more trained inferential models to enable such trained inferential models to determine the one or more hand gestures based at least in part on the neuromuscular signals detected by the sensors and the photographic data. By doing so, wearable device 102 or another portion of HCI system 200 may be able to improve the accuracy of its hand gesture detection and/or identification, thereby mitigating the number of false positives and/or negatives produced by the trained inferential models. For example, the neuromuscular signals detected by the sensors may indicate and/or suggest that a certain hand gesture performed by the user is either an index finger pinch or a middle finger pinch. However, without further information, the trained inferential models may be unable to conclusively decide on the hand gesture being one or the other. In this example, the trained inferential models may rely on a combination of those neuromuscular signals and photographic data representative of the user's hands captured at the time of the gesture to accurately determine that the user is performing an index finger pinch or a middle finger pinch.

Figure 3:
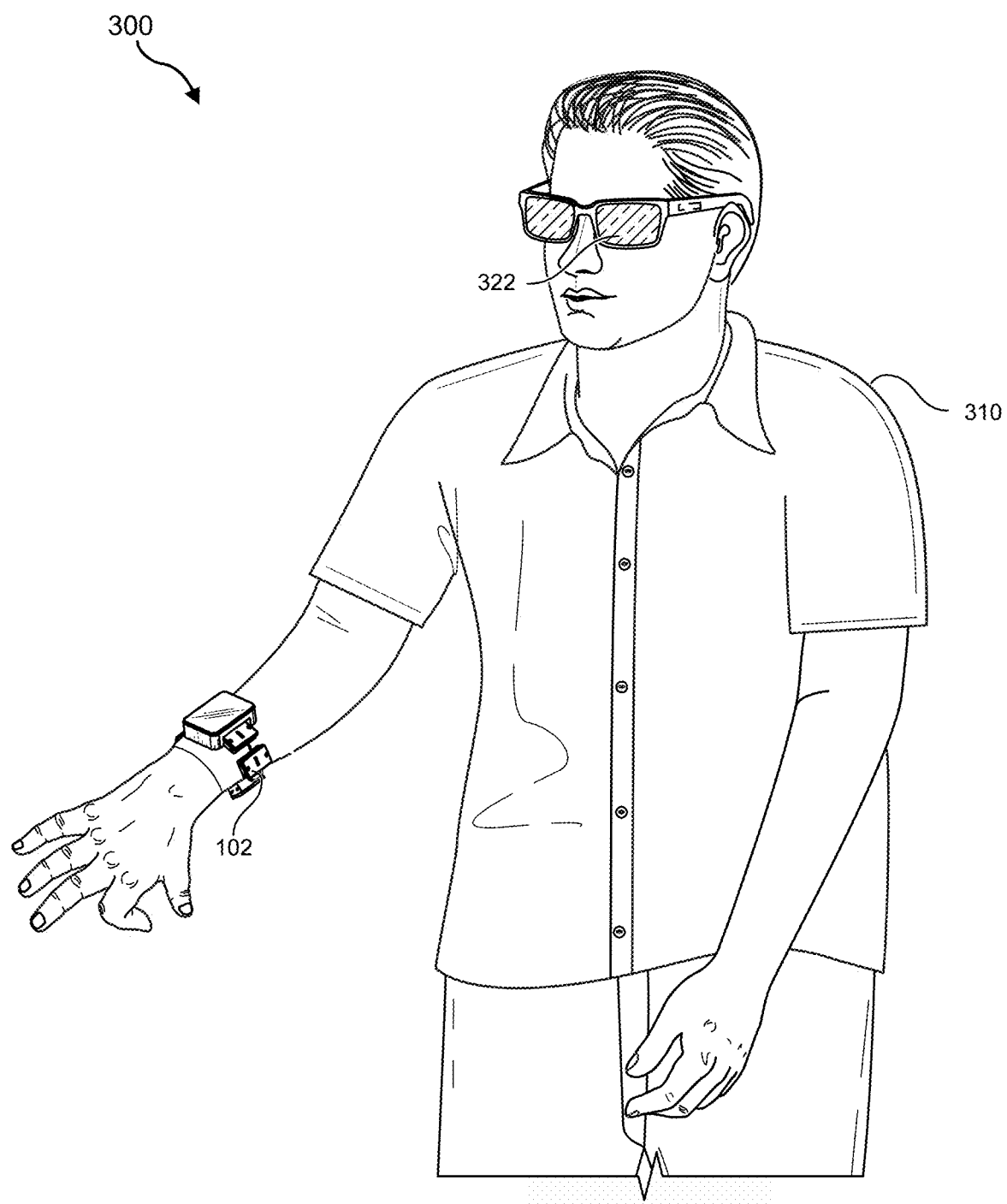
FIG. 3 is an illustration of a user wearing and operating an exemplary wearable device for controlling computing devices via neuromuscular signals.

FIG. 3 is an illustration of an exemplary implementation 300 in which a user 310 is donning and/or operating wearable device 102 along with a head-mounted display 322. In one example, wearable device 102 may be communicatively coupled to head-mounted display 322. In this example, the user may be able to control and/or manipulate one or more visual elements presented via head-mounted display 322 by making certain poses, gestures, and/or isometric contractions with his or her right hand. More specifically, such poses, gestures, and/or isometric contractions may involve and/or entail certain neuromuscular signals that are detected by sensors 104(1)-(N) of wearable device 102. In response to those neuromuscular signals, a processing device of wearable device 102 and/or head-mounted display 322 may be able to discern and/or identify the poses, gestures, and/or contractions made by the user's right hand. Head-mounted display may then manipulate and/or modify one or more visual elements presented to the user based at least in part on such poses, gestures, and/or contractions.

Figure 4A:
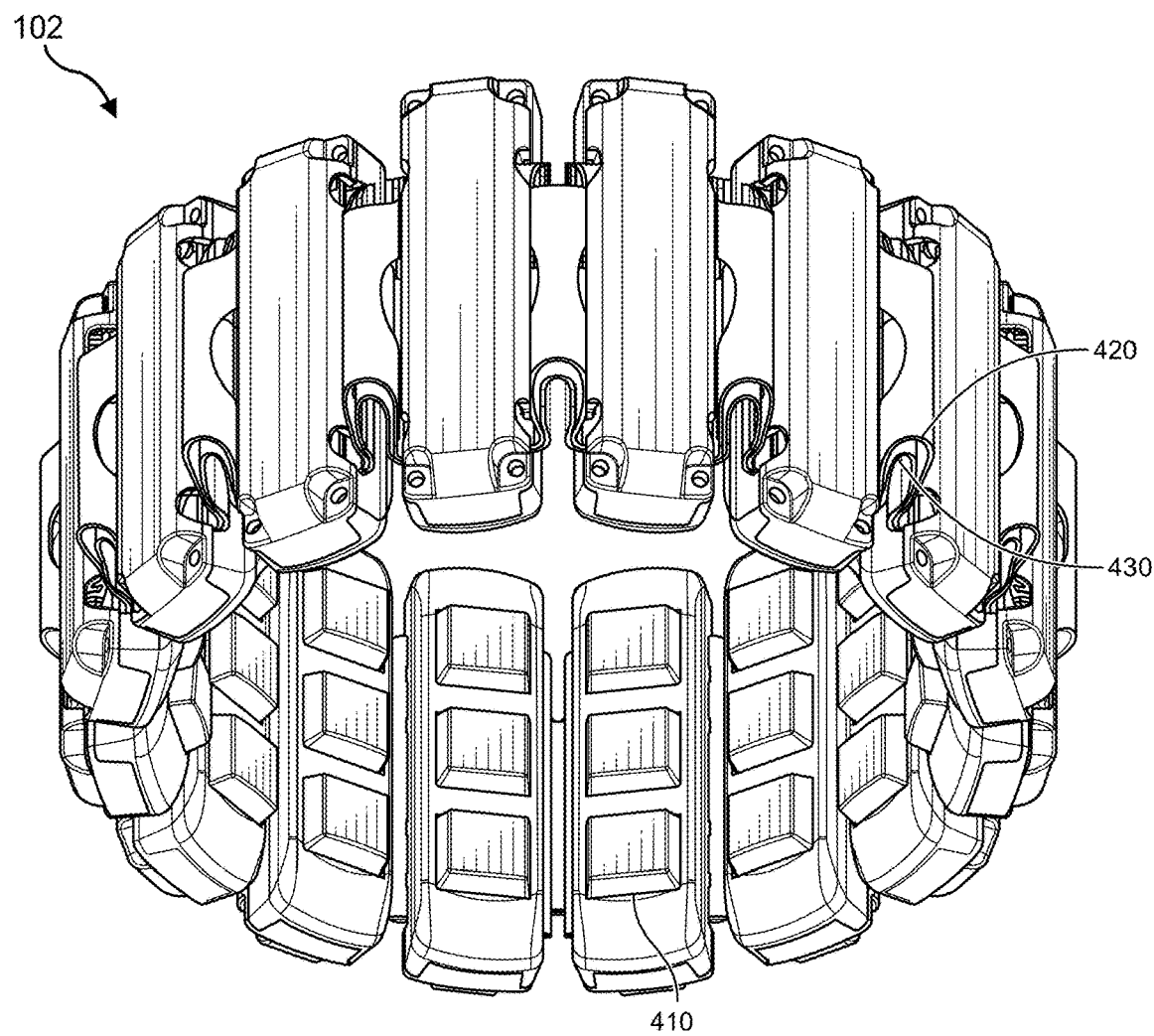
FIG. 4A is an illustration of an exemplary wearable device for controlling computing devices via neuromuscular signals of users.

FIG. 4A illustrates an exemplary implementation of wearable device 102 with sixteen sensors 410 (e.g., EMG sensors) arranged circumferentially around an elastic band 420. As illustrated in FIG. 4, elastic band 420 may be dimensioned and/or configured to be worn around a user's lower arm or wrist. In some examples, the number and/or arrangement of sensors 410 may depend on the particular application for which the wearable device 102 is used and/or deployed. For example, wearable device 102 may be used and/or deployed to generate control information for controlling a virtual reality system, an augmented reality system, a robot, a vehicle, a computer application, a scrolling feature, a virtual avatar, and/or any other suitable control task.

Figure 4B:
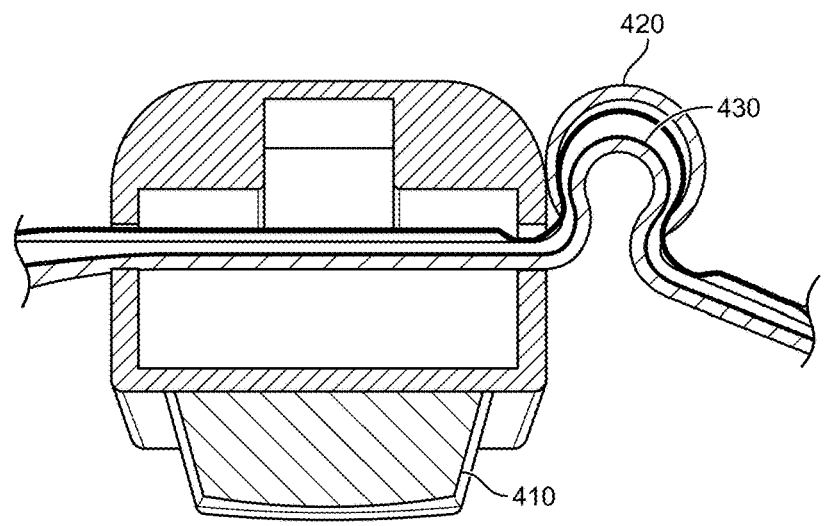
FIG. 4B is an illustration of an exemplary wearable device for controlling computing devices via neuromuscular signals of users.
Figure 6:
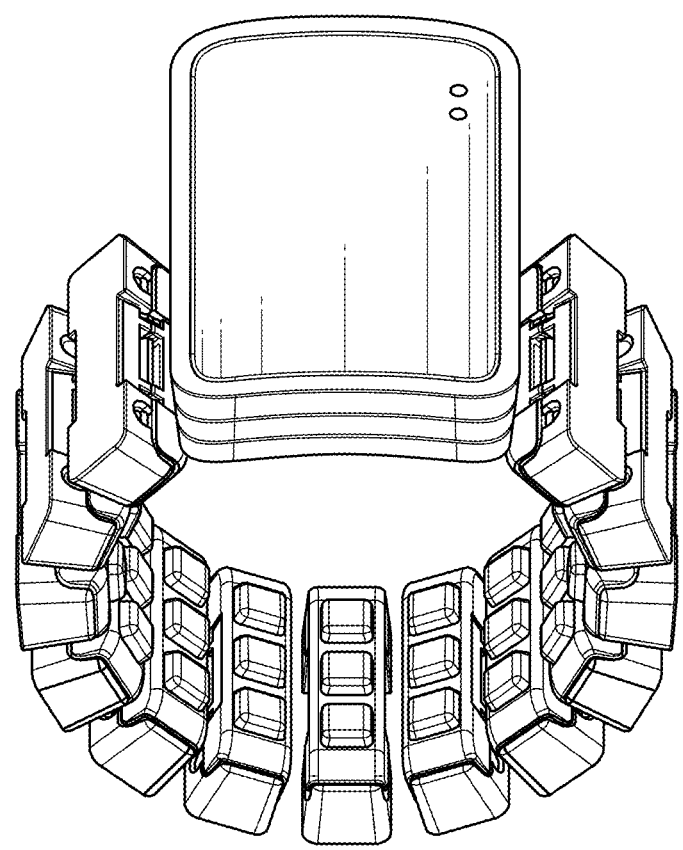
FIG. 6 is an illustration of an exemplary wearable device for controlling computing devices via neuromuscular signals of users.

As illustrated in FIG. 4A, sensors 410 may be coupled together using flexible electronics 1630 incorporated into wearable device 102. FIG. 4B illustrates an exemplary cross-sectional view through one of the sensors 410 of wearable device 102 in FIG. 4A. FIGS. 5A, 58 and 6 illustrate an alternative implementation of wearable device 102 capable of executing and/or performing one or more of the of signal processing techniques described herein without external assistance. Accordingly, wearable device 102 in FIGS. 5A, 5B, and 6 may include and/or incorporate a physical compute module and/or unit that, along with the neuromuscular sensors, is integrated into the elastic band.

Figure 7:
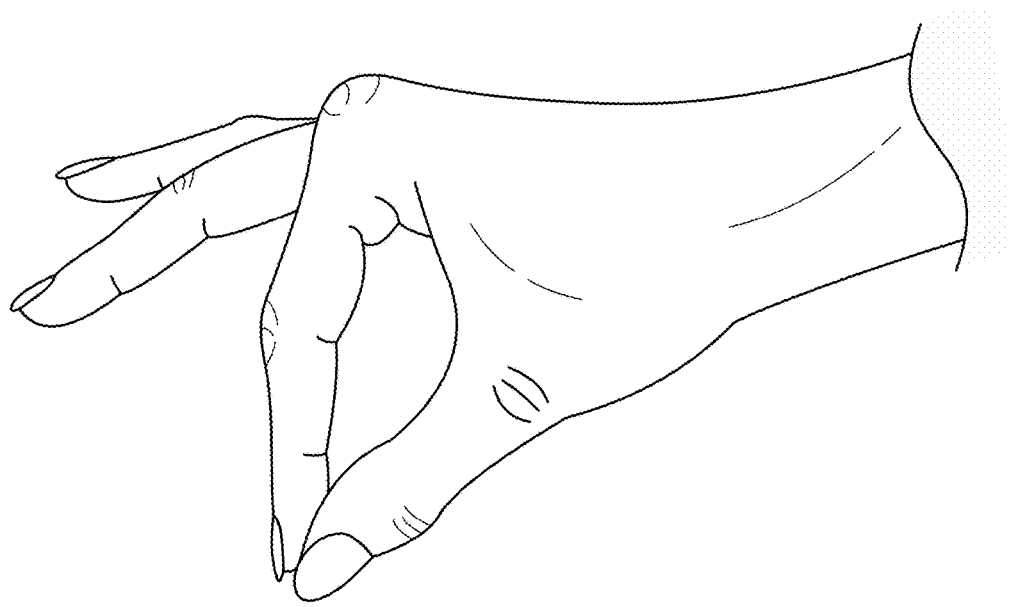
FIG. 7 is an illustration of an exemplary state of a body part of a user donning a wearable device for controlling computing devices via neuromuscular signals.

FIGS. 7 and 8 illustrate exemplary pinch poses 700, 802, 804, and 806 made by a user. As illustrated in FIG. 7, exemplary pinch pose 700 may involve and/or represent a positioning of the user's right index finger and right thumb in a pinch pose. Accordingly, pinch pose 700 may be executed and/or performed as the user pinches, presses, and/or holds his or her right index finger and right thumb together. In one example, pinch pose 700 may be mapped to a click action such that, when the user executes and/or performs pinch pose 700 for a predetermined duration, application system 230 in FIG. 2 may direct and/or cause a corresponding application to click and/or select a certain feature and/or visual element presented in a GUI of that application. This clicking and/or selection of the feature or visual element may be executed and/or performed in connection with the current cursor position.

Figure 19:
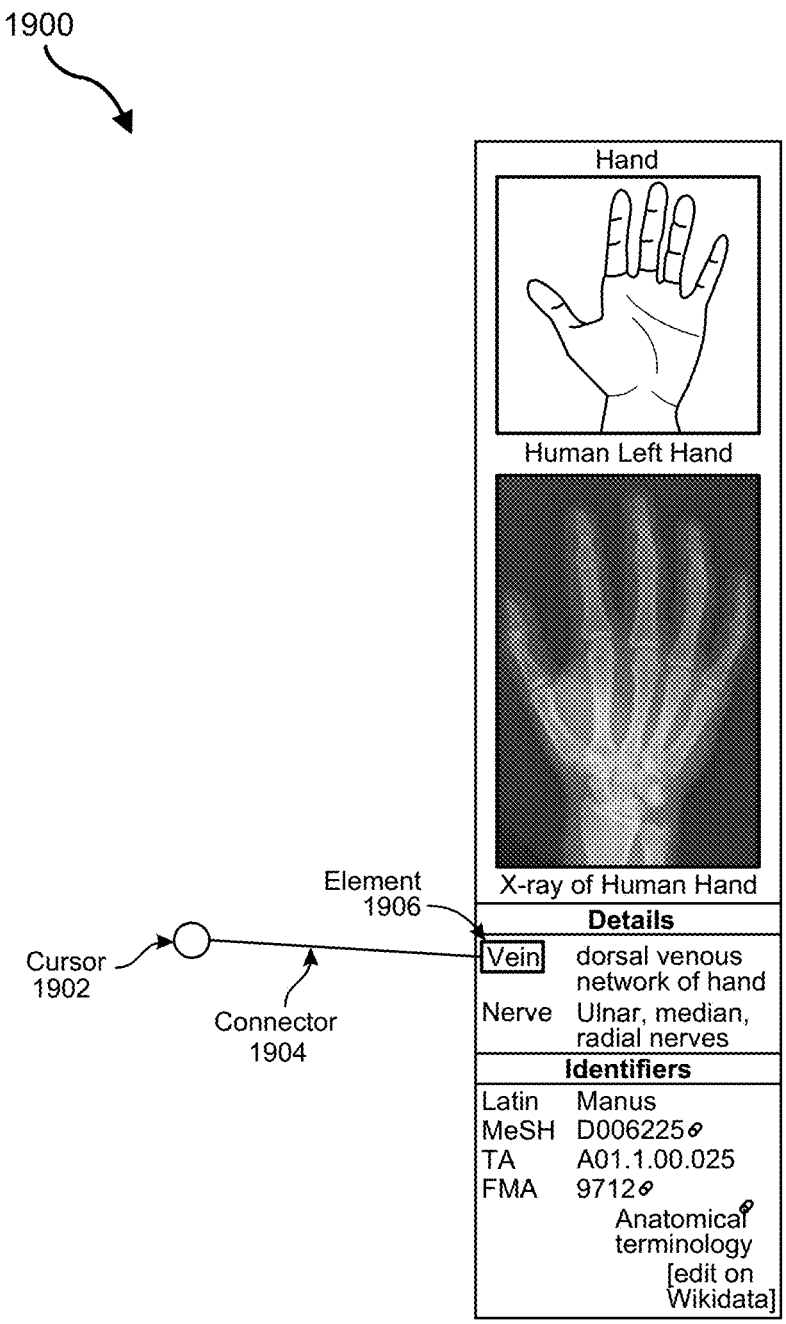
FIG. 19 is an illustration of an exemplary highlighted link activated in a web page in connection with a link-activate setting selected via the popup menu display illustrated in FIG. 17.

In another example, pinch pose 700 may be mapped to an activation action, such as activation action 1900 in FIG. 19. For example, when the user executes and/or performs pinch pose 700 for a predetermined duration, application system 230 in FIG. 2 may direct and/or cause a cursor 1902 in FIG. 19 to move toward element 1906 in a GUI of a corresponding application. As cursor 1902 approaches element 1906, the application may activate element 1906 due at least in part to an association between element 1906 and cursor 1902.

In some examples, the application may provide one or more feedback indicators of this association to the user. Such feedback indicators may inform the user that the HCI system has detected pinch pose 700. For example, the application may indicate and/or show the activation of this association with a connector 1904 between cursor 1902 and element 1906. Additionally or alternatively, the application may indicate and/or show the activation of this association with a box that surrounds and/or encompasses element 1906.

As another example, the application may indicate and/or show the activation of this association by modifying a certain characteristic or feature of a GUI. For example, the application may transition the appearance of cursor 1902 from an empty circle to a filled circle (e.g., as the user holds pinch pose 700 for the predetermined duration). In this example, the circle may appear empty at the initiation of pinch pose 700 and then appear to fill as pinch pose 700 is held over the predetermined duration. In a further example, the application may modify and/or alter the shape and/or color of cursor 1902.

In one example, element 1906 may include and/or represent a hyperlink. In this example, to activate element 1906, the application may cause the GUI to render and/or display a webpage linked to or by element 1906. To exit and/or return from this webpage, the user may execute and/or perform another pose and/or gesture represented in the active mapping. For example, if an open hand pose is mapped to an exit and/or return action, the user may accomplish exiting and/or returning from this webpage by executing and/or performing the open hand pose.

As illustrated in FIG. 8, exemplary pinch pose 800 may involve and/or represent a positioning of the user's right ring finger and right thumb in a pinch pose. Accordingly, pinch pose 800 may be executed and/or performed as the user pinches, presses, and/or holds his or her right ring finger and right thumb together. In one example, pinch pose 800 may be mapped to a click action such that, when the user executes and/or performs pinch pose 800 for three seconds, application system 230 in FIG. 2 may direct and/or cause a corresponding application to display an identifier for the action in a status bar of a GUI. Additionally or alternatively, application system 230 in FIG. 2 may direct and/or cause the application to display a countdown of the remaining time required for pinch pose 800 to be held by the user. Once the user has held pinch pose 800 for the three seconds, application system 230 in FIG. 2 may direct and/or cause the application to perform the mapped action and/or terminate the display of the action identifier and/or the countdown.

Figure 8C:
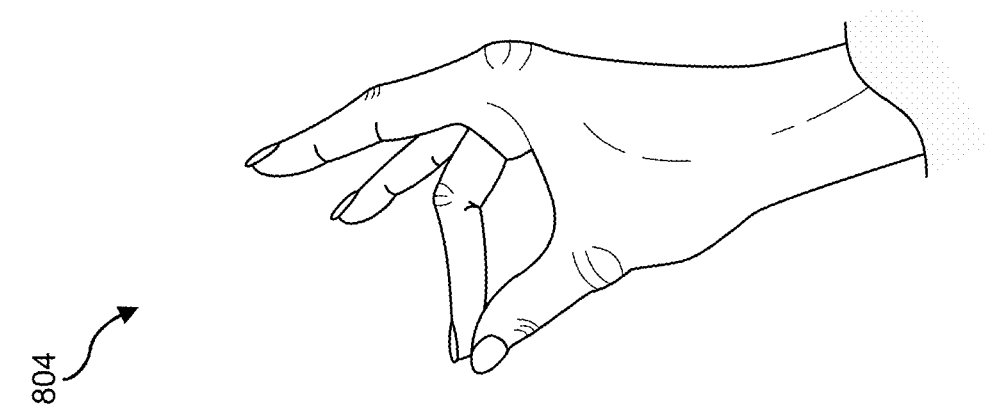
FIG. 8C is an illustration of an exemplary state of a body part of a user donning a wearable device for controlling computing devices via neuromuscular signals.
Figure 8B:
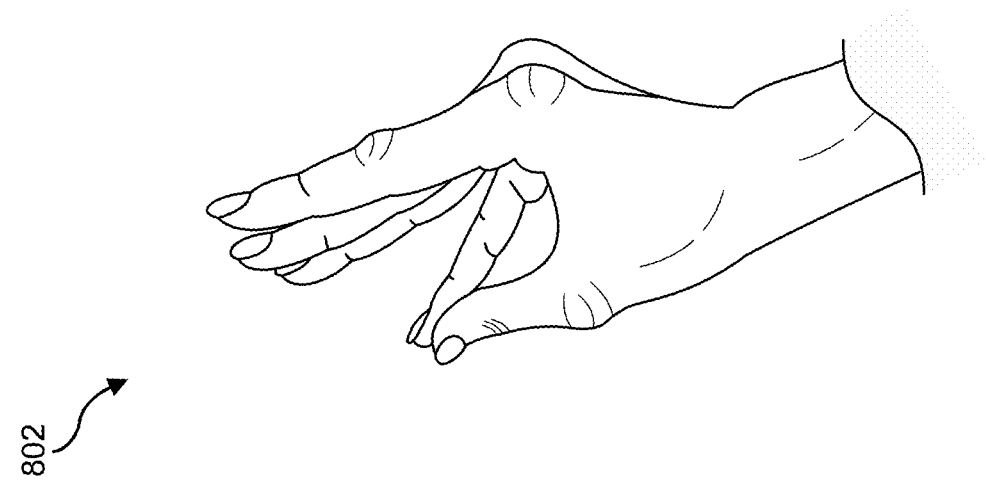
FIG. 8B is an illustration of an exemplary state of a body part of a user donning a wearable device for controlling computing devices via neuromuscular signals.

In one example, pinch pose 802 in FIG. 8B may be mapped to a scrolling action such that, when the user executes and/or performs pinch pose 802, application system 230 in FIG. 2 may direct and/or cause a corresponding application to scroll up a GUI. In this example, pinch pose 804 in FIG. 8C may be mapped to another scrolling action such that, when the user executes and/or performs pinch pose 804, application system 230 in FIG. 2 may direct and/or cause the application to scroll down the GUI.

FIGS. 9A and 9B illustrate exemplary time and amplitude criteria for discrete event detection that may be used in connection with some embodiments. As illustrated in FIG. 9A, a first portion of force time series 902 may satisfy an event criterion 912, and a second portion of force time series 902 may satisfy an event pattern criterion 914. In one example, event criterion 912 and event pattern criterion 914 may be specified and/or defined in any suitable way (such as minimum and/or maximum amplitude values, degree of force maximum and/or thresholds or limits, etc.). As illustrated in FIG. 9B, force time series 920 may satisfy force time series criteria by falling within upper bound 916 and lower bound 918 over a certain time interval.

In some implementations, a combination of pose and force may be used for one-dimensional control. For example, the identified body state may include and/or represent a pose and a force. In this example, the identified pose may dictate and/or influence the responsive action, whereas the identified degree of force may dictate and/or influence a specific characteristic of the responsive action. For example, if the action includes scrolling a GUI in a certain direction, the identified degree of force may dictate and/or influence the speed of that scrolling (e.g., the speed of scrolling may be proportional to the degree of force). As an additional example, if the action includes painting pixels or voxels in a virtual painting application, the identified degree of force may dictate and/or influence the width of the virtual brushstroke.

Figure 23:
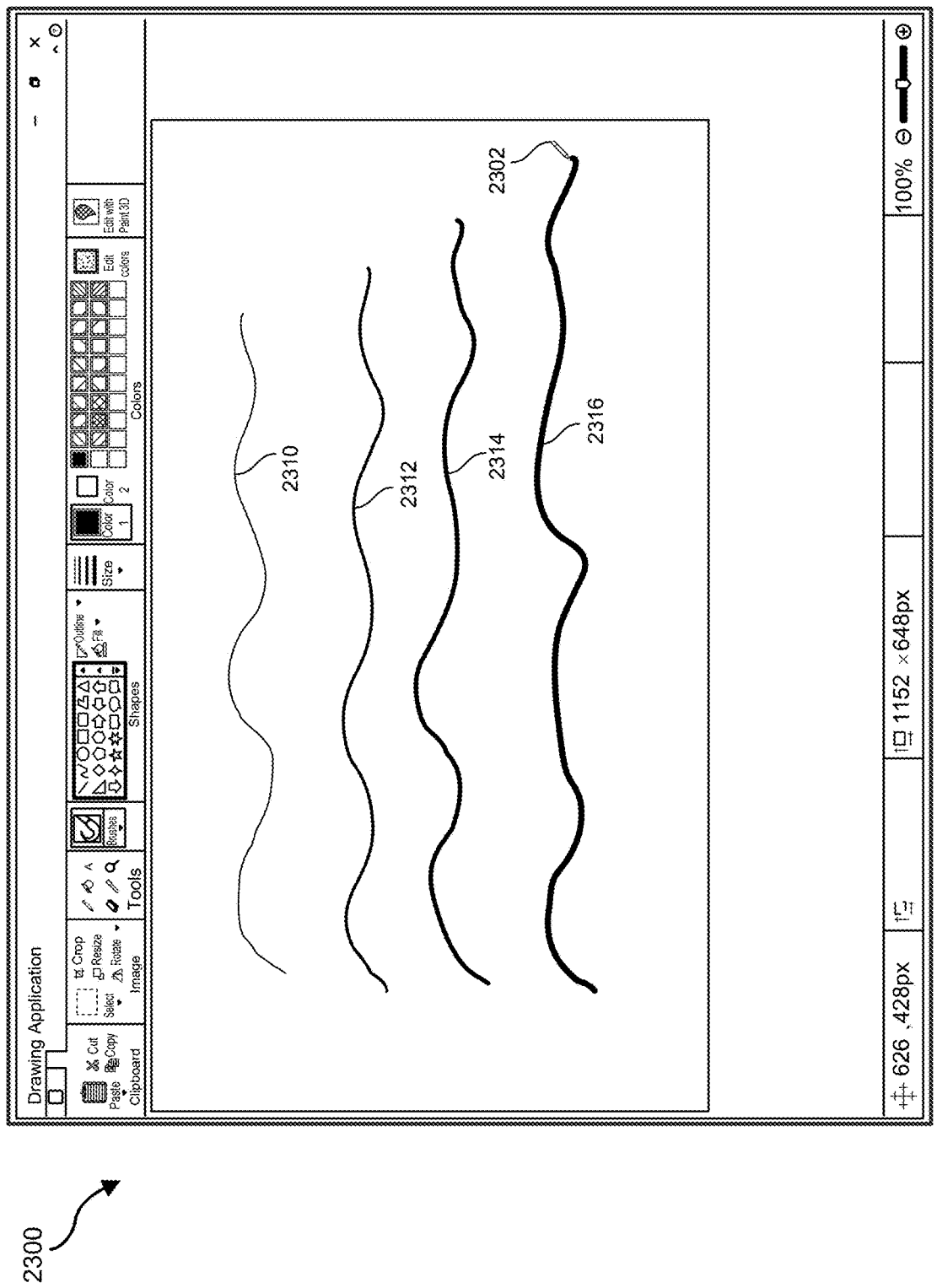
FIG. 23 is an illustration of an exemplary drawing application that includes a virtual drawing instrument whose width is capable of being controlled and/or modified in accordance with certain states of the user's body parts.

FIG. 23 illustrates an exemplary drawing application 2300 that includes a virtual drawing instrument whose width may be controllable and/or modifiable by certain states of the user's body parts. As illustrated in FIG. 23, drawing application 2300 may include a virtual drawing instrument 2302 capable of drawing lines of varying widths. In some examples, the user may be able to control and/or modify the width of such lines based at least in part on the identified degree of force applied in the user's body state. For example, the user may apply one degree of force that causes application system 230 to select a width 2310 for lines drawn by visual drawing instrument 2302 and/or another degree of force that causes application system 230 to select a width 2312 for lines drawn by visual drawing instrument 2302. In this example, the user may apply a further degree of force that causes application system 230 to select a width 2314 for lines drawn by visual drawing instrument 2302 and/or an even further degree of force that causes application system 230 to select a width 2316 for lines drawn by visual drawing instrument 2302. Additionally or alternatively, these degrees of force may be used to increase and/or decrease the width of visual drawing instrument 2302 by discrete increments and/or decrements.

In some embodiments, application system 230 may be configured to provide visual feedback of both the identified pose and the identified force. For example, when the action includes scrolling a GUI, application system 230 may display a cursor in connection with that scrolling. In this example, the cursor may be presented and/or shown as a horizontal line with a bar extending above or below the line, depending on the scrolling direction. Further, the distance to which the bar extends above or below the line (e.g., the height of the bar) may depend on the identified degree of force applied to the pose. As an additional example, when the action includes painting virtual pixels or voxels, application system 230 may vary the size of a cursor depending on the identified degree of force. In this example, the size of the cursor may indicate the position of the virtual brushstroke.

FIGS. 10A-10H illustrate exemplary interactions between a user and an exemplary radial menu 1000 in accordance with some embodiments. In some implementations, application system 230 may be configured to present and/or display radial menu 1000. In one example, application system 230 may incorporate radial menu 1000 into a GUI (e.g., a web browser) and/or a multi-state user interface (e.g., multi-state user interface 2000 in FIG. 20). As illustrated in FIGS. 10E-10H, radial menu 1000 may include certain visual indicators, such as an interface state indicator 1010, a selection indicator 1020, an action indicator 1040, and/or action indicator 1050.

In some examples, interface state indicator 1010 may indicate a transition from a disabled radial menu (e.g., a mode in which the user is not able to interact with the radial menu) to an enabled radial menu (e.g., a mode in which the user is able to interact with the radial menu). In such examples, selection indicator 1020 may indicate a currently selected action (e.g., either action indicator 1040 or action indicator 1050). In one example, application system 230 may perform an action associated with the selected action indicator. For example, if radial menu 1000 is used with a web browser, action indicator 1040 may be associated with a forward action, and/or action indicator 1050 may be associated with a backward action.

FIGS. 10A-10D illustrate exemplary poses and/or gestures suitable for use in connection with radial menu 1000. In some examples, wearable device 102 may detect and/or record a plurality of neuromuscular signals via the body of a user. For example, wearable device 102 may detect and/or record neuromuscular signals from the arm and/or wrist of the user. In this example, wearable device 102, interface system 220, and/or application system 230 may be configured to determine and/or identify a first pose using the recorded signals inputted to an inferential model. Application system 230 may be configured to provide commands and/or instructions to control aspects of radial menu 1000 in response to the identification of the first pose.

FIG. 10A illustrates an exemplary first pose 1002. In some examples, first pose 1002 may be mapped to a command and/or instruction to display, enter, and/or activate radial menu 1000 within a GUI of application system 230. In such examples, prior to the identification of first pose 1002, some or all of radial menu 1000 may be withheld and/or hidden from view within the GUI. In one example, state indicator 1010 may be displayed within the GUI upon identification of first pose 1002.

As shown in FIG. 10E, state indicator 1010 may include and/or represent a circle. In one example, as the user holds first pose 1002 for the predetermined duration, the circle may transition from empty to filled. Once first pose 1002 has been held for the predetermined duration, selection indicator 1020 and/or action indicators 1040 and 1050 may be displayed within the GUI. Alternatively, selection indicator 1020 and/or action indicators 1040 and 1050 may be displayed upon identification of first pose 1002. In another example, state indicator 1010, selection indicator 1020, and/or action indicators 1040 and 1050 may be displayed prior to identification of first pose 1002.

FIG. 10B illustrates an exemplary gesture 1004 that includes and/or represents a first pose combined with a specific movement of the user's wrist. In some examples, the specific movement may involve and/or entail a flexion, extension, deviation, and/or rotation of the user's wrist while he or she holds the first pose. In such examples, the first post combined with the specific movement may be mapped to a command and/or instruction to select a visual indicator in radial menu 1000 (e.g., either action indicator 1040 or action indicator 1050). In one example, the flexion of the wrist may be mapped to selecting action indicator 1050, and the extension of the wrist may be mapped to selecting action indicator 1040.

As shown in FIG. 10F, radial menu 1000 may be configured to indicate and/or identify a selected action indicator within the GUI. For example, in response to a certain pose and/or gesture made by the user, selection indicator 1020 may change from the position shown in FIG. 10E to the position shown in FIG. 10F. In this example, upon completion of this change, selection indicator 1020 may identify and/or point toward action indicator 1050.

More generally, the selection of a visual indicator (such as action indicator 1050) may be demonstrated and/or confirmed using visual, auditory, or haptic feedback. For example, in response to the selection of the visual indicator, application system 230 may play a sound (e.g., a click sound) and/or cause an actuator to vibrate with haptic feedback for user. In some examples, visual feedback may include and/or represent the change of a characteristic of a visual element within radial menu 1000 in response to the selection of the visual indicator. Examples of such a characteristic change include, without limitation, a position change, an orientation change, a color change, a size change, a transparency change, a fill change, an emphasis change, a shadow change, an animation change, a font change, a line type change, a line width change, combinations or variations of one or more of the same, and/or any other suitable characteristic changes.

FIG. 10C illustrates an exemplary finger pinch pose 1006. In some examples, finger pinch pose 1006 may be mapped to a command and/or instruction to click a visual indicator in radial menu 1000 (e.g., either action indicator 1040 or action indicator 1050). In some implementations, the effect of the click may be analogous to a mouse button click and/or a keypress in certain conventional computer systems. In one example, rather than mapping simply finger pinch pose 1006 to the click command, the combination of finger pinch pose 1006 and a certain degree of force may be mapped to the click command. For example, the user may clench his or her fingers with at least a threshold amount of force while maintaining finger pinch pose 1006 to initiate and/or cause the execution of the click command.

As shown in FIG. 10G, radial menu 1000 may be configured to click (e.g., engage with or activate a function of) the currently selected action indicator. In one example, application system 230 may click action indicator 1052 in response to an identified click gesture. In this example, upon performing the click action, application system 230 may cause the visual indicator to appear to depress and/or release (e.g., similar to the pressing and/or releasing of a physical button).

FIG. 10D illustrates an exemplary open hand pose 1008. In some examples, open hand pose 1008 may be mapped to a command and/or instruction to hide, exit, and/or deactivate radial menu 1000. In some implementations, the user may need to hold open hand pose 1008 for a predetermined amount of time before application system 230 executes and/or performs the deactivation command. Following identification of open hand pose 1008, some or all of radial menu 1000 may be obscured and/or hidden from view within the GUI.

As shown in FIG. 10H, a state indicator 1012 may include and/or represent a circle. In one example, as the user holds open hand pose 1008 for the predetermined duration, the circle may transition from empty to filled (or from filled to empty), and/or selection indicator 1020 and action indicators 1040 and 1050 may no longer be displayed within the GUI. Alternatively, selection indicator 1020 and/or action indicators 1040 and 1050 may disappear from the GUI upon identification of open hand pose 1008. In another example, state indicator 1010, selection indicator 1020, and/or action indicators 1040 and 1050 may remain displayed within the GUI following the deactivation command However, radial menu 1000 may not recognize and/or response to a subsequent selection (e.g., a wrist gesture) or click (e.g., a finger pinch pose) command until receiving a subsequent activation command.

FIG. 11A illustrates an exemplary implementation of radial menu 1000 in accordance with some embodiments. As illustrated in FIG. 11A, radial menu 1000 may be superimposed over a webpage 1102. In one example, when associated with webpage 1102, radial menu 1000 may function and/or serve as a navigation menu that enabling the user to move back to a previous page or forward to subsequent page depending on the menu button selected (e.g., using a wrist gesture) and/or clicked (e.g., using a finger pinch pose) by the user in the superimposed navigation menu. In this example, the user may cause the superimposed menu to disappear from webpage 1102 by holding open hand pose 1008 as described above.

FIGS. 11B and 11C illustrate alternative implementations of an exemplary radial menu 1110 in accordance with some embodiments. As illustrated in FIGS. 11B and 11C, radial menu 1110 may include a set of action indicators (e.g., indicator 1111 and indicator 1113). The indicators may be displayed in the GUI along a substantially circular arc. In one example, a first body state may be mapped to the selection of the next indicator in a given sequence. For example, in response to identification of the first body state, application system 230 may deselect indicator 1111 and/or select indicator 1113. Additionally or alternatively, application system 230 may demonstrate and/or conform the selection and/or deselection of a visual indicator using visual, auditory, and/or haptic feedback.

In some embodiments, the first body state and a second body state may represent counterparts of one another. For example, the first body state may include a wrist extension, and the second body state may include a wrist flexion. Additionally or alternatively, the first body state may include a clockwise wrist rotation, and the second body state may include a counterclockwise wrist rotation. In a further example, the first body state may include a radial deviation, and the second body state may include an ulnar deviation.

FIGS. 11D and 11E illustrate implementations of an exemplary sequential menu 1120 in accordance with some embodiments. In certain examples, sequential menu 1120 may include and/or represent a sequence of visual indicators (depicted as "A" through "F"). In such examples, sequential menu 1120 may provide a suitable spatial arrangement among these visual indicators (e.g., throughout the rows and columns in illustrated in FIGS. 11D and 11E). In one example, a first body state may be mapped to the selection of the next visual indicator in the sequence, and a second body state may be mapped to the selection of the previous visual indicator in the sequence. For example, in response to identification of the second body state, application system 230 may deselect subsequent indicator 1123 and/or select prior indicator 1121.

Figure 20:
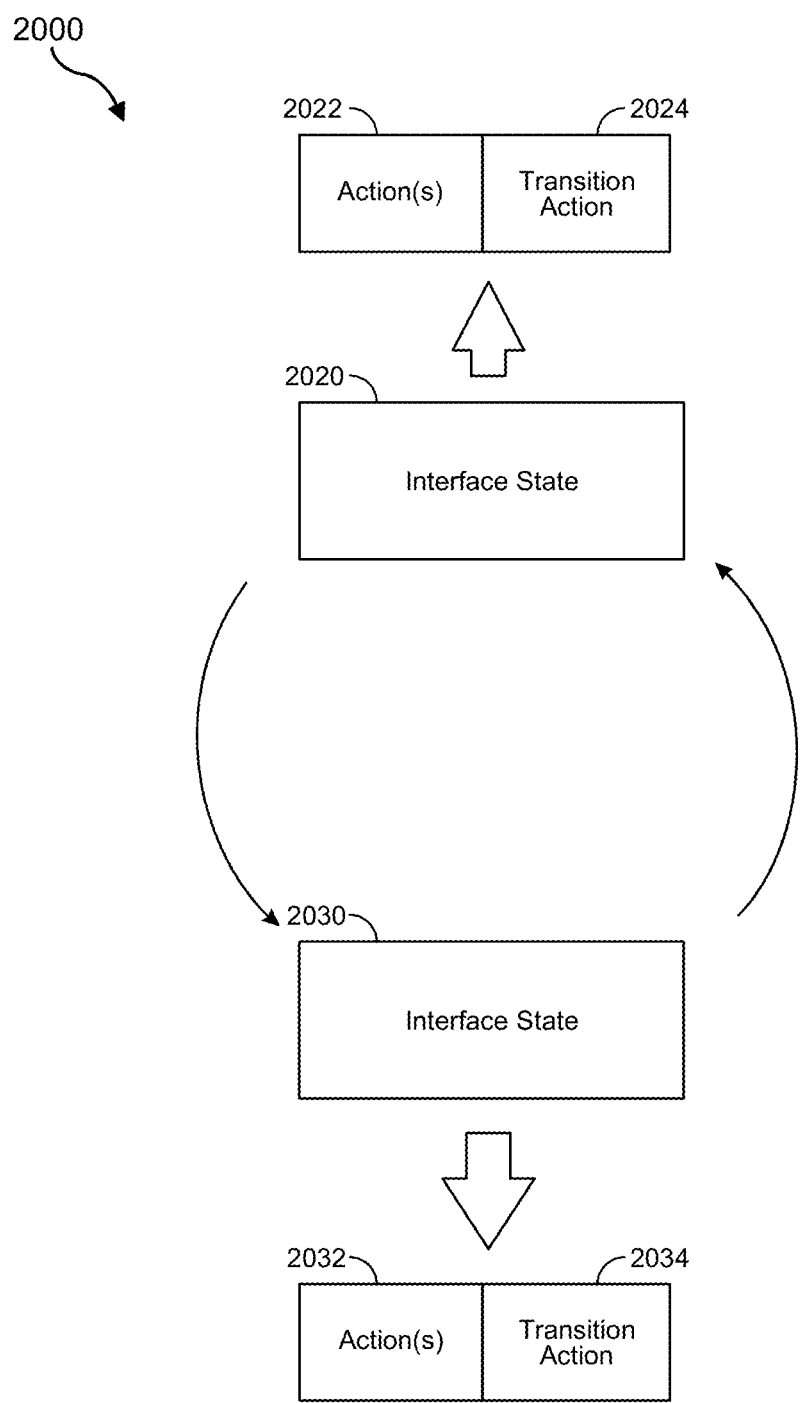
FIG. 20 is an illustration of an exemplary transition between mappings of possible states of the user's body parts and actions capable of being performed by a computing device.

FIG. 20 illustrates a state diagram of an exemplary multi-state user interface 2000 in accordance with some embodiments. Multi-state user interface 2000 may be implemented by any suitable computing system, including any of the devices incorporated into HCI system 200 in FIG. 2 (e.g., wearable device 102, interface system 220 and/or application system 230). In one example, multi-state user interface 2000 may receive body state information from wearable device 102, interface system 220, and/or application system 230. Multi-state user interface 2000 may then identify, determine, and/or recognize certain body states, as defined by the user or by default, based at least in part on such information. In some cases, certain hand and arm poses and/or gestures may be symbolic and/or communicate according to cultural standards.

Multi-state user interface 2000 may be configured and/or programmed with multiple interface states (e.g., interface state 2020 and interface state 2030). Each of the multiple interface states may implement and/or represent mappings between one or more body states to a set of responsive actions. As an example, interface state 2020 may implement and/or represent a first mapping from a first set of body states to a first set of responsive actions 2022, and interface state 2030 may implement and/or represent a second mapping from a second set of body states to a second set of actions 2032. The first set of body states may differ from the second set of body states, and the first set of actions 2022 may differ from the second set of actions 2032. Alternatively, the same body states may map to differing responsive actions in different interface states. Further, differing body states may map to the same actions across different interface states.

Figure 12:
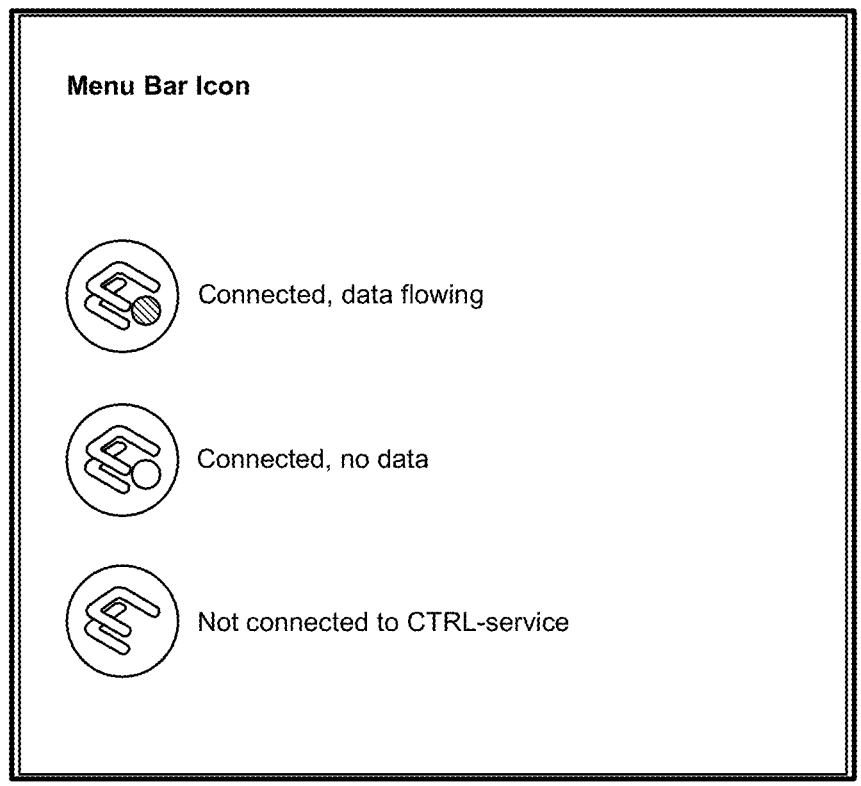
FIG. 12 is an illustration of an exemplary menu bar icon indicating whether a wearable device donned by a user is connected to a computing device.
Figure 13:
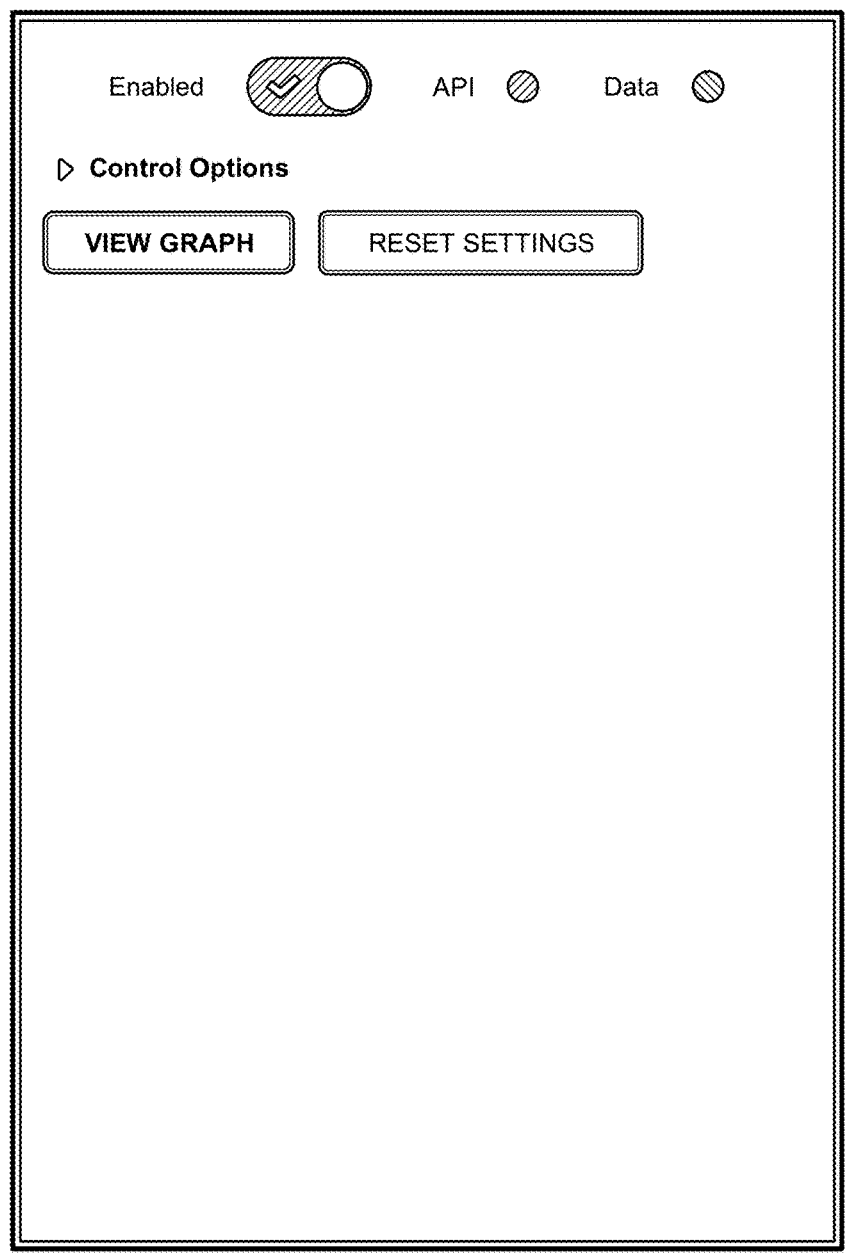
FIG. 13 is an exemplary popup menu display that enables a user to activate and/or deactivate certain mappings between possible states of the user's body parts and actions capable of being performed by a computing device.

In some embodiments, multi-state user interface 2000 may provide information about the current status of HCI system 200 via one or more visual, auditory, or haptic indicators. For example, multi-state user interface 2000 may be configured to display a connection status between interface system 220 (or application system 230) and wearable device 102. FIG. 12 illustrates an exemplary menu bar icon 1200 that demonstrates different appearances of a menu button displaying such a connection status. This menu button may be displayed in a menu bar of multi-state user interface 2000 (or another application running on application system 230).

The menu button may change in appearance to indicate the status of interface system 220. For example, a first appearance of the menu button may indicate that wearable device 102 is connected and sending data to interface system 220. In this example, a second appearance of the menu button may indicate that wearable device 102 is connected and but not sending data to interface system 220 or application system 230. Finally, a third appearance of the menu button may indicate that wearable device 102 is not connected to interface system 220.

In some implementations, multi-state user interface 2000 may be configured to provide and/or indicate its current state and/or setting of interface 2000 (e.g., whether interface state 2020 or interface state 2030 is currently active), a current body state, and/or a current action corresponding to the identified body state. For example, when a body state mapped to a responsive action includes a pose held for a predetermined duration, multi-state user interface 2000 may provide an indication that the HCI system 200 has recognized the pose. Furthermore, multi-state user interface 2000 may provide an indication of the remaining time necessary for the user to hold the pose before initiating performance of the action mapped to the pose.

In some implementations, multi-state user interface 2000 may include one or more graphical elements for displaying the current interface state, the current body state, and/or the responsive action. For example, the title bar, the menu bar, and/or the status bar of a GUI may display the current interface state, the current body state, and/or the responsive action. Additionally or alternatively, multi-state user interface 2000 may modify a visual characteristic (e.g., size, shape, fill, emphasis, orientation, animation, etc.) of one or more elements of the GUI (e.g., cursor, control element, indicator element, etc.) to indicate the current interface state, current body state, and/or the responsive action.

In some embodiments, multi-state user interface 2000 may be configured to indicate current interface state, the current body state, and/or the responsive action with visual, auditory, or haptic feedback. For example, the transition to a new interface state or the performance of a responsive action may be accompanied by a graphical presentation, sound, and/or vibration provided to the user.

Figure 24:
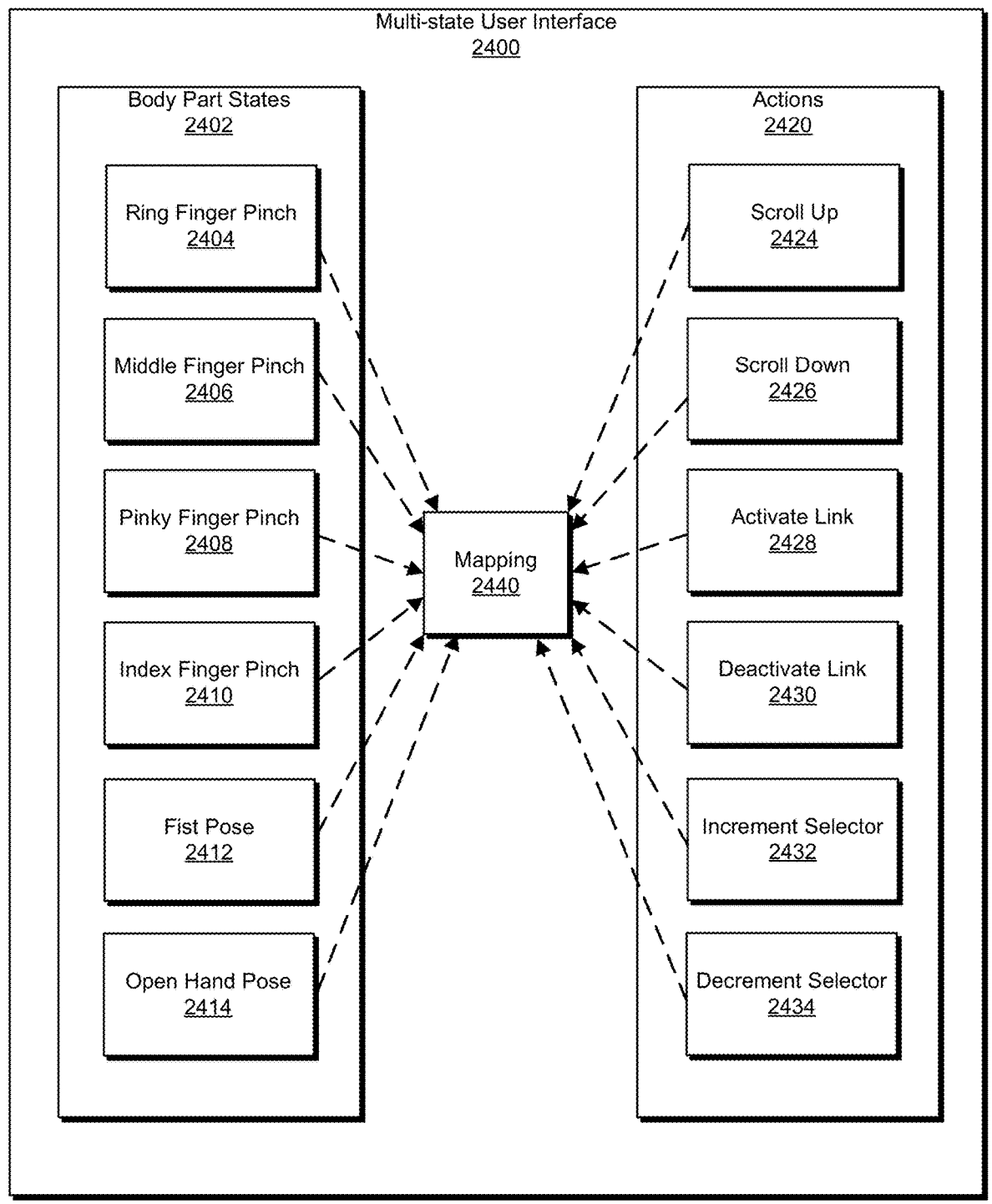
FIG. 24 is an illustration of an exemplary multi-state user interface that enables a user to select and/or define certain mappings between possible states of the user's body parts and actions capable of being performed by a computing device.

In some embodiments, multi-state user interface 2000 may be configurable and/or programmable by a user. Accordingly, the user may be able to specify and/or select mappings between certain body states and responsive actions for one or more interface states. FIG. 24 illustrates an exemplary multi-state user interface 2400 that enables the user to select and/or define certain mappings between body part states 2402 and actions 2420. As illustrated in FIG. 24, body part states 2402 may include and/or represent a ring finger pinch 2404, a middle finger pinch 2406, a pinky finger pinch 2408, an index finger pinch 2410, a first pose 2412, and/or an open hand pose 2414. In this example, actions 2420 may include and/or represent a scroll up 2424, a scroll down 2426, an activate link 2428, a deactivate link 2430, an increment selector 2432, and/or a decrement selector 2434.

In some examples, the user may be able to select and/or define a mapping 2440 between one or more of body part states 2402 and actions 2420 via multi-state user interface 2400. For example, the user may direct multi-state user interface 2400 to map ring finger pinch 2404 to scroll up 2424 via mapping 2440 such that, when the user makes a ring finger pinch pose, the page and/or browser displayed on application system 230 scrolls up. Additionally or alternatively, the user may direct multi-state user interface 2400 to map pinky finger pinch 2408 to map pinky finger pinch 2408 to scroll down 2424 via mapping 2440 such that, when the user makes a pinky finger pinch pose, the page and/or browser displayed on application system 230 scrolls down.

Figure 14:
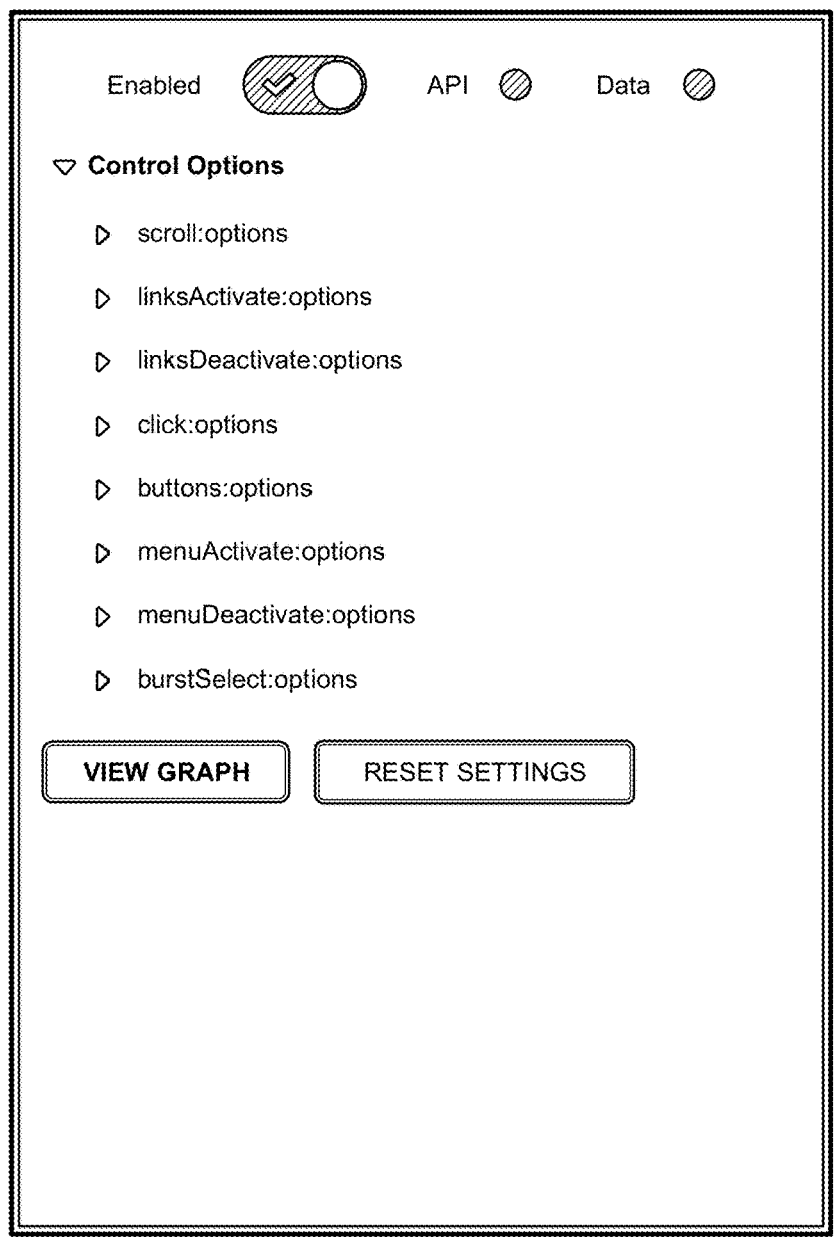
FIG. 14 is an exemplary popup menu display that enables a user to activate and/or deactivate certain mappings between possible states of the user's body parts and actions capable of being performed by a computing device.

FIGS. 13-17 illustrate exemplary portions and/or views of a multi-state user interface 1300 that enables a user to specify and/or select the mappings. For example, multi-state user interface 1300 in FIG. 13 may include and/or represent a popup box and/or dialog that appears in response to certain user input. In this example, multi-state user interface 1300 may facilitate enabling and/or disabling body state control (e.g., using the "enabled" button). In addition, multi-state user interface 1300 may indicate a current status of HCI system 200 (e.g., using the "API" and "Data" indicators). As illustrated in FIG. 14, multi-state user interface 1300 may include a drop-down menu control from which the user is able to select certain display settings and/or map certain body states to responsive actions.

Figure 8A:
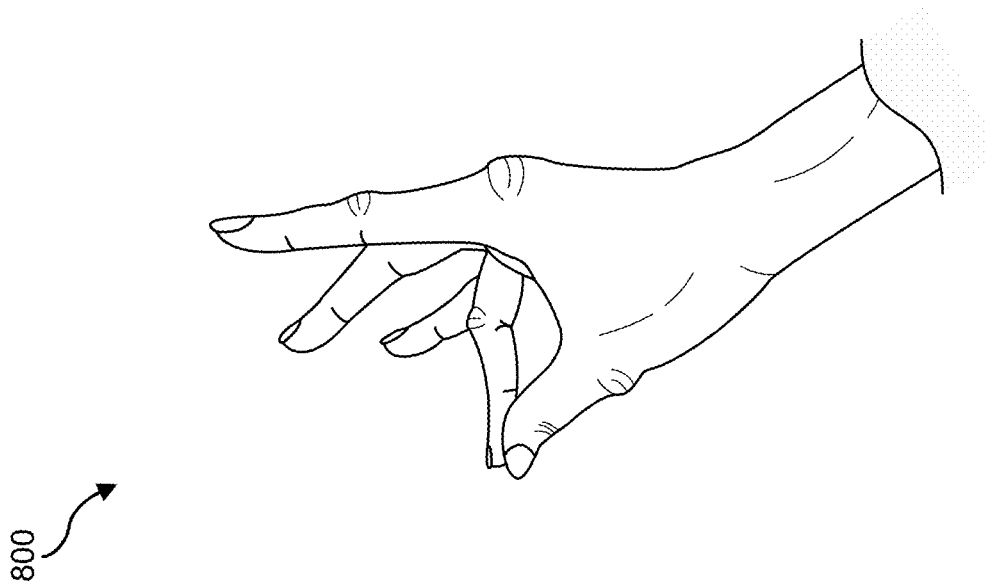
FIG. 8A is an illustration of an exemplary state of a body part of a user donning a wearable device for controlling computing devices via neuromuscular signals.
Figure 15:
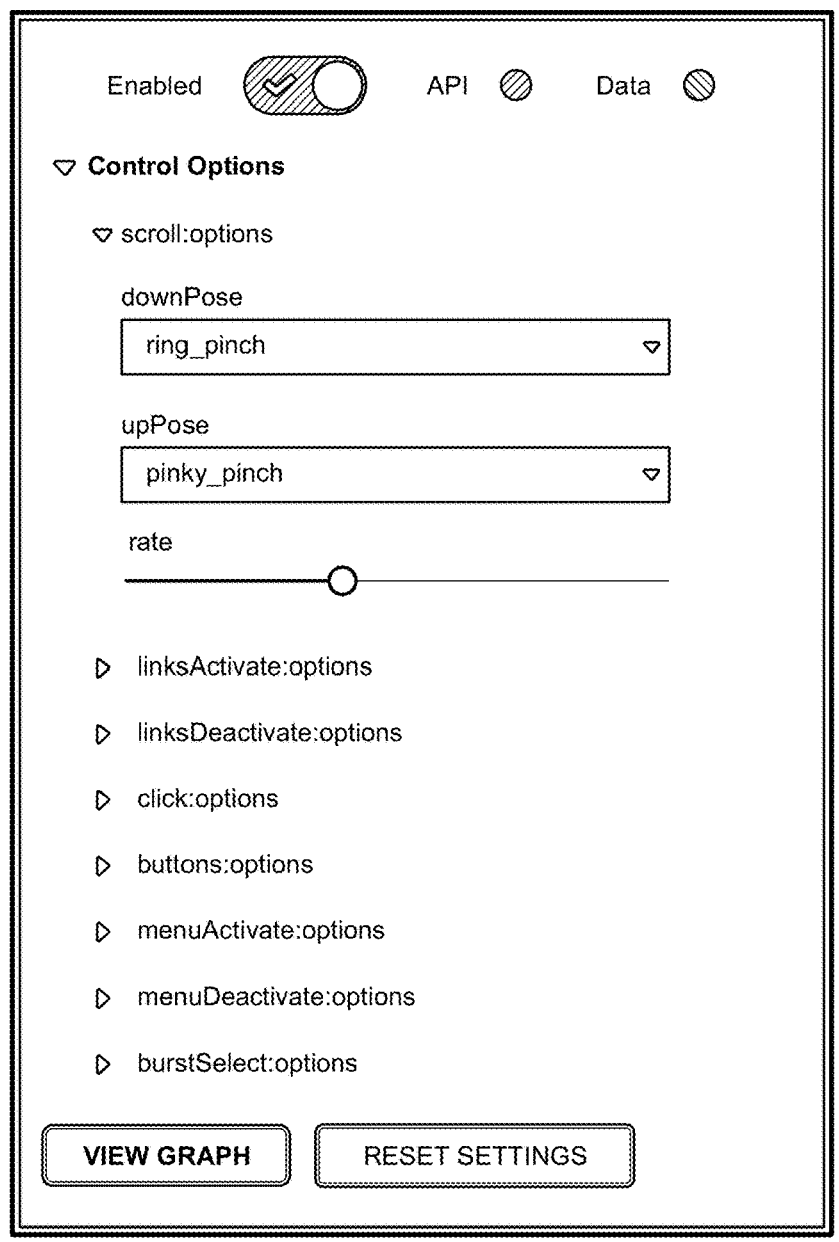
FIG. 15 is an exemplary popup menu display that enables a user to activate and/or deactivate certain mappings between possible states of the user's body parts and actions capable of being performed by a computing device.

Through multi-state user interface 1300, the user may modify the mappings between body states and actions. For example, if multi-state user interface 1300 includes and/or represents a web browser, the user may configure web navigation settings by selecting setting options shown in a drop-down menu of the web browser. As shown in FIG. 15, multi-state user interface 1300 may enable the user to click on and/or select "scroll:options" to configure a type of pose that initiates a scrolling control or feature. In this example, the user may map the scroll-down action with a ring finger pinch pose (as shown in FIG. 8A) and the scroll-up action with a pinky finger pinch (as shown in FIG. 8B). Accordingly, when the user holds a ring finger pinch pose, the web browser may receive a scroll-down command from application system 230. The web browser may then scroll down the displayed webpage.

Figure 16:
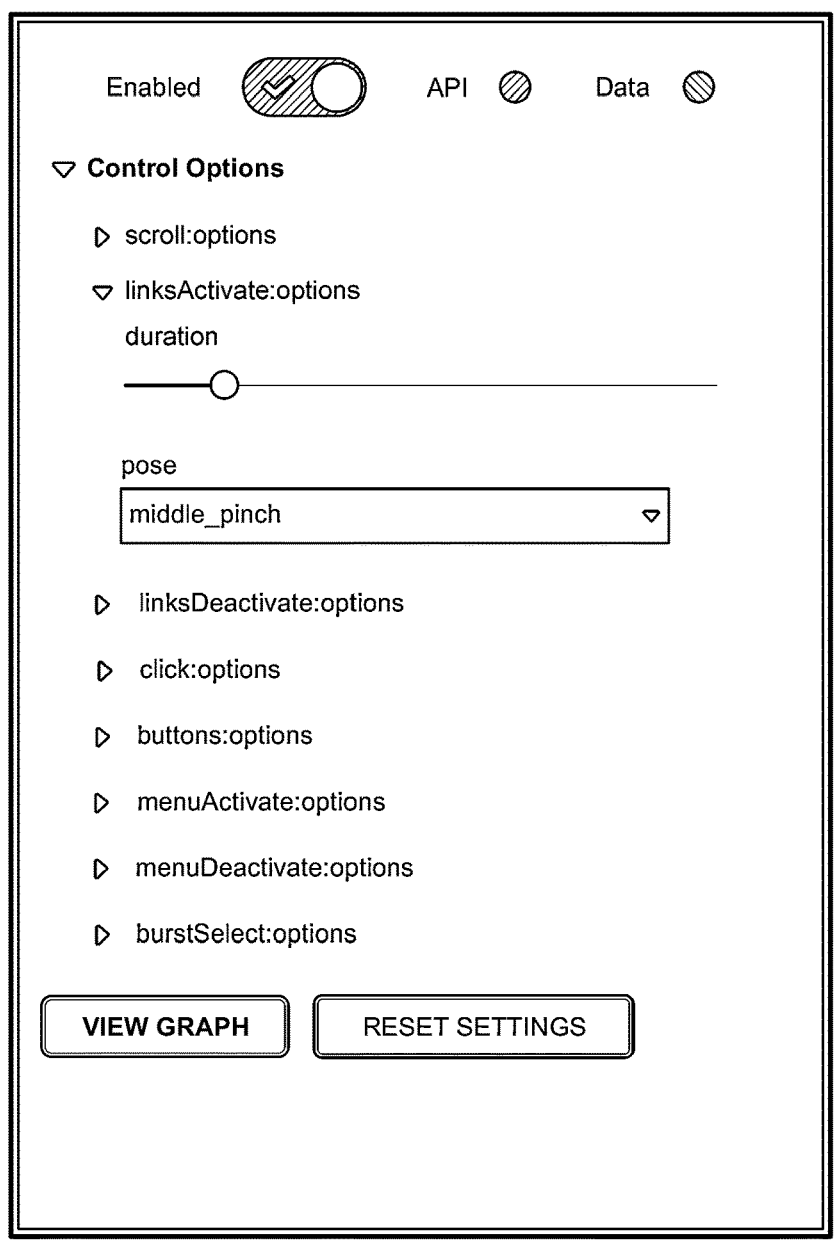
FIG. 16 is an exemplary popup menu display that enables a user to activate and/or deactivate certain mappings between possible states of the user's body parts and actions capable of being performed by a computing device.

As an additional example, FIG. 16 illustrates an exemplary "link activate" setting used to highlight links included in a web page. As shown in FIG. 16, multi-state user interface 1300 may enable the user to click on "linksActivate:options" to configure a type of pose and predetermined pose duration that initiates the activation and/or rendering of a link displayed in a webpage. In the example, the user may map the link-activation action to a middle finger pinch pose (as shown in FIG. 8C). Accordingly, when the user holds a middle finger pinch pose for the selected pose duration, the web browser may receive an activate-link command from application system 230. The web browser may then activate and/or render a link associated with the current cursor position.

Figure 17:
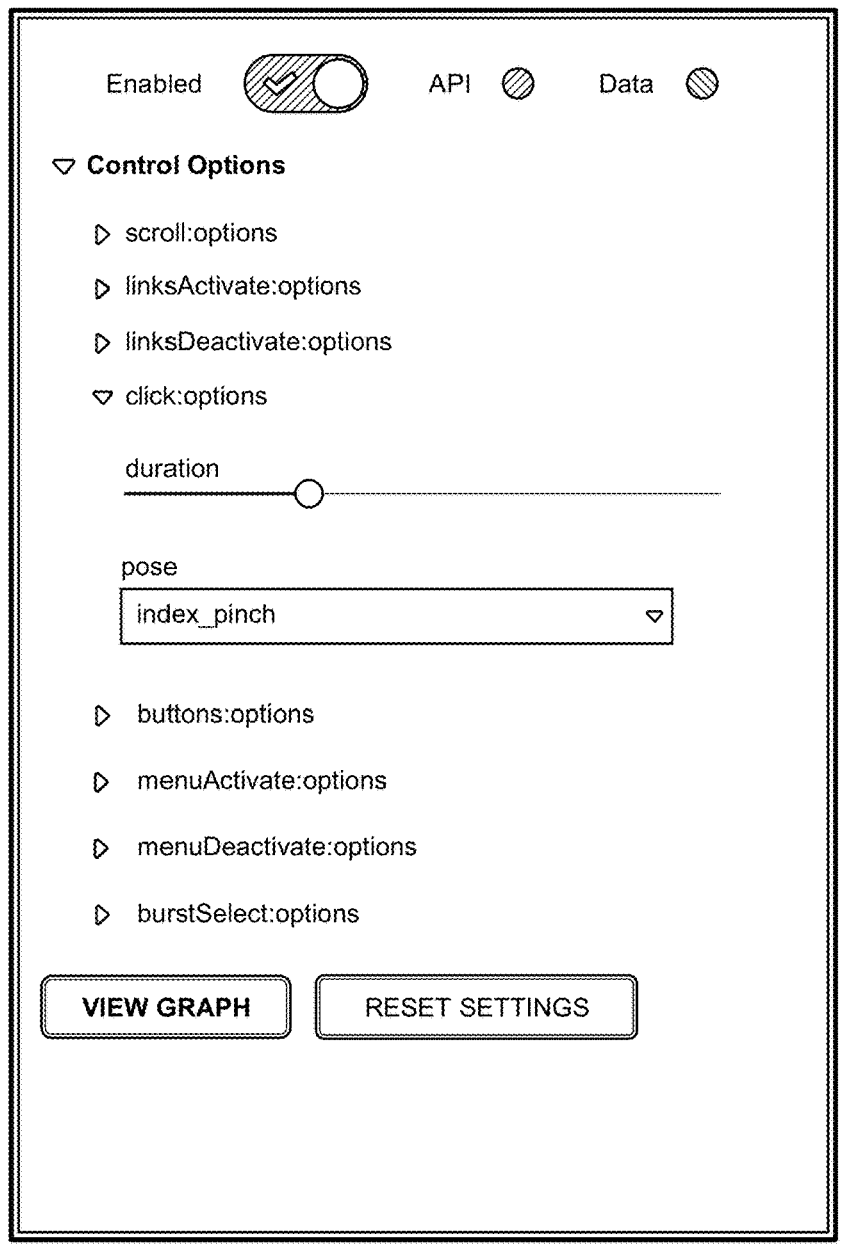
FIG. 17 is an exemplary popup menu display that enables a user to activate and/or deactivate certain mappings between possible states of the user's body parts and actions capable of being performed by a computing device.

As a further example, FIG. 17 illustrates an exemplary "click action" setting used to map a pose to a click action. As shown in FIG. 17, multi-state user interface 1300 may enable the user to click on "click:options" to configure a type of pose and predetermined pose duration that initiates a click action in an application (e.g., emulating a trackball or mouse click). In this example, the user may map the click action to an index finger pinch pose (as shown in FIG. 7). Accordingly, when the user holds an index finger pinch pose for the selected pose duration, the application may receive a click command from application system 230. The application may then perform the click action on a control and/or feature associated with the current cursor position.

In some examples, multi-state user interface 1300 may be configured and/or programmed as a plugin or API for use with existing applications. For example, multi-state user interface 1300 may be formatted and/or packaged to provide a body state recognition functionality as a web browser plugin for use with existing web browsers running on application system 230.

Figure 18:
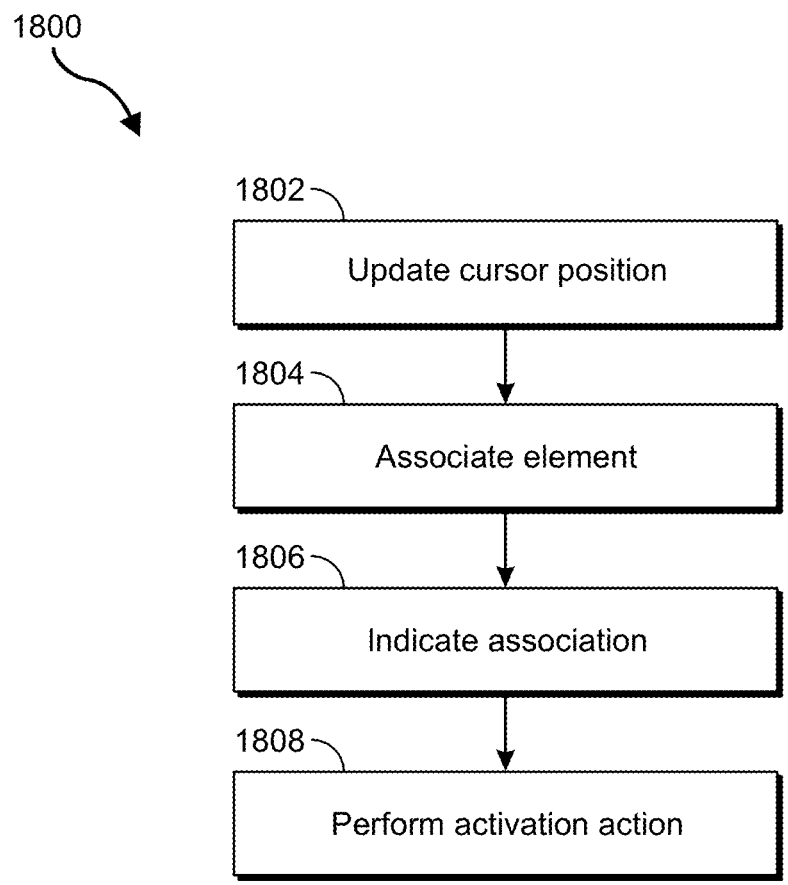
FIG. 18 is a flow diagram of an exemplary method for controlling a graphical user interface of a computing device via a wearable device donned by a user.

FIG. 18 illustrates an exemplary method 1800 for assisted user interface navigation in accordance with some embodiments. Method 1800 may facilitate convenient selection and/or activation of elements in a GUI by associating such elements with the current position of the user's cursor. Upon making this association, the user may activate one or more of those elements in the GUI to initiate a certain action in the application. As a result, the user may be able to interact with an application running on application system 230 in FIG. 2 without necessitating precise control over the cursor position.

As illustrated in FIG. 18, method 1800 may include a step 1802 of updating a cursor position in a GUI of an application. In this example, method 1800 may also include a step 1804 of associating an element of the GUI with the updated cursor position. The element may be any suitable feature of the GUI, including a hyperlink, a data entry field, an/or a control indicator. In one example, this association may be formed and/or initiated as a result of the cursor being positioned within a certain distance and/or range of the element. For example, application system 230 may be configured to associate the cursor with the closest applicable element within the GUI, especially if the determined distance between the cursor and that element is within a predetermined threshold or range.

Method 1800 may further include a step 1806 of providing a feedback indication of the association to the user. For example, application system 230 may provide a visual, auditory, or haptic indication of the association to the user. In one example, application system 230 may provide auditory prompts and/or feedback representative of the association using speakers associated with HCI system 200. As a further example, application system 230 may provide haptic prompts or feedback representative of the association using actuators that apply forces to the user's body. Additionally or alternatively, application system 230 may provide a visual indication of the association by modifying a characteristic of the cursor and/or the associated element.

Method 1800 may additionally include a step 1808 of performing an activation action based at least in part on the association between the cursor and the element. For example, an activation action may be mapped to a specific body state. In response to the identification of the mapped body state, application system 230 may determine whether the cursor is associated with a certain element of the GUI. If the cursor is associated with that element of the GUI, application system 230 may perform the mapped activation action on the associated element.

Figure 21A:
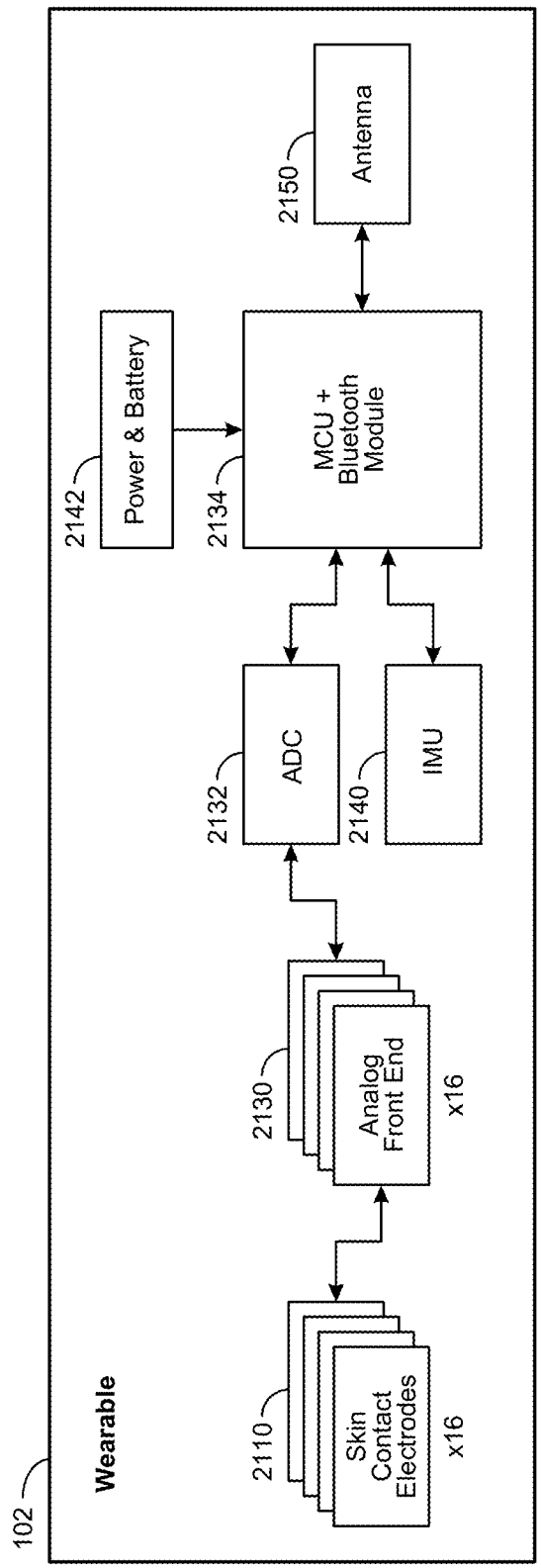
FIG. 21A is an illustration of exemplary wearable device for controlling computing devices via neuromuscular signals of users.
Figure 21B:
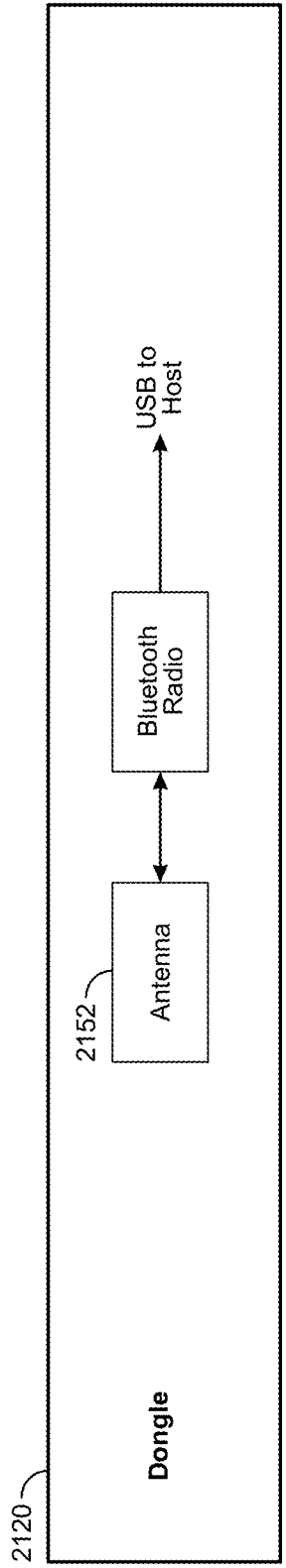
FIG. 21B is an illustration of exemplary dongle that is connected to a computing device and facilitates interfacing a wearable device with the computing device.

FIGS. 21A and 21B illustrate an exemplary block diagram of wearable device 102 with sixteen EMG sensors. As shown in FIG. 21A, wearable device 102 may include sensors 2110 that record neuromuscular signals traversing the user's body. The output of the sensors 2110 may be provided to analog front end 2130, which performs analog processing (e.g., noise reduction, filtering, etc.) on the recorded signals. The processed analog signals may then be provided to analog-to-digital converter (ADC) 2132, which converts the analog signals to digital signals for further processing by a computer processor (MCU) 2134. In one example, MCU 2134 may receive inputs from other sensors (e.g., IMU sensor 2140) and/or electric current from power and battery module 2142. The output of the processing performed by MCU 2134 may be provided to antenna 2150 for transmission to dongle 2120 shown in FIG. 21B.

In one example, dongle 2120 in FIG. 21B may communicate with the wearable device 102 (e.g., via Bluetooth or another suitable short-range wireless communication technology). In this example, dongle 2120 may include antenna 2152 configured to communicate with antenna 2150 of wearable device 102. The signals received by antenna 2152 of dongle 2120 may be provided to a host computer for further processing, display, and/or effecting control of a particular physical or virtual element of that host computer.

Figure 22:
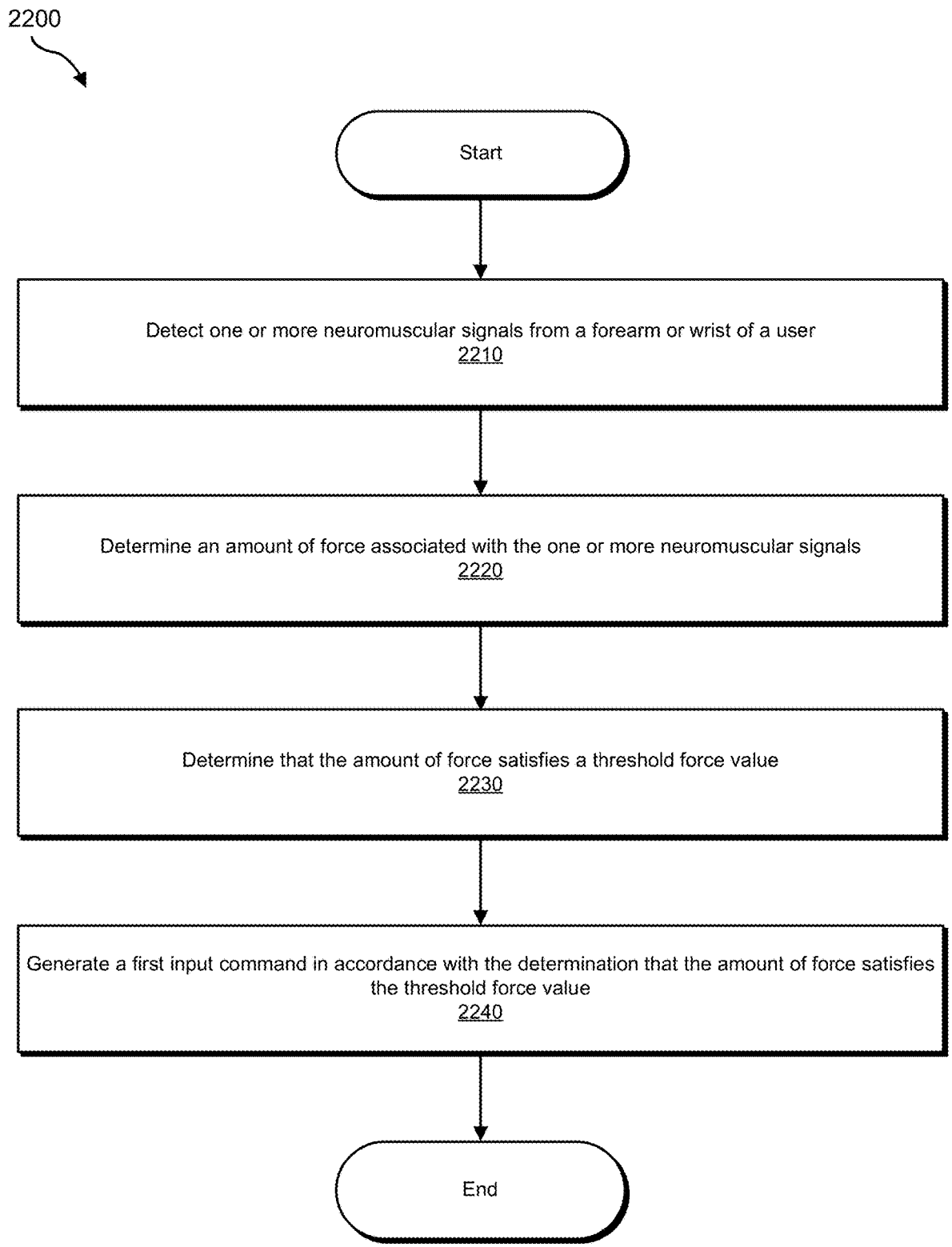
FIG. 22 is a flowchart of an exemplary method for controlling computing devices via neuromuscular signals of users.

FIG. 22 is a flow diagram of an exemplary method 2200 for controlling computing devices via neuromuscular signals of users. The steps shown in FIG. 22 may be performed during the operation of an HCI system implemented and/or deployed by a user. Additionally or alternatively, the steps shown in FIG. 22 may also incorporate and/or involve various sub-steps and/or variations consistent with the descriptions provided above in connection with FIGS. 1-21.

As illustrated in FIG. 22, method 2200 may include a step 2210 in which one or more neuromuscular signals are detected and/or sensed from a forearm or wrist of a user. For example, a user donning wearable device 102 may make a pose and/or gesture that causes neuromuscular signals to traverse down the user's arm toward his or her hand. In this examples, wearable device 102 may include and/or incorporate a plurality of sensors that detect, sense, and/or measure those neuromuscular signals.

As illustrated in FIG. 22, method 2200 may also include a step 2220 in which an amount of force associated with the one or more neuromuscular signals are determined. For example, wearable device 102 or another portion of HCI system 200 may include and/or incorporate at least one processor that implements one or more trained inferential models. In this example, the one or more trained inferential models may analyze and/or consume data representative of the neuromuscular signals. Upon doing so, the one or more trained inferential models may determine the amount of force associated with the neuromuscular signals.

As illustrated in FIG. 22, method 2200 may also include a step 2230 in which the amount of force associated with the one or more neuromuscular signals is determined to have satisfied a threshold force value. For example, wearable device 102 or another portion of HCI system 200 may include and/or incorporate at least one processor that determines that the amount of force associated with the neuromuscular signals satisfies a threshold force value. In this example, the threshold force value may represent a certain level of force associated with a specific action to be performed by HCI system 200.

As illustrated in FIG. 22, method 2200 may further include a step 2240 in which a first input command is generated in accordance with the determination that the amount of force satisfies the threshold force value. For example, wearable device 102 or another portion of HCI system 200 may include and/or incorporate at least one processor that generates a first input command for HCI system 200 in response to the determination that the amount of force satisfies the threshold force value. In this example, the first input command may direct and/or cause HCI system 200 to perform a specific action that corresponds to the amount of force exerted by the user.

EXAMPLE EMBODIMENTS

Example 1: A human computer interface (HCI) system comprising (1) a plurality of sensors that detect one or more neuromuscular signals via a body of a user of a computing system and (2) at least one processing device that (A) determines, based at least in part on the neuromuscular signals detected by the plurality of sensors, a state of at least one body part of the user and, in response to determining the state of the body part, (B) generates an input command for the computing system that accounts for the state of the body part.

Example 2: The HCI system of Example 1, wherein (1) the plurality of sensors generate data representative of the neuromuscular signals detected via the body of the user and (2) the processing device (A) provides the data representative of the neuromuscular signals to an inferential model and (B) determines, based at least in part on an output of the inferential model, the state of the body part of the user.

Example 3: The HCI system of Example 1, wherein the processing device (1) determines, based at least in part on the neuromuscular signals detected by the plurality of sensors, an amount of force produced by the body part of the user and, in response to determining the state of the body part and the amount of force produced by the body part, (2) generates the input command for the computing system to account for the state of the body part and the amount of force produced by the body part.

Example 4: The HCI system of Example 3, wherein (1) the plurality of sensors generate data representative of the neuromuscular signals detected via the body of the user, and (2) the processing device (A) provides the data representative of the neuromuscular signals to an inferential model and (B) determines, based at least in part on an output of the inferential model, the state of the body part of the user and the amount of force produced by the body part.

Example 5: The HCI system of Example 1, the processing device causes the computing system to perform at least one action based at least in part on the input command.

Example 6: The HCI system of Example 5, wherein the processing device (1) identifies at least one characteristic of the action to be regulated in accordance with an amount of force produced by the body part and (2) formulates the input command to account for the amount of force produced by the body part such that the characteristic of the action corresponds to the amount of force produced by the body part.

Example 7: The HCI system of Example 6, wherein (1) the action comprises at least one of (A) scrolling through a graphical user interface (GUI) of an application running on the computing system or (B) drawing a visual element on a GUI of an application running on the computing system, and (2) the characteristic of the action comprises at least one of (A) a scrolling speed or (B) a width of a virtual drawing instrument.

Example 8: The HCI system of Example 5, wherein the action comprises at least one of (1) moving a cursor displayed on a GUI of an application running on the computing system, (2) associating a cursor of the computing system with a visual element displayed in a GUI of an application running on the computing system based at least in part an updated position of the cursor relative to the visual element, or (3) providing, to the user of the computing system, a feedback indication of an association made between a cursor of the computing system and a visual element displayed in a GUI of an application running on the computing system.

Example 9: The HCI system of Example 8, wherein the feedback indication of the association comprises at least one of (1) modifying at least one characteristic of the visual element of the GUI or (2) adding, to the GUI, at least one further visual element that represents the association.

Example 10: The HCI system of Example 8, wherein associating the cursor with the visual element comprises (1) determining that the updated position of the cursor is within a certain distance of the visual element in the GUI and, in response to determining that the updated position of the cursor is within the certain distance of the visual element, (2) associating the cursor with the visual element.

Example 11: The HCI system of Example 10, wherein determining that the updated position of the cursor is within the certain distance of the visual element comprises (1) identifying a position of the visual element within the GUI, (2) identifying at least one position of at least one additional visual element within the GUI, and (3) determining that the updated position of the cursor is closer to the position of the visual element than the position of the additional visual element.

Example 12: The HCI system of Example 8, wherein associating the cursor with the visual element comprises (1) detecting a direction in which the cursor moved within the GUI to reach the updated position and (2) associating the cursor with the visual element based at least in part on the direction in which the cursor moved to reach the updated position.

Example 13: The HCI system of Example 8, wherein associating the cursor with the visual element comprises (1) detecting a speed at which the cursor moved within the GUI to reach the updated position and (2) associating the cursor with the visual element based at least in part on the speed at which the cursor moved to reach the updated position.

Example 14: The HCI system of Example 5, wherein the processing device (1) maintains a mapping between possible states of the body part and actions capable of being performed by the computing system and (2) determines the action to be performed by the computing system based at least in part on the mapping and the state of at least one body part.

Example 15: The HCI system of Example 14, wherein the processing device (1) maintains an additional mapping between the possible states of the body part and additional actions capable of being performed by the computing system and (2) activating the mapping such that one of the actions is performed by the computing system in response to one of the possible states of the body part.

Example 16: The HCI system of Example 15, wherein the processing device (1) determines, based at least in part on additional neuromuscular signals detected by the plurality of sensors, an additional state of the body part and, in response to determining the additional state of the body part, (2) transitioning from the mapping to the additional mapping by (A) deactivating the mapping and (B) activating the additional mapping such that one of the additional actions is performed by the computing system in response to the one of the possible states of the body part.

Example 17: The HCI system of Example 5, wherein the action comprises at least one of (1) selecting a visual element of the GUI, (2) clicking on a visual element of the GUI, or (3) displaying a visual element in the GUI.

Example 18: The HCI system of Example 1, wherein the state of the body part comprises at least one of (1) a pose of the body part, (2) a gesture of the body part, or (3) an isometric contraction of the body part.

Example 19: A wearable device comprising (1) a plurality of sensors that detect one or more neuromuscular signals via a body of a user of a computing system and (2) at least one processing device communicatively coupled to the plurality of sensors, wherein the processing device (A) determines, based at least in part on the neuromuscular signals detected by the plurality of sensors, a state of at least one body part of the user and, in response to determining the state of the body part, (B) generates an input command for the computing system that accounts for the state of the body part.

Example 20: A method comprising (1) detecting, by a plurality of sensors incorporated into a wearable donned by a user of a computing system, one or more neuromuscular signals via a body of the user, (2) determining, by a processing device, a state of at least one body part of the user based at least in part on the neuromuscular signals detected by the plurality of sensors, and (3) generating, by the processing device in response to determining the state of the body part, an input command for the computing system that accounts for the state of the body part.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 2500 in FIG. 25) or that visually immerses a user in an artificial reality (such as, e.g., virtual-reality system 2600 in FIG. 26). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 25:
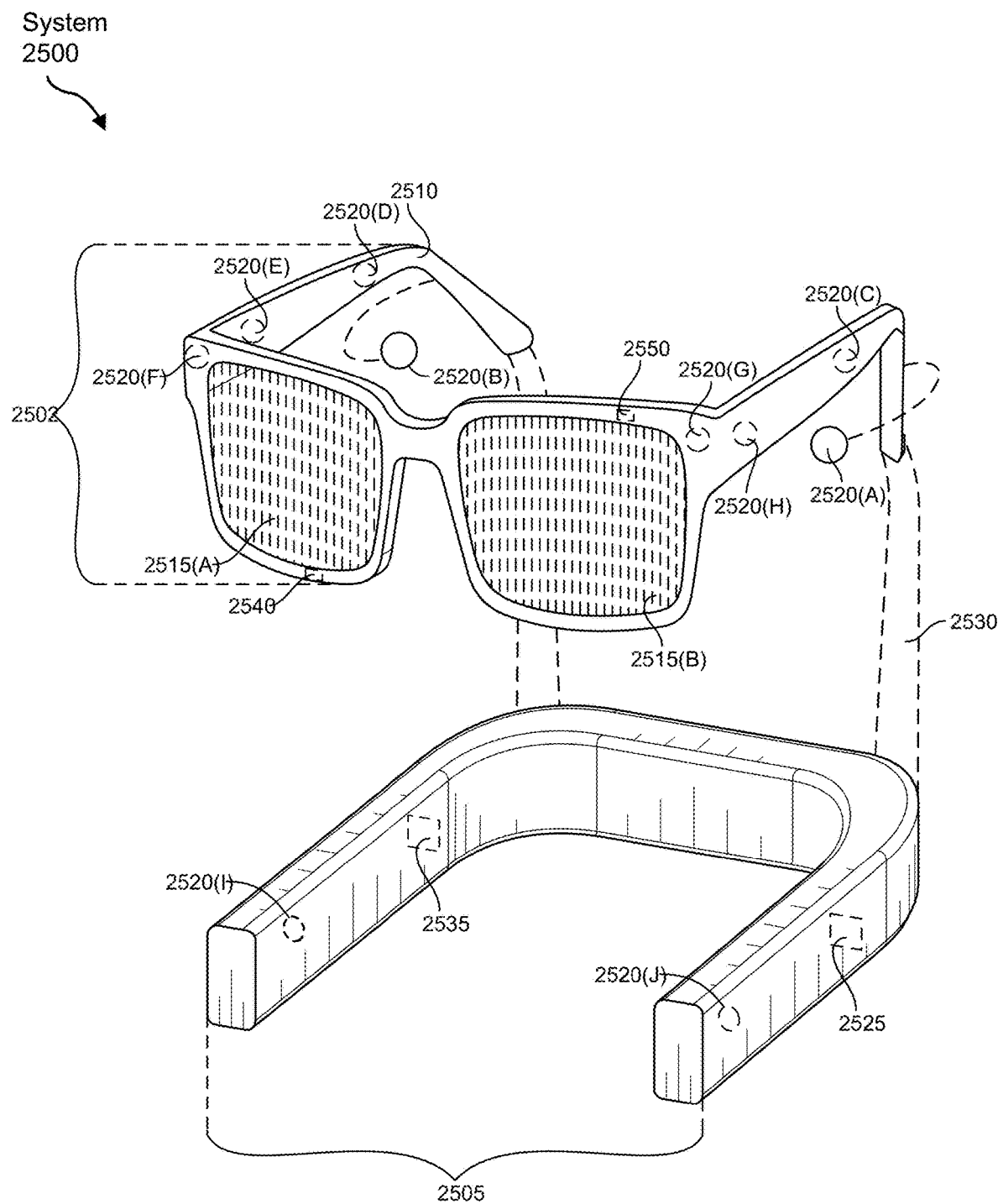
FIG. 25 is an illustration of exemplary augmented-reality glasses that may be used in connection with embodiments of this disclosure.
Figure 26:
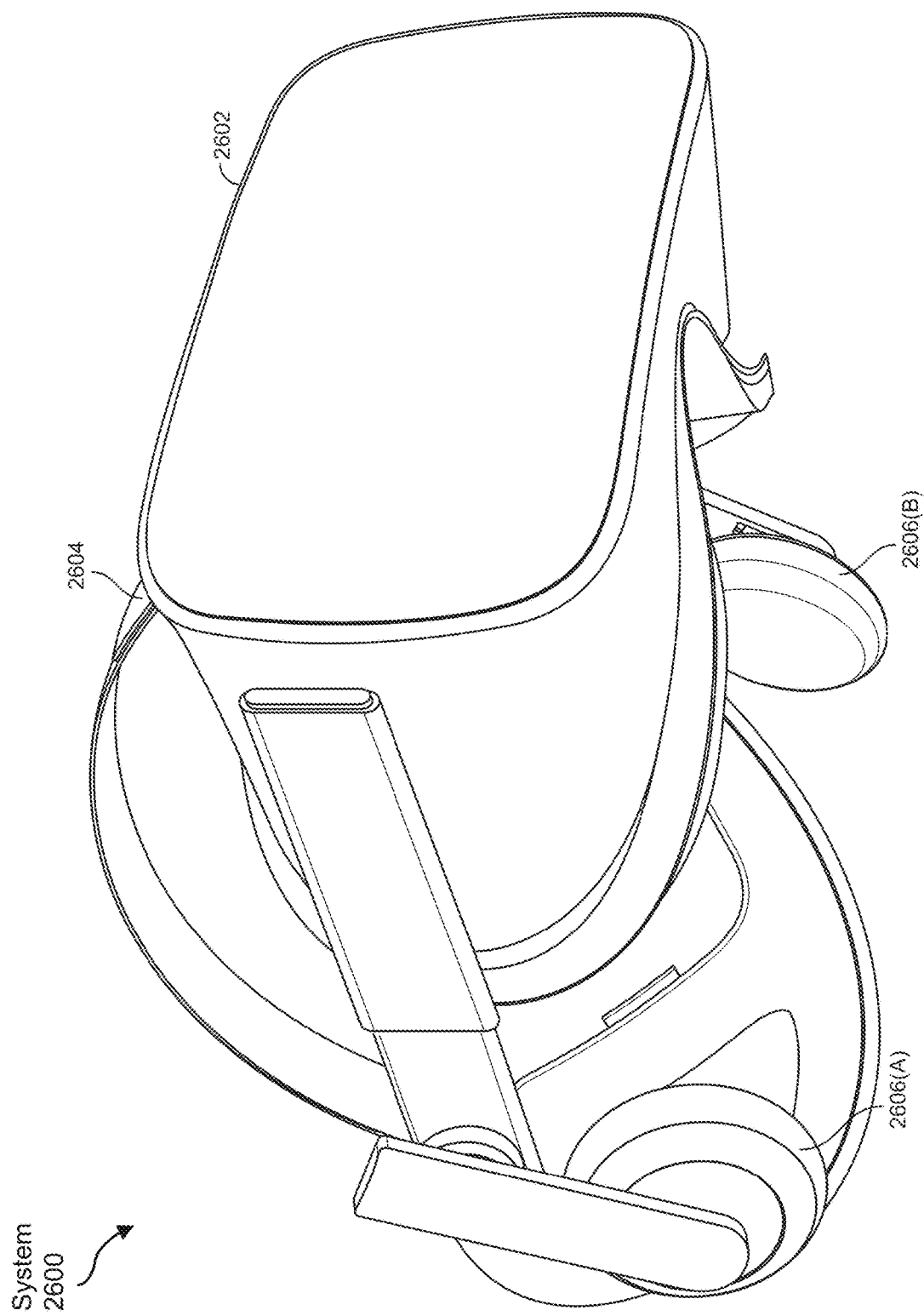
FIG. 26 is an illustration of an exemplary virtual-reality headset that may be used in connection with embodiments of this disclosure.

Turning to FIG. 25, augmented-reality system 2500 may include an eyewear device 2502 with a frame 2510 configured to hold a left display device 2515(A) and a right display device 2515(B) in front of a user's eyes. Display devices

2515(A) and 2515(B) may act together or independently to present an image or series of images to a user. While augmented-reality system 2500 includes two displays, embodiments of this disclosure may be implemented in augmented-reality systems with a single NED or more than two NEDs.

In some embodiments, augmented-reality system 2500 may include one or more sensors, such as sensor 2540. Sensor 2540 may generate measurement signals in response to motion of augmented-reality system 2500 and may be located on substantially any portion of frame 2510. Sensor 2540 may represent one or more of a variety of different sensing mechanisms, such as a position sensor, an inertial measurement unit (IMU), a depth camera assembly, a structured light emitter and/or detector, or any combination thereof. In some embodiments, augmented-reality system 2500 may or may not include sensor 2540 or may include more than one sensor. In embodiments in which sensor 2540 includes an IMU, the IMU may generate calibration data based on measurement signals from sensor 2540. Examples of sensor 2540 may include, without limitation, accelerometers, gyroscopes, magnetometers, other suitable types of sensors that detect motion, sensors used for error correction of the IMU, or some combination thereof.

In some examples, augmented-reality system 2500 may also include a microphone array with a plurality of acoustic transducers 2520(A)-2520(J), referred to collectively as acoustic transducers 2520. Acoustic transducers 2520 may represent transducers that detect air pressure variations induced by sound waves. Each acoustic transducer 2520 may be configured to detect sound and convert the detected sound into an electronic format (e.g., an analog or digital format). The microphone array in FIG. 26 may include, for example, ten acoustic transducers: 2520(A) and 2520(B), which may be designed to be placed inside a corresponding ear of the user, acoustic transducers 2520(C), 2520(D), 2520(E), 2520(F), 2520(G), and 2520(H), which may be positioned at various locations on frame 2510, and/or acoustic transducers 2520(I) and 2520(J), which may be positioned on a corresponding neckband 2505.

In some embodiments, one or more of acoustic transducers 2520(A)-(F) may be used as output transducers (e.g., speakers). For example, acoustic transducers 2520(A) and/or 2520(B) may be earbuds or any other suitable type of headphone or speaker.

The configuration of acoustic transducers 2520 of the microphone array may vary. While augmented-reality system 2500 is shown in FIG. 25 as having ten acoustic transducers 2520, the number of acoustic transducers 2520 may be greater or less than ten. In some embodiments, using higher numbers of acoustic transducers 2520 may increase the amount of audio information collected and/or the sensitivity and accuracy of the audio information. In contrast, using a lower number of acoustic transducers 2520 may decrease the computing power required by an associated controller 2550 to process the collected audio information. In addition, the position of each acoustic transducer 2520 of the microphone array may vary. For example, the position of an acoustic transducer 2520 may include a defined position on the user, a defined coordinate on frame 2510, an orientation associated with each acoustic transducer 2520, or some combination thereof.

Acoustic transducers 2520(A) and 2520(B) may be positioned on different parts of the user's ear, such as behind the pinna, behind the tragus, and/or within the auricle or fossa. Or, there may be additional acoustic transducers 2520 on or surrounding the ear in addition to acoustic transducers 2520 inside the ear canal. Having an acoustic transducer 2520 positioned next to an ear canal of a user may enable the microphone array to collect information on how sounds arrive at the ear canal. By positioning at least two of acoustic transducers 2520 on either side of a user's head (e.g., as binaural microphones), augmented-reality device 2500 may simulate binaural hearing and capture a 3D stereo sound field around about a user's head. In some embodiments, acoustic transducers 2520(A) and 2520(B) may be connected to augmented-reality system 2500 via a wired connection 2530, and in other embodiments acoustic transducers 2520(A) and 2520(B) may be connected to augmented-reality system 2500 via a wireless connection (e.g., a Bluetooth connection). In still other embodiments, acoustic transducers 2520(A) and 2520(B) may not be used at all in conjunction with augmented-reality system 2500.

Acoustic transducers 2520 on frame 2510 may be positioned in a variety of different ways, including along the length of the temples, across the bridge, above or below display devices 2515(A) and 2515(B), or some combination thereof. Acoustic transducers 2520 may also be oriented such that the microphone array is able to detect sounds in a wide range of directions surrounding the user wearing the augmented-reality system 2500. In some embodiments, an optimization process may be performed during manufacturing of augmented-reality system 2500 to determine relative positioning of each acoustic transducer 2520 in the microphone array.

In some examples, augmented-reality system 2500 may include or be connected to an external device (e.g., a paired device), such as neckband 2505. Neckband 2505 generally represents any type or form of paired device. Thus, the following discussion of neckband 2505 may also apply to various other paired devices, such as charging cases, smart watches, smart phones, wrist bands, other wearable devices, hand-held controllers, tablet computers, laptop computers, other external compute devices, etc.

As shown, neckband 2505 may be coupled to eyewear device 2502 via one or more connectors. The connectors may be wired or wireless and may include electrical and/or non-electrical (e.g., structural) components. In some cases, eyewear device 2502 and neckband 2505 may operate independently without any wired or wireless connection between them. While FIG. 25 illustrates the components of eyewear device 2502 and neckband 2505 in example locations on eyewear device 2502 and neckband 2505, the components may be located elsewhere and/or distributed differently on eyewear device 2502 and/or neckband 2505. In some embodiments, the components of eyewear device 2502 and neckband 2505 may be located on one or more additional peripheral devices paired with eyewear device 2502, neckband 2505, or some combination thereof.

Pairing external devices, such as neckband 2505, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 2500 may be provided by a paired device or shared between a paired device and an eyewear device, thus reducing the weight, heat profile, and form factor of the eyewear device overall while still retaining desired functionality. For example, neckband 2505 may allow components that would otherwise be included on an eyewear device to be included in neckband 2505 since users may tolerate a heavier weight load on their shoulders than they would tolerate on their heads. Neckband 2505 may also have a larger surface area over which to diffuse and disperse heat to the ambient environment. Thus, neckband 2505 may allow for greater battery and computation capacity than might otherwise have been possible on a stand-alone eyewear device. Since weight carried in neckband 2505 may be less invasive to a user than weight carried in eyewear device 2502, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 2505 may be communicatively coupled with eyewear device 2502 and/or to other devices. These other devices may provide certain functions (e.g., tracking, localizing, depth mapping, processing, storage, etc.) to augmented-reality system 2500. In the embodiment of FIG. 25, neckband 2505 may include two acoustic transducers (e.g., 2520(I) and 2520(J)) that are part of the microphone array (or potentially form their own microphone subarray). Neckband 2505 may also include a controller 2525 and a power source 2535.

Acoustic transducers 2520(I) and 2520(J) of neckband 2505 may be configured to detect sound and convert the detected sound into an electronic format (analog or digital). In the embodiment of FIG. 25, acoustic transducers 2520(I) and 2520(J) may be positioned on neckband 2505, thereby increasing the distance between the neckband acoustic transducers 2520(I) and 2520(J) and other acoustic transducers 2520 positioned on eyewear device 2502. In some cases, increasing the distance between acoustic transducers 2520 of the microphone array may improve the accuracy of beamforming performed via the microphone array. For example, if a sound is detected by acoustic transducers 2520(C) and 2520(D) and the distance between acoustic transducers 2520(C) and 2520(D) is greater than, e.g., the distance between acoustic transducers 2520(D) and 2520(E), the determined source location of the detected sound may be more accurate than if the sound had been detected by acoustic transducers 2520(D) and 2520(E).

Controller 2525 of neckband 2505 may process information generated by the sensors on neckband 2505 and/or augmented-reality system 2500. For example, controller 2525 may process information from the microphone array that describes sounds detected by the microphone array. For each detected sound, controller 2525 may perform a direction-of-arrival (DOA) estimation to estimate a direction from which the detected sound arrived at the microphone array. As the microphone array detects sounds, controller 2525 may populate an audio data set with the information. In embodiments in which augmented-reality system 2500 includes an inertial measurement unit, controller 2525 may compute all inertial and spatial calculations from the IMU located on eyewear device 2502. A connector may convey information between augmented-reality system 2500 and neckband 2505 and between augmented-reality system 2500 and controller 2525. The information may be in the form of optical data, electrical data, wireless data, or any other transmittable data form. Moving the processing of information generated by augmented-reality system 2500 to neckband 2505 may reduce weight and heat in eyewear device 2502, making it more comfortable to the user.

Power source 2535 in neckband 2505 may provide power to eyewear device 2502 and/or to neckband 2505. Power source 2535 may include, without limitation, lithium ion batteries, lithium-polymer batteries, primary lithium batteries, alkaline batteries, or any other form of power storage. In some cases, power source 2535 may be a wired power source. Including power source 2535 on neckband 2505 instead of on eyewear device 2502 may help better distribute the weight and heat generated by power source 2535.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 2600 in FIG. 26, that mostly or completely covers a user's field of view. Virtual-reality system 2600 may include a front rigid body 2602 and a band 2604 shaped to fit around a user's head. Virtual-reality system 2600 may also include output audio transducers 2606(A) and 2606(B). Furthermore, while not shown in FIG. 26, front rigid body 2602 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 2500 and/or virtual-reality system 2600 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in augmented-reality system 2500 and/or virtual-reality system 2600 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 2500 and/or virtual-reality system 2600 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A human-computer interface (HCI) system comprising:
   at least one processor;
   a plurality of sensors that detect one or more neuromuscular signals from a forearm or wrist of a user, wherein the plurality of sensors are arranged on one or more wearable devices; and
   memory that stores:
      one or more trained inferential models that:
         determine an amount of force associated with the one or more neuromuscular signals detected by the plurality of sensors; and
         determine a single hand gesture performed by the user based at least in part on the one or more neuromuscular signals detected by the plurality of sensors; and
      computer-executable instructions that, when executed by the at least one processor, cause the at least one processor to:
         identify the amount of force associated with the one or more neuromuscular signals as determined by the one or more trained inferential models;
         determine whether the amount of force satisfies a threshold force value;
         determine whether the amount of force and an additional amount of force were both exerted by the user while performing the single hand gesture;
         in accordance with a determination that the amount of force satisfies the threshold force value and was exerted by the user while performing the single hand gesture, generate a first input command for the HCI system; and
         in accordance with a determination that the additional amount of force was exerted by the user while performing the single hand gesture, generate a second input command for the HCI system.

2. The HCI system of claim 1, wherein:
   the threshold force value is a first threshold force value; and
   the computer-executable instructions, when executed by the at least one processor, further cause the at least one processor to:
      determine whether the amount of force also satisfies a second threshold force value that is greater than the first threshold force value; and
      in accordance with a determination that the amount of force satisfies the first threshold force value and the second threshold force value, generate a second input command that differs from the first input command for the HCI system.

3. The HCI system of claim 2, wherein:
the one or more trained inferential models determine an additional amount of force associated with the one or more neuromuscular signals detected by the plurality of sensors; and
the computer-executable instructions, when executed by the at least one processor, further cause the at least one processor to:
identify the additional amount of force associated with the one or more neuromuscular signals as determined by the one or more trained inferential models;
determine whether the additional amount of force does not satisfy the first threshold force value; and
in accordance with a determination that the additional amount of force does not satisfy the first threshold force value, forgo generation of an additional input command for the HCI system.

4. The HCI system of claim 1, wherein:
the one or more trained inferential models further determine one or more hand gestures performed by the user based at least in part on the one or more neuromuscular signals detected by the plurality of sensors; and
the computer-executable instructions, when executed by the at least one processor, further cause the at least one processor to:
identify the one or more hand gestures performed by the user as determined by the one or more trained inferential models;
determine whether the amount of force was exerted by the user while performing the one or more hand gestures; and
generate the first input command for the HCI system in accordance with a determination that the amount of force was exerted by the user while performing the one or more hand gestures.

5. The HCI system of claim 4, wherein:
the one or more hand gestures comprise a first hand gesture and a second hand gesture; and
the computer-executable instructions, when executed by the at least one processor, further cause the at least one processor to:
determine that the amount of force was exerted by the user while performing the first hand gesture;
determine whether an additional amount of force that satisfies an additional threshold force value was exerted by the user while performing the second hand gesture;
generate the first input command for the HCI system in accordance with a determination that the amount of force was exerted by the user while performing the first hand gesture; and
generate a second input command for the HCI system in accordance with a determination that the additional amount of force that satisfies the additional threshold force value was exerted by the user while performing the second hand gesture.

6. The HCI system of claim 4, wherein the computer-executable instructions, when executed by the at least one processor, further cause the at least one processor to:
maintain a mapping between a set of hand gestures and a set of actions capable of being performed by the HCI system;
select an action to be performed by the HCI system based at least in part on the mapping and the one or more hand gestures performed by the user; and
formulate the first input command to direct the HCI system to perform the action in accordance with the mapping.

7. The HCI system of claim 6, wherein the computer-executable instructions, when executed by the at least one processor, further cause the at least one processor to:
maintain an additional mapping between the set of hand gestures and an additional set of actions capable of being performed by the HCI system; and
prior to formulating the first input command for the HCI system, activate the mapping such that the action is selected in response to the one or more hand gestures performed by the user.

8. The HCI system of claim 7, wherein the computer-executable instructions, when executed by the at least one processor, further cause the at least one processor to:
deactivate the mapping after formulating the first input command for the HCI system;
activate the additional mapping; and
after activating the additional mapping, formulate a second input command to direct the HCI system to perform a different action included in the additional mapping in accordance with a subsequent determination that the user performed the one or more hand gestures.

9. The HCI system of claim 6, wherein the computer-executable instructions, when executed by the at least one processor, further cause the at least one processor to:
map the action to be performed by the HCI system to a plurality of conditions;
determine, based at least in part on the one or more neuromuscular signals detected by the plurality of sensors, that the plurality of conditions mapped to the action have been satisfied; and
generate the first input command for the HCI system due at least in part to the plurality of conditions having been satisfied.

10. The HCI system of claim 4, wherein the computer-executable instructions, when executed by the at least one processor, further cause the at least one processor to:
identify photographic data representative of the one or more hand gestures as captured by a camera; and
provide the photographic data to the one or more trained inferential models to enable the one or more trained inferential models to determine the one or more hand gestures based at least in part on the one or more neuromuscular signals and the photographic data.

11. The HCI system of claim 10, wherein:
the one or more hand gestures comprise either:
an index finger pinch; or
a middle finger pinch; and
the one or more trained inferential models are able to distinguish between an index finger pinch and a middle finger pinch based at least in part on the one or more neuromuscular signals and the photographic data.

12. The HCI system of claim 1, wherein:
the single hand gesture comprises a first formed by a hand of the user; and
the computer-executable instructions, when executed by the at least one processor, further cause the at least one processor to:
formulate the first input command to control a speed of a cursor implemented on the HCI system in accordance with the amount of force exerted by the user while performing the single hand gesture; and
formulate the first input command to increase or decrease the speed of the cursor implemented on the HCI system in accordance with the additional amount of force exerted by the user while performing the single hand gesture.

13. The HCI system of claim 1, wherein:
the one or more trained inferential models determine an additional amount of force associated with the one or more neuromuscular signals detected by the plurality of sensors; and
the computer-executable instructions, when executed by the at least one processor, further cause the at least one processor to:
identify the additional amount of force associated with the one or more neuromuscular signals as determined by the one or more trained inferential models;
determine whether the additional amount of force does not satisfy the threshold force value; and
in accordance with a determination that the additional amount of force does not satisfy the threshold force value, generate a second input command that differs from the first input command for the HCI system.

14. The HCI system of claim 13, wherein the first input command or the second input command directs the HCI system to perform at least one of:
navigate a graphical user interface (GUI) of an application;
draw a visual element on a GUI of an application;
control a scrolling speed of a GUI of an application;
scroll through a GUI of an application;
modify a width of a virtual drawing instrument used to draw in a GUI of an application;
associate a cursor with a visual element displayed in a GUI of an application;
provide a feedback indication of an association made between a cursor and a visual element displayed in a GUI of an application;
move a selection indicator forward or backward along a radial menu displayed in a GUI of an application;
modify a characteristic of a visual element displayed in a GUI of an application;
display a visual element in a GUI of an application;
click a visual element on a GUI of an application; or
select a visual element on a GUI of an application.

15. The HCI system of claim 1, wherein the one or more wearable devices, the at least one processor, and the memory are incorporated into an artificial-reality system that includes a head-mounted display.

16. An artificial-reality system comprising:
a head-mounted display; and
a human-computer interface (HCI) system communicatively coupled to the head-mounted display, wherein the HCI system comprises:
at least one processor;
a plurality of sensors that detect one or more neuromuscular signals from a forearm or wrist of a user, wherein the plurality of sensors are arranged on one or more wearable devices; and
memory that stores:
one or more trained inferential models that:
determine an amount of force associated with the one or more neuromuscular signals detected by the plurality of sensors; and
determine a single hand gesture performed by the user based at least in part on the one or more neuromuscular signals detected by the plurality of sensors; and
computer-executable instructions that, when executed by the at least one processor, cause the at least one processor to:
identify the amount of force associated with the one or more neuromuscular signals as determined by the one or more trained inferential models;
determine whether the amount of force satisfies a threshold force value;
determine whether the amount of force and an additional amount of force were both exerted by the user while performing the single hand gesture;
in accordance with a determination that the amount of force satisfies the threshold force value and was exerted by the user while performing the single hand gesture, generate a first input command for the artificial-reality system; and
in accordance with a determination that the additional amount of force was exerted by the user while performing the single hand gesture, generate a second input command for the HCI system.

17. The artificial-reality system of claim 16, wherein:
the threshold force value is a first threshold force value; and
the computer-executable instructions, when executed by the at least one processor, further cause the at least one processor to:
determine whether the amount of force also satisfies a second threshold force value that is greater than the first threshold force value; and
in accordance with a determination that the amount of force satisfies the first threshold force value and the second threshold force value, generate a second input command that differs from the first input command for the artificial-reality system.

18. The artificial-reality system of claim 17, wherein:
the one or more trained inferential models determine an additional amount of force associated with the one or more neuromuscular signals detected by the plurality of sensors; and
the computer-executable instructions, when executed by the at least one processor, further cause the at least one processor to:
identify the additional amount of force associated with the one or more neuromuscular signals as determined by the one or more trained inferential models;
determine whether the additional amount of force does not satisfy the first threshold force value; and
in accordance with a determination that the additional amount of force does not satisfy the first threshold force value, forgo generation of an additional input command for the artificial-reality system.

19. A method comprising:
detecting, by a plurality of sensors incorporated into one or more wearable devices of a human-computer interface (HCI) system, one or more neuromuscular signals from a forearm or wrist of a user;
determining, by one or more trained inferential models implemented by at least one processor of the HCI system, an amount of force associated with the one or more neuromuscular signals detected by the plurality of sensors;
determining, by the one or more trained inferential models, a single hand gesture performed by the user based at least in part on the one or more neuromuscular signals detected by the plurality of sensors;

determining, by the at least one processor of the HCI system, whether the amount of force associated with the one or more neuromuscular signals satisfies a threshold force value;

determining, by the one or more trained inferential models, whether the amount of force and an additional amount of force were both exerted by the user while performing the single hand gesture;

generating, by the at least one processor of the HCI system, a first input command for the HCI system in accordance with a determination that the amount of force satisfies the threshold force value and was exerted by the user while performing the single hand gesture; and generating, by the at least one processor of the HCI system, a second input command for the HCI system in accordance with a determination that the additional amount of force was exerted by the user while performing the single hand gesture.

* * * * *